(12) United States Patent
Koizumi et al.

(10) Patent No.: US 11,951,386 B2
(45) Date of Patent: *Apr. 9, 2024

(54) INFORMATION PROCESSING SYSTEM, INFORMATION PROCESSING DEVICE, CONTROLLER DEVICE AND ACCESSORY

(71) Applicant: NINTENDO CO., LTD., Kyoto (JP)

(72) Inventors: Yoshiaki Koizumi, Kyoto (JP); Yui Ehara, Kyoto (JP); Munetaka Nishikawa, Kyoto (JP); Kochi Kawai, Kyoto (JP); Kenichi Mae, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,503

(22) Filed: Feb. 5, 2022

(65) Prior Publication Data

US 2022/0233949 A1 Jul. 28, 2022

Related U.S. Application Data

(62) Division of application No. 16/735,838, filed on Jan. 7, 2020, now abandoned, which is a division of
(Continued)

(30) Foreign Application Priority Data

Jun. 12, 2015 (JP) ................................ 2015-119707

(51) Int. Cl.
*A63F 13/23* (2014.01)
*A63F 13/2145* (2014.01)
(Continued)

(52) U.S. Cl.
CPC .......... *A63F 13/23* (2014.09); *A63F 13/2145* (2014.09); *A63F 13/235* (2014.09);
(Continued)

(58) Field of Classification Search
None
See application file for complete search history.

(56) References Cited

U.S. PATENT DOCUMENTS

| 3,850,271 A | 11/1974 | Hillmann |
| 5,046,739 A | 9/1991 | Reichow |

(Continued)

FOREIGN PATENT DOCUMENTS

| CN | 1127150 | 7/1996 |
| CN | 1395159 | 2/2003 |

(Continued)

OTHER PUBLICATIONS

Try a cradle that turns your PSP into a "stationary player", AV Watch [online], May 2, 2008, Internet <URL: https://av.watch.impress.co.jp/docs/20080502/psp.htm > and English-language machine translation.

(Continued)

*Primary Examiner* — Tramar Harper
(74) *Attorney, Agent, or Firm* — Nixon & Vanderhye, P.C.

(57) ABSTRACT

An example information processing system includes a main unit, a first controller device and a second controller device. The main unit includes a display. The first controller device is configured to be removably attached to the main unit, and the first controller device transmits first operation data representing an operation performed on the first controller device to the main unit, irrespective of whether the first controller device is attached to the main unit. The second controller device is configured to be removably attached to the main unit, and the second controller device transmits second operation data representing an operation performed on the second controller device to the main unit, irrespective of whether the second controller device is attached to the main unit. The main unit displays, on the display, an (Continued)

execution result of an information process based on the first and the second operation data.

25 Claims, 33 Drawing Sheets

Related U.S. Application Data application No. 15/179,022, filed on Jun. 10, 2016, now Pat. No. 10,583,356.

(51) Int. Cl.

| | | |
|---|---|---|
| *A63F 13/235* | (2014.01) | |
| *A63F 13/24* | (2014.01) | |
| *A63F 13/26* | (2014.01) | |
| *A63F 13/31* | (2014.01) | |
| *A63F 13/843* | (2014.01) | |
| *A63F 13/92* | (2014.01) | |
| *A63F 13/98* | (2014.01) | |
| *G06F 1/16* | (2006.01) | |
| *G06F 3/01* | (2006.01) | |
| *G06F 3/02* | (2006.01) | |
| *G06F 3/03* | (2006.01) | |
| *G06F 3/033* | (2013.01) | |
| *G06F 3/0338* | (2013.01) | |
| *G06F 3/0346* | (2013.01) | |
| *G06F 3/14* | (2006.01) | |
| *G08C 17/02* | (2006.01) | |
| *G08C 19/00* | (2006.01) | |

(52) U.S. Cl.
CPC .............. *A63F 13/24* (2014.09); *A63F 13/26* (2014.09); *A63F 13/31* (2014.09); *A63F 13/843* (2014.09); *A63F 13/92* (2014.09); *A63F 13/98* (2014.09); *G06F 1/1607* (2013.01); *G06F 1/1671* (2013.01); *G06F 1/1684* (2013.01); *G06F 3/011* (2013.01); *G06F 3/017* (2013.01); *G06F 3/02* (2013.01); *G06F 3/0304* (2013.01); *G06F 3/033* (2013.01); *G06F 3/0338* (2013.01); *G06F 3/0346* (2013.01); *G06F 3/1423* (2013.01); *G08C 17/02* (2013.01); *G08C 19/00* (2013.01); *A63F 2300/1075* (2013.01); *A63F 2300/204* (2013.01); *G06F 1/1669* (2013.01)

(56) References Cited

U.S. PATENT DOCUMENTS

| | | |
|---|---|---|
| 5,052,937 A | 10/1991 | Glen |
| 5,276,733 A | 1/1994 | Uno et al. |
| 5,515,174 A | 5/1996 | Abe et al. |
| 5,627,974 A | 5/1997 | Watts |
| 5,657,459 A | 8/1997 | Yanagisawa et al. |
| 5,667,220 A | 9/1997 | Cheng |
| 5,677,827 A | 10/1997 | Yoshioka |
| 5,702,305 A | 12/1997 | Norman et al. |
| 6,512,511 B2 | 1/2003 | Willner |
| 6,530,838 B2 | 3/2003 | Ha |
| 6,580,420 B1 | 6/2003 | Wang |
| 6,788,285 B2 | 9/2004 | Paolucci |
| 7,095,442 B2 | 8/2006 | Van Zee |
| 7,733,637 B1 | 6/2010 | Lam |
| 7,833,097 B1 | 11/2010 | Maddox |
| 8,057,309 B1 | 11/2011 | Mead |
| 8,298,084 B2 | 10/2012 | Yee |
| 8,497,659 B2 | 7/2013 | Navid |
| 8,845,425 B2 | 9/2014 | Nogami |
| 8,939,838 B2 | 1/2015 | Alten |
| 8,972,617 B2 | 3/2015 | Hirschman |
| 9,539,507 B2 | 1/2017 | Schoenith et al. |
| 9,724,601 B2 | 8/2017 | Fujita et al. |
| 9,751,008 B2 | 9/2017 | Fujita et al. |
| 9,757,647 B2 | 9/2017 | Fujita et al. |
| 9,776,081 B2 | 10/2017 | Fujita et al. |
| 9,776,082 B2 | 10/2017 | Iwao et al. |
| 9,782,671 B2 | 10/2017 | Fujita et al. |
| 9,914,060 B1 | 3/2018 | Corigliano |
| 10,092,829 B2 | 10/2018 | Ikuta et al. |
| 10,328,350 B2 | 6/2019 | Furuike et al. |
| 10,583,356 B2 | 3/2020 | Koizumi |
| 2001/0003708 A1 | 6/2001 | Aizu |
| 2001/0045938 A1 | 11/2001 | Willner |
| 2002/0098887 A1 | 7/2002 | Himoto |
| 2002/0119819 A1 | 8/2002 | Kunzle |
| 2002/0145590 A1 | 10/2002 | Paolucci et al. |
| 2002/0155890 A1 | 10/2002 | Ha et al. |
| 2002/0167696 A1 | 11/2002 | Edwards et al. |
| 2003/0083130 A1 | 5/2003 | Toyoshima |
| 2003/0100263 A1 | 5/2003 | Tanaka et al. |
| 2003/0100340 A1 | 5/2003 | Cupps et al. |
| 2003/0109314 A1 | 6/2003 | Ku |
| 2003/0171146 A1 | 9/2003 | Mayer et al. |
| 2004/0001307 A1 | 1/2004 | Takakusaki |
| 2004/0082361 A1 | 4/2004 | Rajagopalan |
| 2004/0090416 A1 | 5/2004 | Biheller et al. |
| 2004/0263471 A1 | 12/2004 | Hsieh |
| 2005/0012711 A1 | 1/2005 | Paolucci et al. |
| 2005/0059438 A1 | 3/2005 | Jellicoe |
| 2005/0085301 A1 | 4/2005 | Hammond |
| 2006/0117623 A1 | 6/2006 | Watanabe |
| 2006/0152484 A1 | 7/2006 | Rolus Borgward |
| 2006/0176277 A1 | 8/2006 | Daniel et al. |
| 2006/0237209 A1 | 10/2006 | Horinouchi |
| 2006/0279039 A1 | 12/2006 | Krieger |
| 2007/0021210 A1 | 1/2007 | Tachibana |
| 2007/0045392 A1 | 3/2007 | Youens |
| 2007/0049374 A1 | 3/2007 | Ikeda |
| 2007/0072680 A1 | 3/2007 | Ikeda |
| 2007/0111801 A1 | 5/2007 | Haber |
| 2007/0112989 A1 | 5/2007 | Iwaki |
| 2007/0131727 A1 | 6/2007 | Martuccio |
| 2007/0178966 A1 | 8/2007 | Pohlman |
| 2007/0200727 A1 | 8/2007 | Sakamoto |
| 2007/0218988 A1 | 9/2007 | Lucich |
| 2007/0293318 A1 | 12/2007 | Tetterington |
| 2008/0002350 A1 | 1/2008 | Farrugia |
| 2008/0015017 A1 | 1/2008 | Ashida |
| 2008/0064500 A1 | 3/2008 | Satsukawa et al. |
| 2008/0113798 A1 | 5/2008 | Miyanaga |
| 2008/0153593 A1 | 6/2008 | Ikeda |
| 2008/0167740 A1 | 7/2008 | Merrill |
| 2009/0005164 A1 | 1/2009 | Chang |
| 2009/0036189 A1 | 2/2009 | Wang |
| 2009/0069096 A1 | 3/2009 | Nishimoto |
| 2009/0070093 A1 | 3/2009 | Nakanishi et al. |
| 2009/0072784 A1 | 3/2009 | Erickson |
| 2009/0079705 A1 | 3/2009 | Sizelove |
| 2009/0093307 A1 | 4/2009 | Miyaki |
| 2009/0111508 A1 | 4/2009 | Yeh |
| 2009/0291760 A1 | 11/2009 | Hepburn |
| 2009/0312098 A1 | 12/2009 | Chang |
| 2009/0318227 A1 | 12/2009 | Nakajima |
| 2010/0007528 A1 | 1/2010 | Urata et al. |
| 2010/0009754 A1 | 1/2010 | Shimamura et al. |
| 2010/0064883 A1 | 3/2010 | Gynes |
| 2010/0118195 A1 | 5/2010 | Eom |
| 2010/0178981 A1 | 7/2010 | Holcomb |
| 2010/0195279 A1 | 8/2010 | Michael |
| 2010/0216547 A1 | 8/2010 | Coppard et al. |
| 2010/0267454 A1 | 10/2010 | Navid |
| 2010/0304873 A1 | 12/2010 | Markowitz |
| 2011/0018867 A1 | 1/2011 | Shibamiya et al. |
| 2011/0059795 A1 | 3/2011 | Kondo |
| 2011/0190052 A1 | 8/2011 | Takeda et al. |
| 2011/0216495 A1 | 9/2011 | Marx |
| 2011/0230261 A1 | 9/2011 | Kim |
| 2011/0260969 A1 | 10/2011 | Workman |
| 2011/0263328 A1 | 10/2011 | Yamashita et al. |

(56) References Cited

U.S. PATENT DOCUMENTS

| | | |
|---|---|---|
| 2011/0266231 A1 | 11/2011 | Tsunezumi et al. |
| 2012/0058821 A1* | 3/2012 | Lan .................. A63F 13/92 463/30 |
| 2012/0063625 A1 | 3/2012 | Barber et al. |
| 2012/0088582 A1 | 4/2012 | Wu et al. |
| 2012/0106041 A1 | 5/2012 | Ashida |
| 2012/0106042 A1 | 5/2012 | Ashida et al. |
| 2012/0113034 A1 | 5/2012 | McDermid |
| 2012/0176369 A1 | 7/2012 | Suzuki et al. |
| 2012/0188691 A1 | 7/2012 | Zhou |
| 2012/0188694 A1 | 7/2012 | Sakakibara et al. |
| 2012/0196680 A1 | 8/2012 | Provitt |
| 2012/0202597 A1 | 8/2012 | Yee et al. |
| 2012/0224708 A1 | 9/2012 | Sugiyama |
| 2012/0231881 A1 | 9/2012 | Matsunaga |
| 2012/0271967 A1 | 10/2012 | Hirschman |
| 2012/0302347 A1 | 11/2012 | Nicholson |
| 2012/0302348 A1 | 11/2012 | Karacal et al. |
| 2012/0326984 A1 | 12/2012 | Ghassabian |
| 2013/0058659 A1 | 3/2013 | Umezu et al. |
| 2013/0095925 A1 | 4/2013 | Xu |
| 2013/0106687 A1 | 5/2013 | Baum et al. |
| 2013/0109476 A1 | 5/2013 | Baum et al. |
| 2013/0120258 A1 | 5/2013 | Maus |
| 2013/0130800 A1 | 5/2013 | Sirilux et al. |
| 2013/0154542 A1 | 6/2013 | Joynes et al. |
| 2013/0178285 A1 | 7/2013 | Joynes et al. |
| 2013/0194190 A1 | 8/2013 | Lysenko |
| 2013/0215024 A1 | 8/2013 | Nakayama et al. |
| 2013/0221923 A1 | 8/2013 | Robertson |
| 2013/0267318 A1 | 10/2013 | Pryor et al. |
| 2013/0267322 A1 | 10/2013 | South |
| 2013/0279106 A1 | 10/2013 | Ergun |
| 2013/0335904 A1 | 12/2013 | Griffin |
| 2013/0341214 A1 | 12/2013 | King et al. |
| 2014/0028247 A1 | 1/2014 | Du et al. |
| 2014/0121023 A1 | 5/2014 | Tahara et al. |
| 2014/0152531 A1 | 6/2014 | Murray et al. |
| 2014/0200085 A1 | 7/2014 | Bares |
| 2014/0206451 A1 | 7/2014 | Helmes |
| 2014/0221098 A1 | 8/2014 | Boulanger |
| 2014/0235359 A1 | 8/2014 | Navid |
| 2014/0247246 A1 | 9/2014 | Maus |
| 2014/0274394 A1 | 9/2014 | Willis |
| 2014/0315642 A1 | 10/2014 | Grant et al. |
| 2014/0370988 A1 | 12/2014 | Shimamura et al. |
| 2014/0374457 A1 | 12/2014 | Piccolo |
| 2014/0376182 A1 | 12/2014 | Motoishi et al. |
| 2015/0018101 A1 | 1/2015 | Schoenith et al. |
| 2015/0031452 A1 | 1/2015 | Rundell et al. |
| 2015/0084900 A1 | 3/2015 | Hodges |
| 2015/0138645 A1 | 5/2015 | Yoo et al. |
| 2015/0149668 A1 | 5/2015 | Joynes |
| 2015/0281422 A1 | 10/2015 | Kessler |
| 2016/0001176 A1 | 1/2016 | Chen |
| 2016/0107082 A1 | 4/2016 | Song |
| 2016/0149426 A1 | 5/2016 | Hodges |
| 2016/0231773 A1 | 8/2016 | Inoue et al. |
| 2016/0361627 A1 | 12/2016 | Fujita et al. |
| 2016/0361632 A1 | 12/2016 | Fujita et al. |
| 2016/0361633 A1 | 12/2016 | Fujita et al. |
| 2016/0361640 A1 | 12/2016 | Iwao et al. |
| 2016/0361641 A1 | 12/2016 | Koizumi et al. |
| 2017/0128830 A1 | 5/2017 | Fujita et al. |
| 2017/0136352 A1 | 5/2017 | Fujita et al. |
| 2017/0144062 A1 | 5/2017 | Iwao et al. |
| 2017/0242486 A1 | 8/2017 | Grant et al. |
| 2017/0282061 A1 | 10/2017 | Fujita et al. |
| 2018/0099218 A1 | 4/2018 | Ikuta et al. |
| 2018/0250588 A1 | 9/2018 | Winick |
| 2018/0345130 A1 | 12/2018 | Wells |

FOREIGN PATENT DOCUMENTS

| | | |
|---|---|---|
| CN | 1891322 | 1/2007 |
| CN | 201015711 | 2/2008 |
| CN | 101601931 | 12/2009 |
| CN | 101961554 | 2/2011 |
| CN | 202259500 | 5/2012 |
| CN | 102598126 | 7/2012 |
| CN | 102600611 | 7/2012 |
| CN | 202342834 U | 7/2012 |
| CN | 202355829 U | 7/2012 |
| CN | 202355828 U | 8/2012 |
| CN | 102671376 | 9/2012 |
| CN | 102681612 | 9/2012 |
| CN | 202817305 | 3/2013 |
| CN | 202817828 | 3/2013 |
| CN | 202860081 | 4/2013 |
| CN | 103328058 | 9/2013 |
| CN | 103736275 | 4/2014 |
| CN | 104014129 | 9/2014 |
| CN | 104043245 | 9/2014 |
| CN | 203816200 | 9/2014 |
| CN | 104107539 | 10/2014 |
| CN | 104258565 | 1/2015 |
| CN | 104307172 | 1/2015 |
| CN | 104353239 | 2/2015 |
| CN | 104368149 | 2/2015 |
| CN | 204147522 | 2/2015 |
| CN | 104 436 646 | 3/2015 |
| CN | 104383683 | 3/2015 |
| CN | 204182121 | 3/2015 |
| CN | 204208280 U | 3/2015 |
| CN | 204246818 U | 4/2015 |
| CN | 104645613 | 5/2015 |
| CN | 204380232 | 6/2015 |
| EP | 0 695 566 | 2/1996 |
| EP | 0 682 350 | 10/2002 |
| EP | 1 266 678 | 12/2002 |
| EP | 1475131 | 11/2004 |
| EP | 1 759 745 | 3/2007 |
| EP | 2 018 030 | 1/2009 |
| EP | 2 258 456 | 12/2010 |
| EP | 2 446 944 | 5/2012 |
| EP | 2 772 825 | 9/2014 |
| GB | 2 310 481 | 8/1997 |
| GB | 2 522 008 | 7/2015 |
| JP | 63-53873 | 3/1988 |
| JP | 06-077387 | 10/1994 |
| JP | 7-30429 U | 6/1995 |
| JP | H7-155465 | 6/1995 |
| JP | 11-076617 | 3/1999 |
| JP | 2002-018131 | 1/2002 |
| JP | 2002-182856 | 6/2002 |
| JP | 3089139 | 7/2002 |
| JP | 2003-18275 | 1/2003 |
| JP | 2003-140811 | 5/2003 |
| JP | 2004-33371 | 2/2004 |
| JP | 2004-146986 | 5/2004 |
| JP | 2004-201728 A | 7/2004 |
| JP | 2004-313492 | 11/2004 |
| JP | 2007-054114 | 3/2007 |
| JP | 2007-83013 | 4/2007 |
| JP | 2007-103380 | 4/2007 |
| JP | 2007-330389 | 12/2007 |
| JP | 4255510 | 4/2009 |
| JP | 2009-189169 | 8/2009 |
| JP | 2010-020742 | 1/2010 |
| JP | 2011-108256 | 6/2011 |
| JP | 2011-227804 | 11/2011 |
| JP | 2011-234744 | 11/2011 |
| JP | 2012-232025 | 11/2012 |
| JP | 2013-054548 | 3/2013 |
| JP | 2013-128744 | 7/2013 |
| JP | 2014-041528 | 3/2014 |
| JP | 2014-89578 | 5/2014 |
| JP | 2014-200620 | 10/2014 |
| JP | 2014-209373 | 11/2014 |
| JP | 2015/041465 | 3/2015 |
| JP | 6121034 | 4/2017 |

(56) References Cited

FOREIGN PATENT DOCUMENTS

| KR | 2003-0021435 | 3/2003 |
|---|---|---|
| TW | M470688 U | 1/2014 |
| TW | M474553 U | 3/2014 |
| WO | 2012/020409 | 2/2012 |
| WO | 2012/105098 | 8/2012 |
| WO | 2013/095703 | 6/2013 |
| WO | 2014/123828 | 8/2014 |
| WO | 2015/006680 | 1/2015 |
| WO | 2015/014663 | 2/2015 |
| WO | 2017/088739 A1 | 6/2017 |

OTHER PUBLICATIONS

[HotHot Review] Fujitsu "ARROWS Tab QH77/M FARQ77M", PC Watch [online], Dec. 25, 2013, Internet <URL: https://pc.watch.impress.co.jp/docs/column/hothot/628829.html> and English-language machine translation.
Notice of Reasons for Refusal dated Sep. 1, 2022 in Japanese Patent Application No. 2020-192584 with English-language machine translation.
Office Action dated Jun. 21, 2019 issued in Japanese Application No. 2016-123230.
Office Action dated Jun. 21, 2019 issued in Japanese Application No. 2016-123228.
European Search Report dated Nov. 17, 2016 issued in corresponding European Application No. 16173840.6 (4 pgs.).
Extended European Search Report dated Nov. 16, 2016 issued in corresponding European Application No. 16173842.2 (8 pgs.).
Office Action dated Aug. 2, 2019 issued in Japanese Application No. 2016-123229.
Office Action dated Aug. 6, 2019 issued in Japanese Application No. 2019-101136.
Decision of Refusal dated Oct. 8, 2019 in Japanese Patent Application No. 2016-123230 with English machine translation.
Capsule Hard Case for iPhone5: a case with cute home button which can encase iPhone completely, AppBank—iPhone, Let's find enjoyment of Smartphone, Jun. 1, 2013, searched on Sep. 26, 2019, URL, https://web.archive.org/web/20130601175553/http://www.appbank.net/2013/02/17/goodsbooks/547011.php.
Notice of Reasons for Refusal in Japanese Patent Application No. 2016-123229, dated Nov. 28, 2019.
European Search Report dated Nov. 3, 2016, issued in EP Application No. 16173841.1 (8 pages).
Phonejoy Play smartphone game controller hits Kickstarter, http://www.slashgear.com/phonejoy-play-smartphonegame-controller-hits-kickstarter-05259565/; downloaded Nov. 10, 2016, 9 pages.
Wikipad Gaming Tablet, http://www.gizorama.com/2013/news/wikipad-gaming-tablet-available-june-11; downloaded Nov. 10, 2016, 4 pages.
iFrogz's Caliber Advantage, https://www.engadget.com/2013/01/11/ifrogz-caliber-advantage-iphone-gaming-casehands-on/; downloaded Nov. 10, 2016, 7 pages.
Moga Ace Power iOS Game Controller, http://www.ign.com/articles/2013/11/20/moga-ace-power-ios-game-controllernow-available; downloaded Nov. 10, 2016, 6 pages.
PowerShell Controller + Battery, http://support.logitech.com/en_us/product/powershell-controller-and-battery; downloaded Nov. 10, 2016, 2 pages.
Game grip STG-ONE, http://gamegrip-stgone.com/en/index.php; downloaded Nov. 10, 2016, 7 pages.
PG-9023, http://www.ipega.hk/index.php?option=com_phocagallery &view=detail&catid=11%3Aiphone&id=1100%3Abluetooth-stetch-controller&Itemid=4&lang=en; downloaded Nov. 10, 2016, 2 pages.
Mad Catz Gamepads for Android and IOS, http://madcatz.com/gamesmart_lynx_9/; downloaded Nov. 10, 2016, 4 pages.
Gametel bluetooth controller for Android and iOS, https://www.engadget.com/2012/01/09/gametel-bluetooth-controllerfor-android-and-ios-hands-on/; downloaded Nov. 10, 2016, 7 pages.
SMACON-GP, http://dragonquestgame.net/use-bluetooth-controller-smacon/; downloaded Nov. 10, 2016, 9 pages.
Samsung Galaxy S4 Game Pad, http://www.geeky-gadgets.com/samsung-galaxy-s4-game-pad-21-03-2013/; downloaded Nov. 10, 2016, 5 pages.
PowerA's Moga Pro . . . , http://venturebeat.com/2013/01/14/poweras-moga-pro-gives-you-a-console-gaming-experiencewherever-you-go -hands-on-video/; downloaded Nov. 10, 2016, 5 pages.
IPEGA PG-9017 Wireless Bluetooth Controller, http://www.infinityreviews.com/2013/04/ipega-bluetooth-controllerreview.html; downloaded Nov. 10, 2016, 13 pages.
Bladepad, http://www.bladepad.com/; downloaded Nov. 10, 2016, 2 pages.
Razer Goes Mobile with Junglecat iOS Gaming Controller, http://www.razerzone.com/press/detail/press-releases/razer-goes-mobile-with-junglecat-ios-gaming-controller; downloaded Nov. 10, 2016, 5 pages.
European Search Report dated Jan. 2, 2017 issued in corresponding European Application No. 16193339.5 (4 pgs.).
European Search Report dated Feb. 23, 2017, issued in EP 16173843.0 (11 pages).
Iwao, Office Action dated Mar. 13, 2017, issued in U.S. Appl. No. 15/428,188 (17 pages).
Fujita, Notice of Allowance dated Mar. 31, 2017, issued in U.S. Appl. No. 15/179,011 (11 pages).
Koizumi, Office Action dated May 18, 2017, issued in corresponding U.S. Appl. No. 15/344,208, filed Nov. 4, 2016 (16 pages).
Koizumi, Office Action dated May 19, 2017, issued in corresponding U.S. Appl. No. 15/344,276, filed Nov. 4, 2016 (13 pages).
O-iPower, Sony Official Cradle, Jan. 2, 2015, https://www.youtube.com/watch?v=1ly5pOxOPmU, (1 page).
Office Action dated Jun. 2, 2017 issued in co-pending U.S. Appl. No. 15/418,426 (20 pgs.).
Office Action dated Sep. 26, 2017 issued in U.S. Appl. No. 15/418,426 (14 pgs.).
Office Action dated Sep. 27, 2017 issued in U.S. Appl. No. 15/344,276 (16 pgs.).
Extended European Search Report dated Nov. 8, 2017, issued in corresponding EP Application No. 17188271.5 (9 pages).
Office Action dated Dec. 5, 2017 issued in U.S. Appl. No. 15/344,208 (24 pgs.).
European Search Report dated Dec. 8, 2017, issued in corresponding European Application No. 17191339.5 (5 pages).
Office Action dated Feb. 9, 2018 issued in U.S. Appl. No. 15/418,426 (13 pgs.).
Office Action dated Jun. 27, 2018 issued in Furuike, et al., U.S. Appl. No. 15/292,359, filed Oct. 13, 2016 (17 pages).
Office Action dated Aug. 3, 2018 issued in Japanese Application No. 2017-127616 (5 pgs.).
Anonymous, Wii Remote Configurations/Wii/Support/Nintendo, Nov. 20, 2006 (3 pages).
Official Communication dated Sep. 17, 2018, issued in corresponding EP Application No. 16173843.0 (7 pages).
Office Action dated Oct. 5, 2018 issued in U.S. Appl. No. 16/029,011 (16 pgs.).
Office Action dated Nov. 8, 2018 issued in Japanese Application No. 2017-127616 (3 pgs.).
Office Action dated Nov. 2, 2018 issued in Japanese Application No. 201680002061.9 (9 pages).
Office Action dated Nov. 2, 2018 issued in Chinese Application No. 201680002061.9 (9 pages).
Office Action dated Jan. 11, 2019 issued in U.S. Appl. No. 15/178,984 (26 pgs.).
Office Action dated Nov. 20, 2019 in corresponding Chinese Application No. 201910481000, 6 pages.
International Search Report dated Aug. 31, 2016 in International Application No. PCT/JP2016/067337, 3 pages.
European Search Report dated Dec. 8, 2017 in European Application No. 17191339.5, 5 pages.
Office Action dated Jun. 14, 2018 in U.S. Appl. No. 15/344,208, 23 pages.
Notice of Allowance dated Feb. 4, 2019 in U.S. Appl. No. 15/292,359, 8 pages.

(56) References Cited

OTHER PUBLICATIONS

Notice of Reasons for Refusal dated Feb. 27, 2019 in Japanese Application No. 2017-011929, 6 pages.
European Search Report dated Apr. 15, 2019 in European Application No. 18207863.4, 6 pages.
Search Report dated Feb. 26, 2020 in corresponding Chinese Application No. 201910977032.X, 5 pages.
Decision of Refusal dated Mar. 13, 2020 in corresponding Japanese Application No. 2016-123229, 2 pages.
Notice of Reasons for Refusal dated May 25, 2020 in corresponding Japanese Application No. 2016-123227, 6 pages.
Extended European Search Report dated Apr. 2, 2020 in corresponding European Application No. 20154678.5, 11 pages.
Yukiko Sato, "At last storing/sharing of screen shot with Xbox One is available due tothe update in March", IT Media NEWS [online], Feb. 19, 2015, [searched on May 27, 2020], Internet, 4 pages. https://www.itmedia.co.jp/news/articles/1502/19/news088.html.
Notice of Reasons for Refusal dated Jun. 11, 2020 in Japanese Patent Application No. 2017-062651, (with English machine translation), 14 pages.
Office Action dated Sep. 3, 2020 in corresponding Chinese Application No. 202010116452.1, 10 pages.
Office Action dated Oct. 30, 2020 in corresponding Chinese Application No. 202010092531.3, 5 pages.
Notice of Reasons for Refusal dated Nov. 17, 2020 in corresponding Japanese Application No. 2016-123227, 3 pages.
Extended European Search Report dated Feb. 18, 2021 in corresponding European Application No. 20217192.2, 12 pages.
Notice of Allowance dated Jun. 10, 2021 in U.S. Appl. No. 16/788,362.
Search Report dated Sep. 27, 2021 in counterpart Chinese Patent Application No. 202110358173.0 and English-language translation.
English-language machine translation of CN104645613, published May 27, 2015.
English-language machine translation of CN204208280U, published Mar. 18, 2015.
English-language machine translation of JP 2014-200620.
U.S. Appl. No. 15/179,022, filed Jun. 10, 2016, now U.S. Pat. No. 10,583,356.
U.S. Appl. No. 16/735,838, filed Jan. 7, 2020.
Wikipedia The Free Encyclopedia, Webpage regarding DualShock 1 and 2, https://en.wikipedia.org/wiki/DualShock, downloaded on Feb. 17, 2023, 4 pages.
Notice of Allowance dated Nov. 30, 2022 in U.S. Appl. No. 17/469,038.
Final Office Action dated Dec. 8, 2022 in U.S. Appl. No. 17/369,672.

* cited by examiner

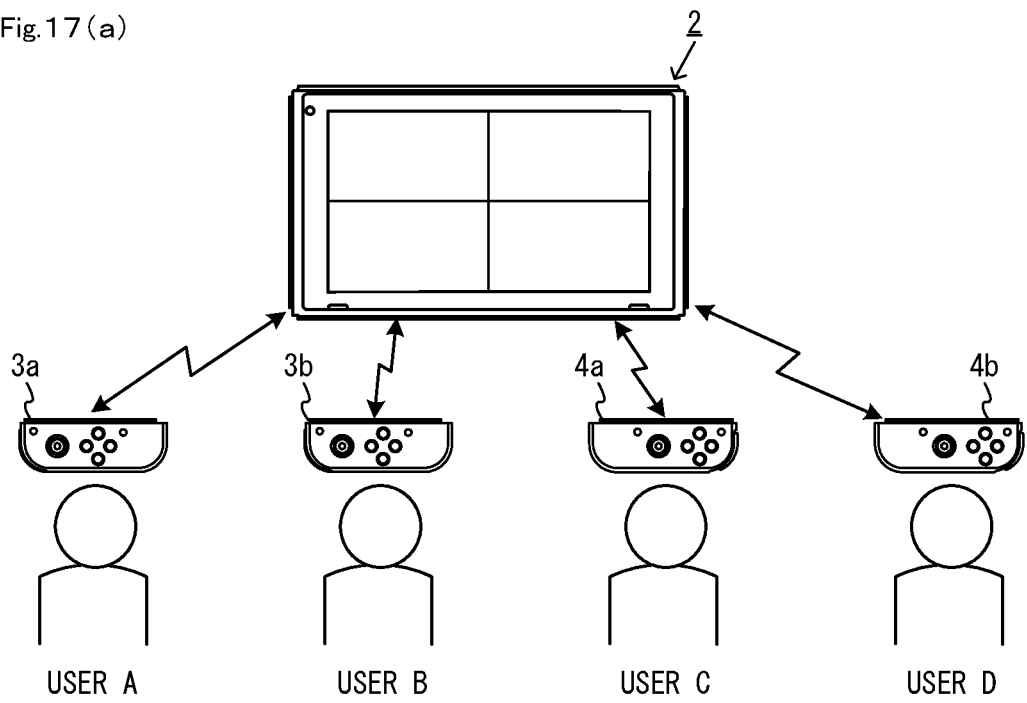
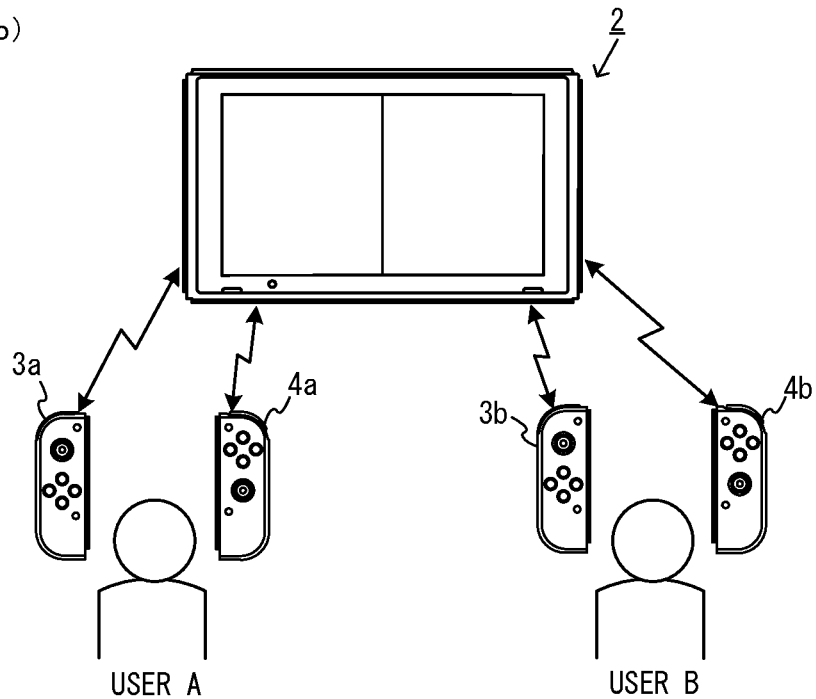

Fig.21

| REGISTRATION INFORMATION | | |
|---|---|---|
| NUMBER INFORMATION | IDENTIFICATION INFORMATION | WIRELESS COMMUNICATION INFORMATION |
| 1 | ○○○○ | REGISTERED |
| 2 | ×××× | REGISTERED |
| 3 | △△△△ | UNREGISTERED |
| ⋮ | ⋮ | ⋮ |

Fig.22

| PAIRING INFORMATION | |
|---|---|
| LEFT IDENTIFICATION INFORMATION | RIGHT IDENTIFICATION INFORMATION |
| ○○○○ | × × × × |
| △△△△ | ◆◆◆◆ |
| ⋮ | ⋮ |

INFORMATION PROCESSING SYSTEM, INFORMATION PROCESSING DEVICE, CONTROLLER DEVICE AND ACCESSORY

CROSS REFERENCE TO RELATED APPLICATIONS

This application is a divisional of application Ser. No. 16/735,838, filed Jan. 7, 2020, which is a divisional of U.S. application Ser. No. 15/179,022 filed Jun. 10, 2016, now U.S. Pat. No. 10,583,356, which claims priority to Japanese Patent Application No. 2015-119707 filed on Jun. 12, 2015. The contents of each of these applications are incorporated herein in their entirety.

FIELD

The present technique relates to an information processing system, an information processing device, a controller device and an accessory.

BACKGROUND AND SUMMARY

There are conventional portable information processing devices including a display section and an operation section.

Desirably, an information processing device can be used in different modes.

Thus, the present application discloses an information processing device that can be used in different modes. Also, the present application discloses a novel information processing device.

An example information processing system described herein includes a main unit, a first controller device and a second controller device. The main unit includes a display. The first controller device is configured to be removably attached to the main unit, and the first controller device is configured to transmit first operation data representing an operation performed on the first controller device to the main unit, irrespective of whether the first controller device is attached to the main unit. The second controller device is configured to be removably attached to the main unit, and the second controller device is configured to transmit second operation data representing an operation performed on the second controller device to the main unit, irrespective of whether the second controller device is attached to the main unit. The main unit is configured to display, on the display, an execution result of an information process based on the first operation data transmitted from the first controller device and the second operation data transmitted from the second controller device.

The first controller device may include a first input section and a second input section. The second controller device may include a third input section of the same type as the first input section and a fourth input section of the same type as the second input section.

The first input section may have substantially the same input mechanism as the third input section. The second input section may have substantially the same input mechanism as the fourth input section.

The first input section may have substantially the same shape as the third input section. The second input section may have substantially the same shape as the fourth input section.

When the first controller device and the second controller device are detached from the main unit, a positional relationship between the first input section and the second input section of the first controller device placed in a predetermined orientation may be the same as a positional relationship between the third input section and the fourth input section of the second controller device placed in a predetermined orientation.

When the first controller device and the second controller device are attached to the main unit, a positional relationship between the first input section and the second input section may be opposite from a positional relationship between the third input section and the fourth input section.

The first input section and the third input section may each be a directional input section configured to accept a directional input.

The directional input section may include an operation member configured to be tilted or slid in a predetermined direction.

The second input section and the fourth input section may each be a button which can be pressed.

The first controller device may be configured to be integrally attached to the main unit with a predetermined surface of a housing of the first controller device facing a predetermined surface of the main unit.

The first controller device may be configured to be integrally attached to the main unit so as to be facing one of a left side surface and a right side surface of the main unit. The second controller device may be configured to be attached to the main unit so as to be facing the other one of the left side surface and the right side surface of the main unit.

The first controller device may include a light-emitting portion on the predetermined surface for notifying a user of predetermined information.

The first controller device may include an operation section on the predetermined surface.

A connecting portion between a first side surface of four side surfaces of the first controller device and a side surface adjacent to the first side surface may have a more rounded shape than a connecting portion between a second side surface of the four side surfaces, which is opposite from the first side surface, and a side surface adjacent to the second side surface. A connecting portion between a third side surface of four side surfaces of the second controller device and a side surface adjacent to the third side surface may have a more rounded shape than a connecting portion between a fourth side surface of the four side surfaces, which is opposite from the third side surface, and a side surface adjacent to the fourth side surface.

The first controller device may be attached to the main unit with the second side surface of the first controller device facing a fifth side surface of four side surfaces of the main unit. The second controller device may be attached to the main unit with the fourth side surface of the second controller device facing a sixth side surface, which is opposite from the fifth side surface, of the main unit.

The second controller device may include an input section having a first function, the first controller device not having the first function.

The second controller device may include an image-capturing device as an input section having the first function.

The second controller device may include a button as an input section having the first function.

The first controller device may include an input section having a second function different from the first function. The second controller device may include an input section having the second function.

The first controller device may include one or more input section having a predetermined number of types of functions. The second controller device may include one or more input section having a number of types of functions, the number being different from the predetermined number.

Communication between the main unit and the first controller device when the first controller device is attached to the main unit may use a first communication scheme, and communication between the main unit and the first controller device when the first controller device is detached from the main unit may use a second communication scheme different from the first communication scheme.

Communication between the main unit and the first controller device when the first controller device is detached from the main unit may be wireless communication.

Communication between the main unit and the first controller device when the first controller device is attached to the main unit may be wired communication.

The wired communication between the main unit and the first controller device is communication through a wired communication channel formed by an electrical connection a first terminal of the main unit and a second terminal of the first controller device.

When the first controller device is attached to the main unit, a first terminal of the main unit and a second terminal of the first controller device may be electrically connected to each other, and communication between the main unit and the first controller device and power supply from the main unit to the first controller device may be implemented through the first terminal and the second terminal.

The information processing system may include: a first sensor configured to sense attachment of the first controller device to the main unit; and a second sensor configured to sense attachment of the second controller device to the main unit. The main unit may register, as a set, the first controller device and a second controller device based on a sensing result from the first sensor and the sensing result from the second sensor.

When a first controller device and a second controller device are both attached to the main unit, the main unit may register, as a set, the first controller device and the second controller device attached thereto.

If operation data is received from each of a first controller device and a second controller device registered as a set, with the first controller device and the second controller device detached from the main unit, the main unit may execute a predetermined information process using the two received operation data as a set.

The main unit may include a housing including a first engagement portion configured for engagement with a housing of the first controller device when the first controller device is attached to the main unit, and a second engagement portion configured for engagement with a housing of the second controller device when the second controller device is attached to the main unit.

The first controller device may include a housing including a third engagement portion configured for engagement with the first engagement portion of the main unit. The second controller device may include a housing including a fourth engagement portion configured for engagement with the second engagement portion of the main unit.

The main unit may selectively output an execution result of the information process either to the display or to a display device separate from the main unit.

Another example information processing device described herein includes a first attachment and detachment mechanism, a second attachment and detachment mechanism and a display. The first attachment and detachment mechanism is configured to be removably attached to a first controller device thereto. The second attachment and detachment mechanism is configured to be removably attached of a second controller device thereto. The information processing device displays a result of an information process based on operation data transmitted from the first controller device and the second controller device on the display, irrespective of whether the first controller device and the second controller device are attached to the information processing device.

Another example information processing system described herein includes a main unit and a first controller device.

The main unit includes: a display; and a housing including a main unit-side engagement portion configured for engagement with a housing of the first controller device. The first controller device is configured to be removably attached to the main unit by means of the main unit-side engagement portion.

The first controller device may include a housing including a controller device-side engagement portion configured for engagement with the main unit-side engagement portion.

The main unit-side engagement portion may include a first slide member including a surface of the housing of the main unit. The first controller device may include a second slide member configured for slidable and detachable engagement with the first slide member. The first slide member and the second slide member may together comprise a slide mechanism.

The first slide member may be configured for slidable engagement with the second slide member in a predetermined direction, and the first slide member may be configured to allow the second slide member to be inserted into and detached from the first slide member via one end of the first slide member in the predetermined direction.

The first slide member may be including an up-down direction of the main unit and may be configured to allow the second slide member to be inserted into and detached from the first slide member via an upper end of the first slide member.

The first slide member may be configured to extend generally over an entirety of a surface of the housing of the main unit in a predetermined direction.

The first slide member may have a C-shaped cross section. The second slide member may have a T-shaped cross section.

The first controller device may include a terminal for communicating with the main unit. The main unit may include a terminal on the housing thereof at such a location to allow the terminal to be connected to the terminal of the first controller device when the first controller device is attached to the main unit.

The first controller device may include an input section on the predetermined surface.

Another example information processing system described herein includes a main unit and a controller device configured to be removably attached to the main unit. The main unit includes a display. Communication between the main unit and the controller device when the controller device is attached to the main unit may use a first communication scheme. Communication between the main unit and the controller device when the controller device is detached from the main unit may use a second communication scheme different from the first communication scheme.

The first communication scheme may be wired communication.

When the controller device is attached to the main unit, the first terminal of the main unit and the second terminal of the controller device may be electrically connected to each other via contact.

The second communication scheme may be wireless communication.

Another example information processing system described herein includes a main unit, a first controller device, a second controller device and an accessory. The first controller device is configured to be removably attached to the main unit and to be removably attached to the accessory. The second controller device is configured to be removably attached to the main unit and to be removably attached to the accessory. The main unit includes a display and displays, on the display, an execution result of an information process based on an operation performed on the first controller device and the second controller device. The accessory is configured to be attached of the first controller device and the second controller device thereto at the same time.

The accessory may include a charging control section configured to use power supplied to the accessory to charge one or both of the first controller device and the second controller device attached to the accessory.

The first controller device may be configured to be attached to the accessory on a left side of a center of the accessory. The second controller device may be configured to be attached to the accessory on a right side of the center of the accessory.

The accessory may include a first grip portion on a left side of a center of the accessory and a second grip portion on a right side of the center of the accessory.

The first grip portion may be on a left side of an area where the first controller device is attached. The second grip portion may be on a right side of an area where the second controller device is attached.

When the first controller device is attached to the accessory, communication between the main unit and the first controller device may be wireless communication. When the second controller device is attached to the accessory, communication between the main unit and the second controller device may be wireless communication.

The first controller device may be configured to be attached to the accessory with a tilt in a first direction from a reference attitude. The second controller device may be configured to be attached to the accessory with a tilt in a direction opposite to the first direction from a reference attitude.

When at least one of the first controller device and the second controller device is attached to the accessory, the main unit may execute the information process while modifying operation data obtained from the at least one controller device attached to the accessory and/or modifying information obtained based on the operation data.

The main unit may be configured to modify data from a directional input section, of all the operation data.

An example accessory described herein is an accessory to which a first controller device and a second controller device are removably attachable.

The first controller device is configured to be removably attached to a main unit separate from the accessory. The second controller device is configured to be removably attached to the main unit. The main unit includes a display and is configured to display, on the display, an execution result of an information process based on an operation performed on the first controller device and the second controller device. The accessory includes: a first engagement portion configured for detachable engagement with the first controller device; and a second engagement portion configured for detachable engagement with the second controller device.

An example game system described herein includes a main unit, a first controller device and a second controller device. The main unit includes a display. The first controller device is configured to be removably attached to the main unit. The second controller device is configured to be removably attached to the main unit. At least when the first controller device and the second controller device are detached from the main unit, each of the first controller device and the second controller device transmits, to the main unit, via wireless communication, operation data representing an operation performed thereon.

An example information processing device described herein is a hand-held information processing device. The information processing device includes a main section including a display, a first controller section and a second controller section, and the information processing device is configured to perform a information process in response to an operation performed on either the first controller section or the second controller section. The first controller section is configured to be removably attached to the main section. The second controller section is configured to be removably attached to the main section. When the first controller section and the second controller section are detached from the main section, the main unit is configured to perform the information process based on operation data representing an operation performed on at least one of the first controller section and the second controller section, and displays a result of the information process on the display.

When the first controller section and the second controller section are attached to the main section, the first controller section can be operated by one hand of a user and the second controller section can be operated by the other hand of the user.

The present specification also discloses an example of an information processing device, a controller device or an accessory of the information processing system. The present specification also discloses an example of a method to be carried out in the information processing system. The present specification also discloses an example of a computer-readable storage medium storing therein an information processing program which causes a computer to execute some of the processes to be executed on the information processing system or the information processing device (in other words, causes a computer to function as some of the various units of the information processing system or the information processing device).

With the information processing system, the information processing device and the accessory set forth above, an information processing device and/or an information processing system can be used in different modes.

These and other objects, features, aspects and advantages will become more apparent from the following detailed description when taken in conjunction with the accompanying drawings.

BRIEF DESCRIPTION OF THE DRAWINGS

FIG. 17(a) is a diagram showing an example mode of use in which a main unit communicates with each of four controllers;

FIG. 17(b) is a diagram showing each user using a pair of controllers;

FIGS. 19(a), 19(b), 19(c) and 19(d) are diagrams showing an example operation flow where the image is displayed on a TV;

FIG. 21 is a diagram showing an example of registration information;

FIG. 22 is a diagram showing an example of pairing information;

DETAILED DESCRIPTION OF NON-LIMITING EXAMPLE EMBODIMENTS

An information processing system, an information processing device, a controller device and an accessory according to an example of the present embodiment will now be described. In the present embodiment, the information processing system includes an information processing device 1 and a cradle 5 (see FIG. 9). The information processing device 1 of the present embodiment includes a main unit 2 and controllers 3 and 4, which can be attached to and detached from each other, and the controllers 3 and 4 can be used separately from the main unit 2 (see FIG. 2). The information processing device 1 can be used both in a mode of use in which the image is displayed on the main unit 2 and in another mode of use in which the image is displayed on a separate display device such as a TV. The information processing device 1 is used as a portable device (e.g., a portable game device) in the former mode, and the information processing device 1 is used as a console-type device (e.g., a console-type game device) in the latter mode.

1. External Configuration of System

[1-1. Configuration of Information Processing Device]

Figure 1:
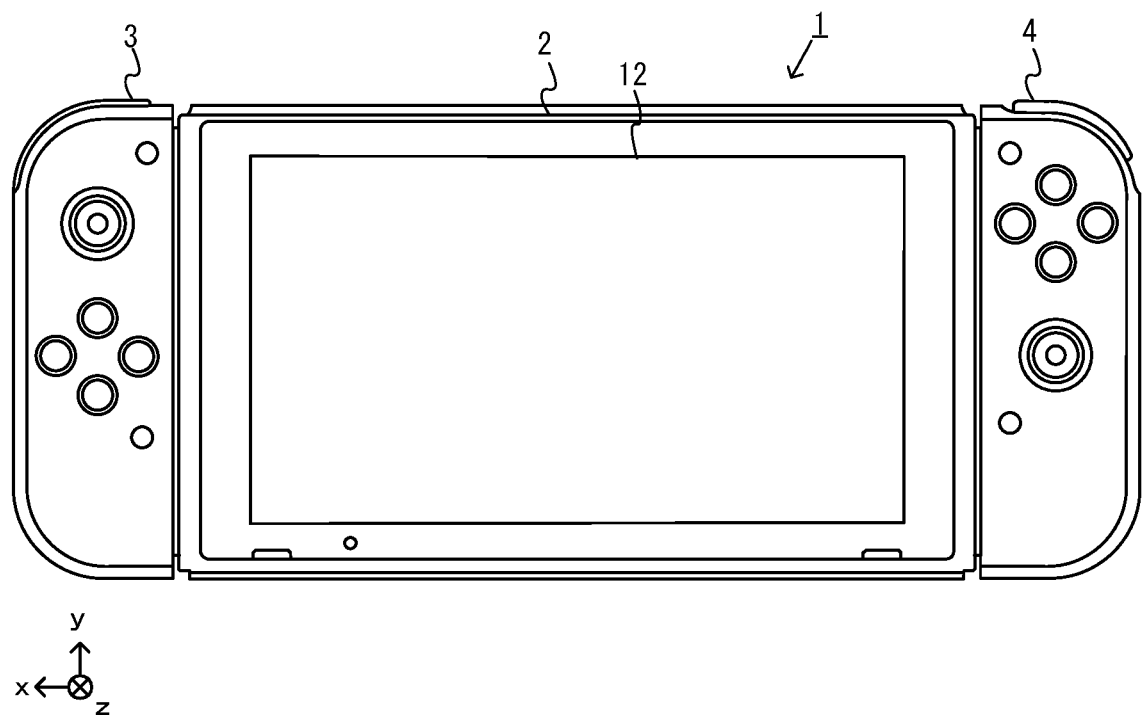
FIG. 1 is a diagram showing an example information processing device according to the present embodiment.

FIG. 1 is a diagram showing an example information processing device 1 according to the present embodiment. As shown in FIG. 1, the information processing device 1 includes a main unit 2, a left controller 3 and a right controller 4. The main unit 2, including a display 12, executes various processes of the information processing device 1. The controllers 3 and 4 each include an operation section allowing a user to provide an input.

Figure 2:
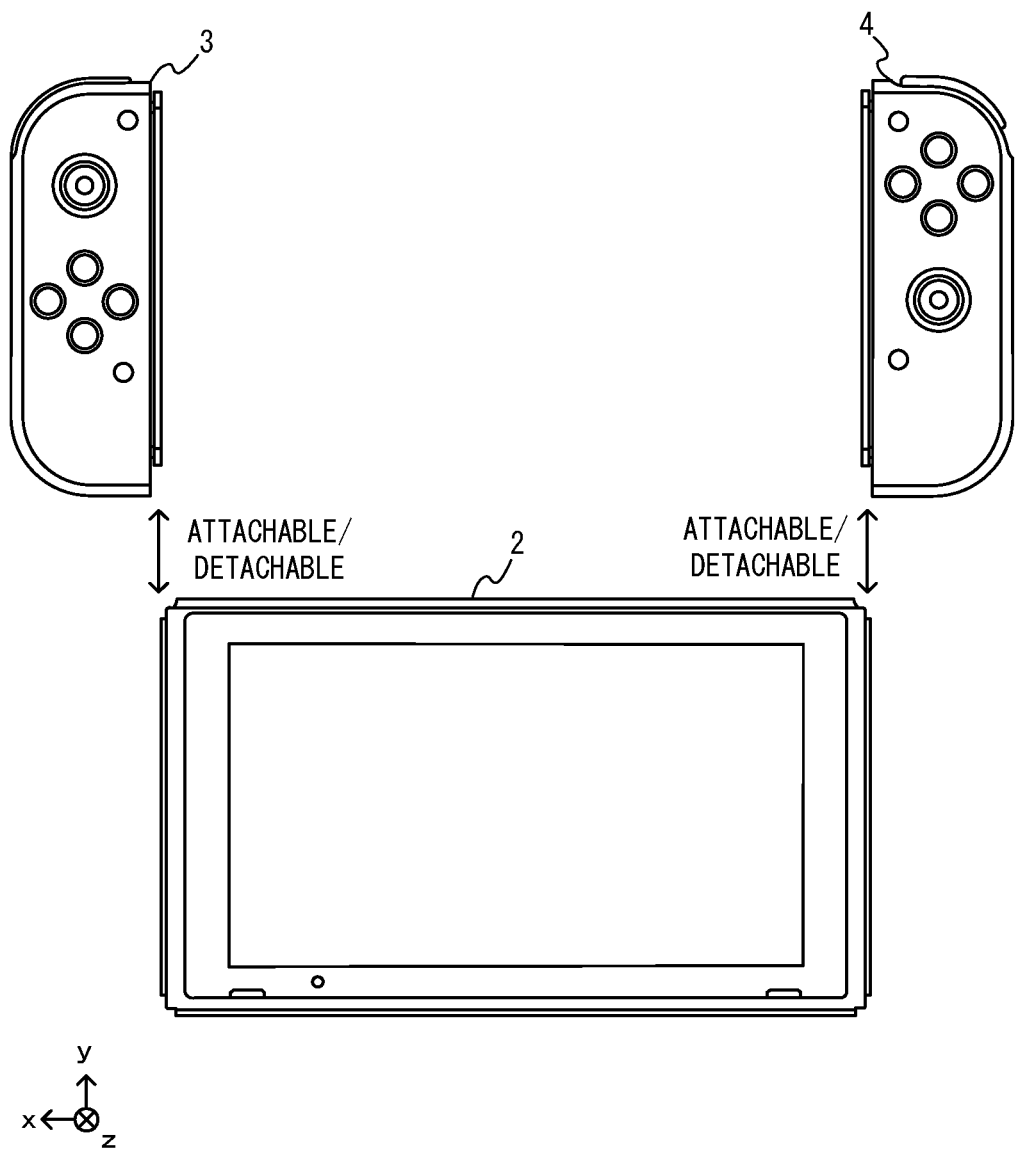
FIG. 2 is a diagram showing an example where controllers are detached from a main unit.

FIG. 2 is a diagram showing an example where the controllers 3 and 4 are detached from the main unit 2. As shown in FIG. 1 and FIG. 2, the controllers 3 and 4 can be attached to and detached from the main unit 2. The left controller 3 can be attached to the left side of the main unit 2 (the x-axis positive direction side shown in FIG. 1). The right controller 4 can be attached to the right side of the main unit 2 (the x-axis negative direction side shown in FIG. 1). Note that the left controller and the right controller may be referred to generally as "controllers". A specific example configuration of the main unit 2 and the controllers 3 and 4 will now be described.

[1-1-1. Configuration of Main Unit]

Figure 3:
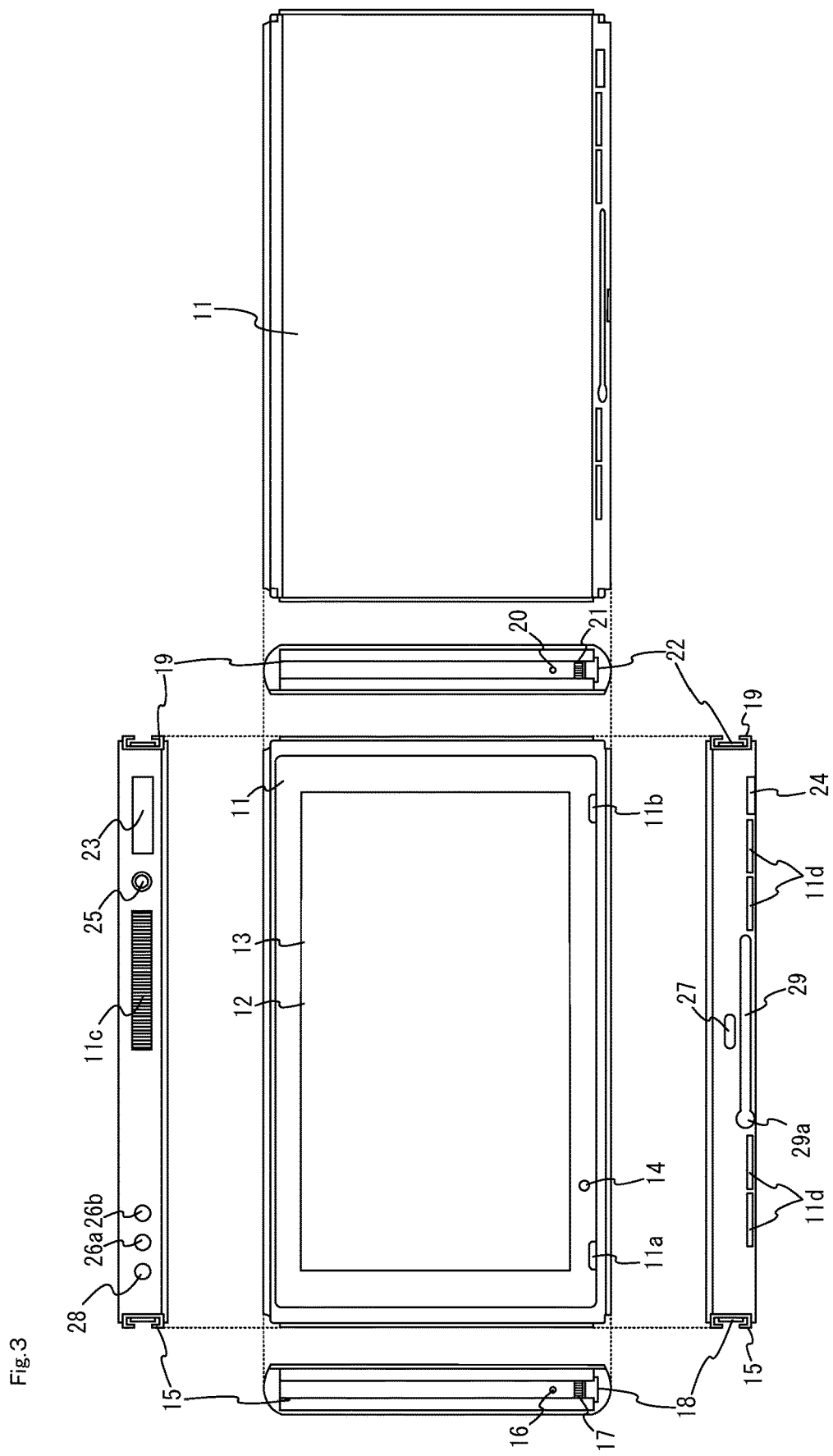
FIG. 3 is a six-sided view showing an example main unit.

FIG. 3 is a six-sided view showing an example main unit. As shown in FIG. 3, the main unit 2 includes a generally plate-shaped housing 11. In the present embodiment, the primary surface (in other words, the front-side surface, i.e., the surface on which the display 12 is provided) of the housing 11 has a generally rectangular shape. In the present embodiment, the housing 11 has a horizontally-elongated shape. That is, in the present embodiment, the longitudinal direction of the primary surface of the housing 11 (i.e., the x-axis direction shown in FIG. 1) is denoted as the horizontal direction (also referred to as the left-right direction), the width direction of the primary surface (i.e., the y-axis direction shown in FIG. 1) is denoted as the vertical direction (also referred to as the up-down direction), and the direction perpendicular to the primary surface (i.e., the z-axis direction shown in FIG. 1) is denoted as the depth direction (also referred to as the front-rear direction). Note that the main unit 2 may be used in a landscape position or may be used in a portrait position.

Note that there is no particular limitation on the shape and the size of the housing 11. For example, in other embodiments, the housing 11 may include a projection or a grip portion for making it easier for a user to hold the device.

(Elements Provided on Primary Surface of Housing 11)

As shown in FIG. 3, the main unit 2 includes the display 12 provided on the primary surface of the housing 11. The display 12 displays an image (which may be a still image or a video image) obtained or produced by the main unit 2. While the display 12 is assumed to be a liquid crystal display device (LCD) in the present embodiment, it may be any type of a display device.

The main unit 2 includes a touch panel 13 on the screen of the display 12. In the present embodiment, the touch panel 13 is of a type (e.g., the capacitive type) that enables a multi-touch input. Note however that there is no particular limitation on the type of the touch panel 13, and the touch panel 13 may be of a type (e.g., the resistive type) that enables a single-touch input, for example.

The main unit 2 includes a speaker (i.e., a speaker 88 shown in FIG. 11) inside the housing 11. As shown in FIG. 3, speaker holes 11a and 11b are formed in the primary surface of the housing 11. Output sounds from the speaker 88 are output through these speaker holes 11a and 11b. In the present embodiment, the main unit 2 includes two speakers, and speaker holes are located respectively for the left speaker and the right speaker. The speaker hole 11a for the left speaker is formed in a left portion of the display 12. The speaker hole 11b for the right speaker is formed in a right portion of the display 12.

The main unit 2 also includes an ambient light sensor (i.e., an ambient light sensor 94 shown in FIG. 11) inside the housing 11. As shown in FIG. 3, a window portion 14 is provided in the primary surface of the housing 11 so as to allow light from outside the housing 11 to be received by the ambient light sensor 94. The window portion 14 is provided for example as a transparent member that allows light to pass therethrough, or a filter member that allows light of a predetermined wavelength that can be sensed by the ambient light sensor 94 to pass therethrough.

Note that there is no particular limitation on the position, the shape and the number of the speaker holes 11a and 11b and the window portion 14. For example, in other embodiments, the speaker holes 11a and 11b may be provided on the side surface or the back surface of the housing 11. While the window portion 14 is provided on the lower left side of the display 12 in the present embodiment, it may be provided in any other position on the primary surface of the housing 11 or may be provided on the side surface of the housing 11.

(Elements Provided on Left Side Surface of Housing 11)

As shown in FIG. 3, the main unit 2 includes a left rail member 15 on the left side surface of the housing 11. The left rail member 15 is a member that allows the left controller 3 to be detachably attached to the main unit 2. The left rail member 15 is provided so as to extend in the up-down direction on the left side surface of the housing 11. The left rail member 15 has such a shape that can engage with a slider of the left controller 3 (i.e., a slider 40 shown in FIG. 5). The left rail member 15 and the slider 40 together form a slide mechanism, the details of which will be described later. This slide mechanism allows the left controller 3 to be slidably and detachably attached to the main unit 2.

In the present embodiment, the left rail member 15 has a shape with a groove. In other words, the cross section (specifically, the cross section perpendicular to the up-down direction) of the left rail member 15 is C-shaped. More specifically, the cross section of the left rail member 15 is such that the end portions of the cross section extend in the outside-to-center direction. Therefore, the slider 40 in engagement with the left rail member 15 is securely locked so as not to come off in the direction perpendicular to the sliding direction (in other words, the direction in which the left rail member 15 extends) (see FIG. 7 to be discussed below).

As shown in FIG. 3, the left rail member 15 is provided with an engagement hole 16. The engagement hole 16 is located so as to face a projection 41 provided on the slider 40 when the left controller 3 is attached to the main unit 2. There is no particular limitation on the specific position of the engagement hole 16. In the present embodiment, the engagement hole 16 is provided on the bottom surface of the left rail member 15 (in other words, the bottom surface of the groove of the left rail member 15). The engagement hole 16 is shaped so that the projection (i.e., the projection 41 shown in FIG. 5) can engage with the engagement hole 16. When the left controller 3 is attached to the main unit 2, the projection 41 is inserted into and engages with the engagement hole 16, thereby locking the left controller 3 to the main unit 2, the details of which will be described later. Note that in other embodiments, the left rail member 15 may be provided with a projection and the slider 40 may be provided with an engagement hole.

The main unit 2 includes a left-side terminal 17. The left-side terminal 17 allows the main unit 2 to communicate with the left controller 3 in wired communication. The left-side terminal 17 is located so as to be in contact with the terminal of the left controller 3 (a terminal 42 shown in FIG. 5) when the left controller 3 is attached to the main unit 2. There is no particular limitation on the specific position of the left-side terminal 17. In the present embodiment, as shown in FIG. 3, the left-side terminal 17 is provided on the bottom surface of the left rail member 15. In the present embodiment, the left-side terminal 17 is provided near the lower end on the bottom surface of the left rail member 15. The left-side terminal 17 is provided below the engagement hole 16 (in other words, on the far side with respect to the direction in which the slider 40 is inserted into the left rail member 15).

A stopper 18 is provided on the left side surface of the housing 11. As shown in FIG. 3, the stopper 18 is provided near the end (in the present embodiment, near the lower end) of the left rail member 15. The stopper 18 is provided inside the groove of the left rail member 15. The stopper 18 is provided in order to limit the slide of the slider 40 in engagement with the left rail member 15, the details of which will be described later.

(Elements Provided on Right Side Surface of Housing 11)

As shown in FIG. 3, similar elements to those provided on the left side surface of the housing 11 are provided on the right side surface of the housing 11. That is, the main unit 2 includes a right rail member 19 on the right side surface of the housing 11. The right rail member 19 is provided so as to extend in the up-down direction on the right side surface of the housing 11. The right rail member 19 has such a shape that it can engage with a slider of the right controller 4 (i.e., a slider 62 shown in FIG. 6). The right rail member 19 and the slider 62 together form a slide mechanism, the details of which will be described later. This slide mechanism allows the right controller 4 to be slidably and detachably attached to the main unit 2.

In the present embodiment, the right rail member 19 has a similar shape to that of the left rail member 15. That is, the right rail member 19 has a shape with a groove whose cross-sectional shape is similar to that of the left rail member 15. Note however that the right rail member 19 does not need to have exactly the same shape as that of the left rail member 15. For example, in other embodiments, the groove of the left rail member 15 and the groove of the right rail member 19 may differ from each other in terms of the size and/or the shape so that the slider 62 of the right controller 4 cannot engage with the left rail member 15 (and/or so that the slider 40 of the left controller 3 cannot engage with the right rail member 19).

As shown in FIG. 3, the right rail member 19 is provided with an engagement hole 20. The engagement hole 20 is located so as to face a projection 63 provided on the slider 62 when the right controller 4 is attached to the main unit 2. There is no particular limitation on the specific position of the engagement hole 20. In the present embodiment, the engagement hole 20 is provided on the bottom surface of the right rail member 19 (in other words, the bottom surface of the groove of the right rail member 19). The engagement hole 20 is shaped so that the projection (i.e., the projection 63 shown in FIG. 6) can engage with the engagement hole 20. When the right controller 4 is attached to the main unit 2, the projection 63 is inserted into and engages with the engagement hole 20, thereby locking the right controller 4 to the main unit 2, the details of which will be described later. Note that in other embodiments, the right rail member 19 may be provided with a projection and the slider 62 with an engagement hole.

The main unit 2 includes a right-side terminal 21. The right-side terminal 21 allows the main unit 2 to communicate with the right controller 4 in wired communication. The right-side terminal 21 is located so as to be in contact with the terminal of the right controller 4 (a terminal 64 shown in FIG. 6) when the right controller 4 is attached to the main unit 2. There is no particular limitation on the specific position of the right-side terminal 21. In the present embodiment, as shown in FIG. 3, the right-side terminal 21 is provided on the bottom surface of the right rail member 19. In the present embodiment, the right-side terminal 21 is provided near the lower end on the bottom surface of the right rail member 19. The right-side terminal 21 is provided below the engagement hole 20 (in other words, on the far side with respect to the direction in which the slider 62 is inserted into the right rail member 19).

A stopper 22 is provided on the right side surface of the housing 11. As shown in FIG. 3, the stopper 22 is provided near the end (in the present embodiment, near the lower end) of the right rail member 19. The stopper 22 is provided inside the groove of the right rail member 19. The stopper 22 is provided in order to limit the slide of the slider 62 in engagement with the right rail member 19, the details of which will be described later.

As described above, in the present embodiment, the housing 11 of the main unit 2 is provided with the left rail member 15 and the right rail member 19. Thus, the housing 11 is configured on the assumption that controllers are attached thereto. Note that there is no particular limitation on the position, the shape and the size of the rail members 15 and 19. For example, in other embodiments, the rail members 15 and 19 may be provided on the left and right end portions, respectively, on the primary surface and/or the reverse surface of the housing 11. There is no particular limitation on the mechanism for allowing the controllers 3 and 4 to be detachably attached to the main unit 2, and a slider mechanism different from that of the present embodiment may be used, or a mechanism different from a slider mechanism may be used.

(Elements Provided on Upper Side Surface of Housing 11)

As shown in FIG. 3, the main unit 2 includes a first slot 23. The first slot 23 is provided on the upper side surface of the housing 11. The first slot 23 is shaped so as to accommodate a storage medium of a first type. Note that in the present embodiment, a cover that can be opened/closed is provided for the opening of the first slot 23, and a storage medium of the first type can be inserted into the first slot 23 with the cover being open. A storage medium of the first type is, for example, a dedicated storage medium (e.g., a dedicated memory card) for the information processing device 1 or other information processing devices of the same type. The storage medium of the first type is used, for example, for storing data used in the main unit 2 (e.g., application save data, etc.) and/or for storing programs to be executed on the main unit 2 (e.g., application programs, etc.).

The main unit 2 also includes a power button 28. As shown in FIG. 3, the power button 28 is provided on the upper side surface of the housing 11. The power button 28 is a button for turning ON/OFF the power of the main unit 2. Note that in the present embodiment, the power button 28 can be used to switch between the ON mode and the sleep mode. The ON mode is a mode in which the screen display of the display 12 is turned on, for example, and the sleep mode is a mode in which the screen display of the display 12 is turned off, for example. In the sleep mode, in addition to (or instead of) turning off the screen display of the display 12, a predetermined process of the application (e.g., a game process of a game application) may be stopped. When a long-press operation is performed on a power button 28 (specifically, when the power button 28 is held down for a predetermined period of time or longer), the main unit 2 executes a process of turning ON/OFF the power of the main unit 2. On the other hand, when a short-press operation is performed on the power button 28 (specifically, when the power button 28 is held down for a period of time that is shorter than the predetermined period of time), the main unit 2 executes a process of switching between the ON mode and the sleep mode.

As described above, in the present embodiment, the power button 28 can be used to turn the power ON/OFF and to switch between the ON mode and the sleep mode. Note that in other embodiments, the main unit 2 may be provided with a button only for the function of turning the power ON/OFF or only for the function of switching between the ON mode and the sleep mode.

The main unit 2 includes a sound input/output terminal (specifically, an earphone jack) 25. That is, the main unit 2 allows a microphone or an earphone to be attached to the sound input/output terminal 25. As shown in FIG. 3, the sound input/output terminal 25 is provided on the upper side surface of the housing 11.

The main unit 2 includes sound volume buttons 26a and 26b. As shown in FIG. 3, the sound volume buttons 26a and 26b are provided on the upper side surface of the housing 11. The sound volume buttons 26a and 26b are buttons for giving instructions to adjust the volume of the sound output from the main unit 2. That is, the sound volume button 26a is a button for giving an instruction to lower the sound volume, and the sound volume button 26*b* is a button for giving an instruction to raise the sound volume.

The housing 11 is provided with an air outlet hole 11*c*. As shown in FIG. 3, the air outlet hole 11*c* is provided on the upper side surface of the housing 11. The air outlet hole 11*c* is provided so as to radiate (in other words, discharge) the heat generated inside the housing 11 to the outside of the housing 11.

(Elements Provided on Lower Side Surface of Housing 11)

The main unit 2 includes a lower terminal 27. The lower terminal 27 is a terminal for allowing the main unit 2 to communicate with the cradle 5 to be described later. As shown in FIG. 3, the lower terminal 27 is provided on the lower side surface of the housing 11. The lower terminal 27 is connected to a terminal of the cradle 5 (a main body terminal 73 shown in FIG. 10) when the main unit 2 is attached to the cradle 5, the details of which will be described later. In the present embodiment, the lower terminal 27 is a USB connector (more specifically, a female-side connector).

The main unit 2 also includes a second slot 24. In the present embodiment, the second slot 24 is provided on the lower side surface of the housing 11. Note however that in other embodiments, the second slot 24 may be provided on the same surface as the first slot 23. The second slot 24 is shaped so as to accommodate a storage medium of a second type, which is different from the first type. Note that in the present embodiment, a cover that can be opened/closed is provided for the opening of the second slot 24, and a storage medium of the second type can be inserted into the second slot 24 with the cover being open. A storage medium of the second type may be, for example, a general-purpose storage medium, e.g., an SD card. As is the storage medium of the first type, the storage medium of the second type is used for storing data used in the main unit 2 (e.g., application save data, etc.) and/or for storing programs to be executed on the main unit 2 (e.g., application programs, etc.).

The housing 11 is provided with an air inlet hole 11*d*. As shown in FIG. 3, the air inlet hole 11*d* is provided on the lower side surface of the housing 11. The air inlet hole 11*d* is provided so as to take in (in other words, introduce) the air from the outside of the housing 11 to the inside of the housing 11. In the present embodiment, the air inlet hole 11*d* is provided on the surface opposite from the surface where the air outlet hole 11*c* is provided, thereby allowing for efficient discharge of the heat from inside the housing 11.

The main unit 2 also includes a stand member 29 used when placing the housing upright. As shown in FIG. 3, the stand member 29 is provided on the lower side surface of the housing 11. The stand member 29 is rotatably connected to the housing 11 via a pivot 29*a*. In FIG. 3, the stand member 29 is accommodated in the housing 11.

Figure 4:
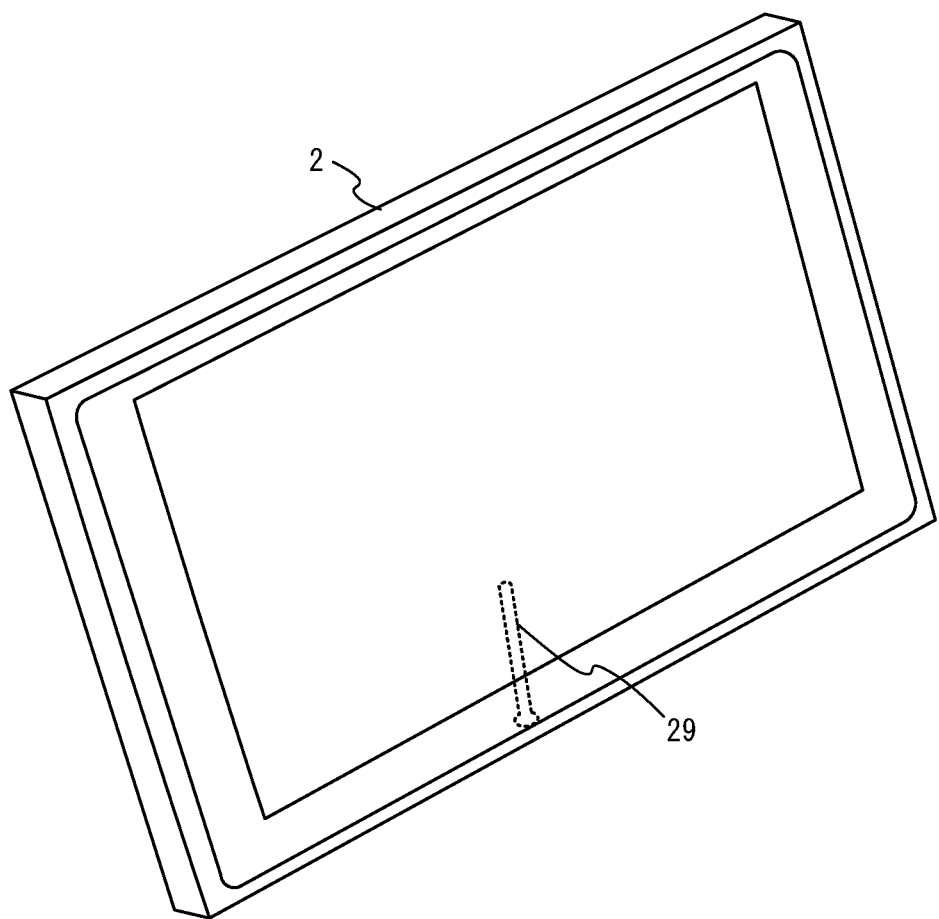
FIG. 4 is a diagram showing an example where the main unit is placed upright.

FIG. 4 is a diagram showing an example in which the main unit 2 is placed upright. Note that in order to facilitate understanding of elements of interest to be discussed in conjunction with the figure, some of the other elements of the main unit 2 are not shown in FIG. 4. The rod-shaped portion of the stand member 29 protrudes from the housing 11 after being rotated about the pivot 29*a*. Thus, the stand member 29 is brought into a position protruding from the housing 11, allowing the main unit 2 to be placed upright as shown in FIG. 4. Note that the mechanism for placing the main unit 2 upright is not limited to the stand member 29 shown in FIG. 3, but may be any other mechanism.

There is no particular limitation on the shape, the number and the arrangement of the various elements (specifically, the buttons, the slots, the terminals, etc.) provided on the housing 11 described above. For example, in other embodiments, some of the power button 28 and the slots 23 and 24 may be provided on another side surface or the back surface of the housing 11. In other embodiments, some of the elements described above may be absent on the main unit 2.

[1-1-2. Configuration of Left Controller]

Figure 5:
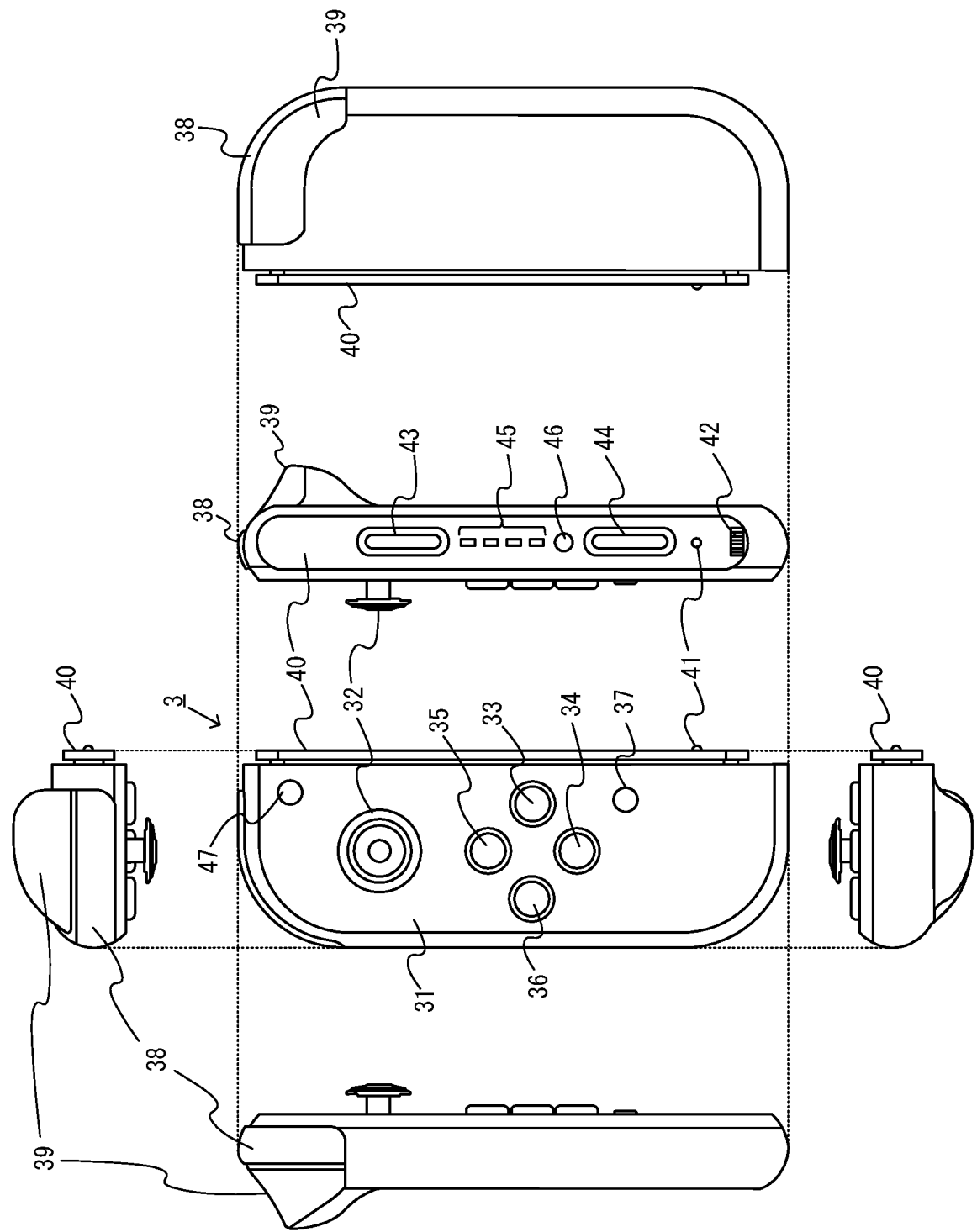
FIG. 5 is a six-sided view showing an example left controller.

FIG. 5 is a six-sided view showing an example of the left controller 3. As shown in FIG. 5, the left controller 3 includes a generally plate-shaped housing 31. In the present embodiment, the primary surface (in other words, the front-side surface, i.e., the surface on the z-axis negative direction side shown in FIG. 1) of the housing 31 has a generally rectangular shape. In the present embodiment, the housing 31 has a vertically-elongated shape, i.e., a shape that is elongated in the up-down direction (i.e., the y-axis direction shown in FIG. 1). Note that when detached from the main unit 2, the left controller 3 may be held in a portrait position (see FIG. 18) or may be held in a landscape position (see FIG. 16). Note that there is no particular limitation on the shape of the housing 31, and the housing 31 does not need to be generally plate-shaped in other embodiments. The housing 31 does not need to have a rectangular shape, but may have a semi-circular shape, or the like, for example. The housing 31 does not need to have a vertically-elongated shape.

The length of the housing 31 in the up-down direction is generally equal to the length of the housing 11 of the main unit 2 in the up-down direction. The thickness of the housing 31 (i.e., the length thereof in the front-rear direction; in other words, the length thereof in the z-axis direction shown in FIG. 1) is generally equal to the thickness of the housing 11 of the main unit 2. Therefore, when the left controller 3 is attached to the main unit 2 (see FIG. 1), a user can hold the main unit 2 and the left controller 3 as if they were an integral unit.

As shown in FIG. 5, the left-side corner portion of the primary surface of the housing 31 has a more rounded shape than the right-side corner portion thereof. That is, the connecting portion between the upper side surface and the left side surface of the housing 31 and the connecting portion between the lower side surface and the left side surface of the housing 31 are more rounded (in other words, round-cornered with a greater radius) than the connecting portion between the upper side surface and the right side surface and the connecting portion between the lower side surface and the right side surface. Therefore, when the left controller 3 is attached to the main unit 2 (see FIG. 1), the left side of the information processing device 1 will have a rounded shape, making it easier for a user to hold the device.

The left controller 3 includes an analog stick 32. As shown in FIG. 5, the analog stick 32 is provided on the primary surface of the housing 31. The analog stick 32 is an example of a directional input section allowing a user to input a direction. The analog stick 32 includes a stick member that can be tilted in any direction (i.e., 360° directions including the upper, lower, left, right and diagonal directions) parallel to the primary surface of the housing 31. A user can tilt the stick member to make a direction input based on the tilt direction (and a magnitude input based on the tilt angle). Note that the directional input section may also be a cross-shaped key, a slide stick, or the like. A slide stick is an input section including a stick member that can be slid in any direction parallel to the primary surface of the housing 31, and a user can slide the stick member to make an input based on the slide direction (and a magnitude input based on the slide amount). In the present embodiment, a user can also make an input by pressing down the stick member (in a direction vertical to the housing 31). That is, the analog stick 32 is an input section that allows a user to make a direction input and a magnitude input based on the tilt direction and the tilt amount, respectively, of the stick member, and also to make a push input by pressing down the stick member.

The left controller 3 includes four operation buttons 33 to 36 (specifically, a right direction button 33, a lower direction button 34, an upper direction button 35 and a left direction button 36). As shown in FIG. 5, these four operation buttons 33 to 36 are provided below the analog stick 32 on the primary surface of the housing 31. Note that while four operation buttons are provided on the primary surface of the left controller 3 in the present embodiment, there is no particular limitation on the number of operation buttons. These operation buttons 33 to 36 are used to give instructions in accordance with various programs executed on the main unit 2 (e.g., the OS program and application programs). Note that in the present embodiment, the operation buttons 33 to 36 can be used to make directional inputs, and the operation buttons 33 to 36 are therefore referred to as the right direction button 33, the lower direction button 34, the upper direction button 35 and the left direction button 36. Note however that the operation buttons 33 to 36 may be used to give instructions other than directional inputs.

The left controller 3 also includes a record button 37. As shown in FIG. 5, the record button 37 is provided on the primary surface of the housing 31, more specifically, in a lower right area of the primary surface. The record button 37 is a button for giving an instruction to save the image displayed on the display 12 of the main unit 2. For example, when a game image is displayed on the display 12, a user can press the record button 37 to save the game image that is displayed at the point in time when the button is pressed in a storage section of the main unit 2, for example.

The left controller 3 also includes a minus (−) button 47. As shown in FIG. 5, the minus button 47 is provided on the primary surface of the housing 31, more specifically, in an upper right area of the primary surface. The minus button 47 is used to give instructions in accordance with various programs executed on the main unit 2 (e.g., the OS program and application programs). The minus button 47 is used, for example, as a select button (e.g., a button used to move the selection through different selection items) in game applications.

Figure 14:
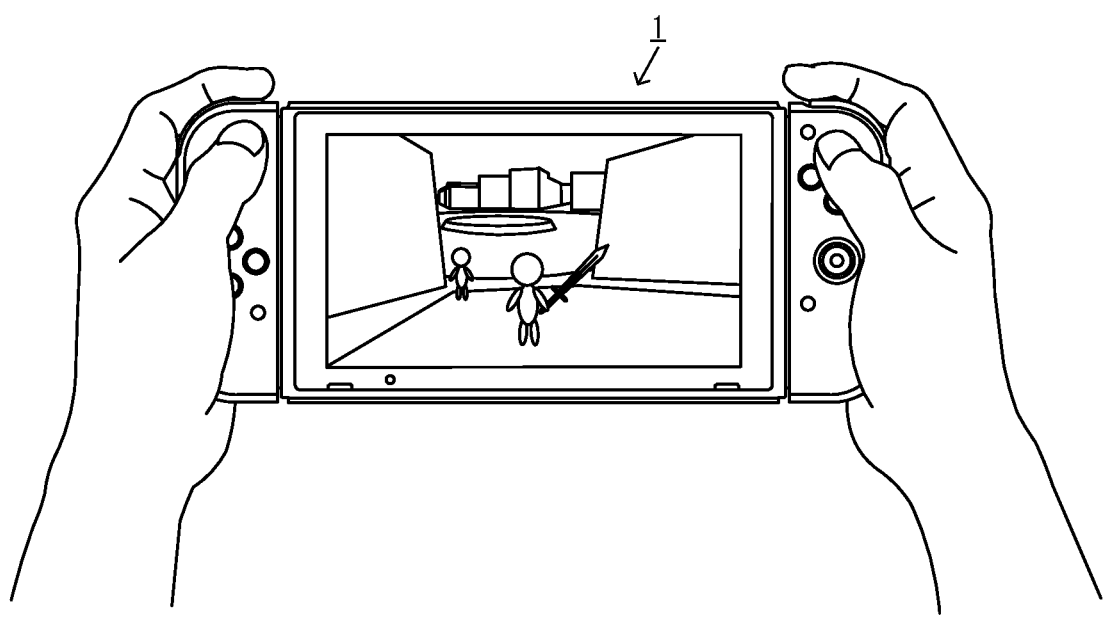
FIG. 14 is a diagram showing an example of how the information processing device is used with the controllers attached to the main unit.

When the left controller 3 is attached to the main unit 2, the operation sections provided on the primary surface of the left controller 3 (specifically, the analog stick 32 and the buttons 33 to 37 and 47) are operated with the thumb of the left hand, for example, of a user holding the information processing device 1 (see FIG. 14). When the left controller 3 is used detached from the main unit 2, the operation sections are operated with the left and right thumbs, for example, of a user holding the left controller 3 (see FIG. 15). Specifically, in such a case, the analog stick 32 is operated by the thumb of the left hand of the user, and the operation buttons 33 to 36 are operated with the thumb of the right hand of the user.

The left controller 3 includes a first L button 38. The left controller 3 also includes a ZL button 39. As are the operation buttons 33 to 36, these operation buttons 38 and 39 are used to give instructions in accordance with various programs executed on the main unit 2. As shown in FIG. 5, the first L button 38 is provided over a corner portion between the left side surface and the upper side surface of the housing 31. The ZL button 39 is provided to extend over a corner portion between the left side surface and the upper side surface of the housing 31 (strictly speaking, between the left side surface and the upper side surface as seen from the front side of the housing 31) while extending into the reverse surface of the housing 31. That is, the ZL button 39 is provided on the rear side (the z-axis positive direction side shown in FIG. 1) of the first L button 38. In the present embodiment, since the upper left corner portion of the housing 31 has a rounded shape, the first L button 38 and the ZL button 39 each have a rounded shape in conformity with the rounded shape of the upper left corner portion of the housing 31.

When the left controller 3 is attached to the main unit 2, the first L button 38 and the ZL button 39 will be placed over the upper left portion of the information processing device 1 (see FIG. 1). Therefore, a user holding the information processing device 1 is allowed to operate the first L button 38 and the ZL button 39 with the index finger or the middle finger of the left hand (see FIG. 14).

As shown in FIG. 5, a portion of the reverse surface of the housing 31 where the ZL button 39 is provided (more specifically, at least a portion of the perimeter of the ZL button 39) projects past other portions of the housing 31. The ZL button 39 is provided so as to project past the other portions of the housing 31 on the reverse surface. Therefore, when the main unit 2 with the left controller 3 attached thereto is placed on a flat surface in such an orientation that the reverse surface of the left controller 3 faces the horizontal flat surface, the projecting portions of the housing 31 are in contact with the flat surface. As a result, the information processing device 1 is placed so that the upper side of the main unit 2 is slightly raised from the lower side thereof. When the information processing device 1 is so placed, it is easy for a user to see the display 12.

Note that in other embodiments, when the main unit 2 with the left controller 3 attached thereto is placed on a flat surface in such an orientation that the reverse surface of the left controller 3 faces the horizontal flat surface, the ZL button 39 may be in contact with the flat surface. Now, in the present embodiment, the ZL button 39 can be pressed down primarily in the up-down direction (the y-axis direction). That is, the ZL button 39 is supported on the housing 31 so as to move primarily in the up-down direction. Therefore, even if the information processing device 1 is placed so that the ZL button 39 is in contact with the flat surface as described above, the ZL button 39 is unlikely to be pressed down because the ZL button 39 primarily receives a force in the front-rear direction (the z-axis direction). That is, even when the information processing device 1 is placed as described above, the ZL button 39 is unlikely to be pressed down inadvertently.

In other embodiments, the ZL button 39 may be provided so as not to project from the reverse surface of the housing 31. For example, the ZL button 39 may be provided on the side surface of the housing 31. For example, an area of the reverse surface of the housing 31 where the ZL button 39 is provided may be sunken from the remaining portion (i.e., the housing is formed to be thinner in this area) so that the ZL button 39 does not project past the remaining portion of the reverse surface.

The left controller 3 includes the slider 40 described above. As shown in FIG. 5, the slider 40 is provided so as to extend in the up-down direction on the right side surface of the housing 31. The slider 40 has such a shape that it can engage with the left rail member 15 (more specifically, the groove of the left rail member 15) of the main unit 2. Specifically, the cross section (specifically, the cross section perpendicular to the up-down direction) of the slider 40 is T-shaped. More specifically, the cross section of the slider 40 is T-shaped in conformity with the cross-sectional shape of the left rail member 15 (see FIG. 7). Therefore, the slider 40 in engagement with the left rail member 15 is locked so as not to come off in the direction perpendicular to the sliding direction (in other words, the direction in which the left rail member 15 extends) (see FIG. 7 to be discussed below).

As shown in FIG. 5, the slider 40 is provided with the projection 41. The projection 41 is arranged at such a position that allows the projection 41 to be inserted into the engagement hole 16 when the left controller 3 is attached to the main unit 2. There is no particular limitation on the specific position of the projection 41. In the present embodiment, the projection 41 is provided on the engaging surface of the slider 40. Note that the engaging surface of the slider 40 refers to a surface that faces the bottom surface of the left rail member 15 when the left controller 3 is attached to the main unit 2. The projection 41 is shaped so that the projection 41 can engage with the engagement hole 16 of the left rail member 15.

In the present embodiment, the projection 41 is biased from the inside of the slider 40 toward the outside of the slider 40. Thus, when a force from the outside of the slider 40 toward the inside of the slider 40 is applied on the projection 41, the projection 41 moves toward the inside of the slider 40 (i.e., retracts into the slider 40). There is no particular limitation on the configuration for biasing the projection 41 as described above. For example, in the present embodiment, the projection 41 is connected to an elastic member inside the slider 40, and the projection 41 is placed inside a hole in the slider 40 with a portion thereof protruding past the engaging surface of the slider 40. Note that in other embodiments, the projection 41 may be fixed to the slider 40.

The left controller 3 includes the terminal 42 for allowing the left controller 3 to communicate with the main unit 2 in wired communication. The terminal 42 is located so as to be in contact with the left-side terminal 17 of the main unit 2 (FIG. 3) when the left controller 3 is attached to the main unit 2. There is no particular limitation on the specific position of the terminal 42. In the present embodiment, as shown in FIG. 5, the terminal 42 is provided on the engaging surface of the slider 40. In the present embodiment, the terminal 42 is provided near the lower end on the engaging surface of the slider 40. The terminal 42 is provided below the projection 41 (in other words, on the front side with respect to the insertion of the slider 40 into the left rail member 15).

The left controller 3 also includes a second L button 43 and a second R button 44. As are the other operation buttons 33 to 36, these buttons 43 and 44 are used to give instructions in accordance with various programs executed on the main unit 2. As shown in FIG. 5, the second L button 43 and the second R button 44 are provided on the engaging surface of the slider 40. The second L button 43 is provided on the engaging surface of the slider 40 above the center of the engaging surface with respect to the up-down direction (the y-axis direction shown in FIG. 1). The second R button 44 is provided on the engaging surface of the slider 40 below the center of the engaging surface with respect to the up-down direction. The second L button 43 and the second R button 44 are arranged at such positions that they cannot be pressed down with the left controller 3 attached to the main unit 2. That is, the second L button 43 and the second R button 44 are buttons that are used when the left controller 3 is detached from the main unit 2. For example, the second L button 43 and the second R button 44 are operated with the index finger or the middle finger of the left hand and the right hand of a user holding the left controller 3 detached from the main unit 2 (see FIG. 16).

The left controller 3 includes an indicator LED 45. The indicator LED 45 is an indicator section for indicating predetermined information to the user. There is no particular limitation on the information to be indicated by the indicator LED 45. In the present embodiment, the indicator LED 45 shows the user identification information of the controller when the main unit 2 communicates with a plurality of controllers. Specifically, as the indicator LED 45, the left controller 3 includes a number (herein, four) of LEDs equal to the number of controllers that the main unit 2 can be simultaneously in communication with. Then, one of the four LEDs is lit, which is associated with the number assigned to the controller. Thus, it is possible with the indicator LED 45 to indicate the number to the user.

In other embodiments, the indicator LED 45 may indicate, to the user, the status of communication between the left controller 3 and the main unit 2. For example, the indicator LED 45 may be lit while a connection with the main unit 2 is established. While the number of LEDs (in other words, the light-emitting portions) serving as the indicator LED 45 is four in the present embodiment, there is no particular limitation on the number of LEDs.

In the present embodiment, the indicator LED 45 is provided on the engaging surface of the slider 40 as shown in FIG. 5. Thus, the indicator LED 45 is arranged at such a position that the indicator LED 45 cannot be seen when the left controller 3 is attached to the main unit 2. That is, the indicator LED 45 is used when the left controller 3 is detached from the main unit 2.

The left controller 3 includes a pairing button 46. In the present embodiment, the pairing button 46 is used to give an instruction for a setting (referred to also as pairing) process regarding wireless communication between the left controller 3 and the main unit 2, and to give an instruction for a resetting process of resetting the left controller 3. Note that in other embodiments, the pairing button 46 may only serve to instruct one of the setting process and the resetting process.

That is, when a short-press operation is performed on the pairing button 46 (specifically, when the pairing button 46 is pressed down for a shorter period of time than a predetermined period of time), the left controller 3 executes the setting process. Note that the details of the setting process will be described later.

When a long-press operation is performed on the pairing button 46 (specifically, when the pairing button 46 is held down for the predetermined period of time or longer), the left controller 3 executes the resetting process. The resetting process is a process of resetting the status of the left controller 3, and is a process that should be executed, for example, when the left controller 3 freezes (e.g., when the main unit 2 is no longer able to obtain data from the left controller 3). Although there is no particular limitation on the specific details of the resetting process, the resetting process may include, for example, a process of turning OFF the power of the left controller 3 and then turning it back ON, a process of disconnecting with the main unit 2 and then re-connecting with the main unit 2, a process of re-executing a process that is executed when starting communication, and/or the setting process. In the present embodiment, even when the left controller 3 freezes for some reason, the left controller 3 can be reset, using the pairing button 46, to an operative state.

In the present embodiment, the pairing button 46 is provided on the engaging surface of the slider 40 as shown in FIG. 5. Thus, the pairing button 46 is arranged at such a position that the pairing button 46 cannot be seen when the left controller 3 is attached to the main unit 2. That is, the pairing button 46 is used when the left controller 3 is detached from the main unit 2. In the present embodiment, it is assumed that the pairing button 46 is pressed down when the left controller 3 is detached from the main unit 2, and that the pairing button 46 will unlikely be pressed down when the left controller 3 is attached to the main unit 2. Thus, the pairing button 46 is arranged at such a position, thereby preventing the pairing button 46 from being operated in error when the left controller 3 is attached to the main unit 2.

Note that in the present embodiment, the buttons provided on the engaging surface of the slider 40 (specifically, the second L button 43, the second R button 44 and the pairing button 46) are provided so as not to protrude past the engaging surface. That is, the upper surface (in other words, the surface to be pressed) of these buttons is arranged flush with the engaging surface of the slider 40 or arranged at a position sunken from the engaging surface. This allows the slider 40 to slide smoothly against the left rail member 15 when the slider 40 is engaged with the left rail member 15 of the main unit 2.

[1-1-3. Configuration of Right Controller]

Figure 6:
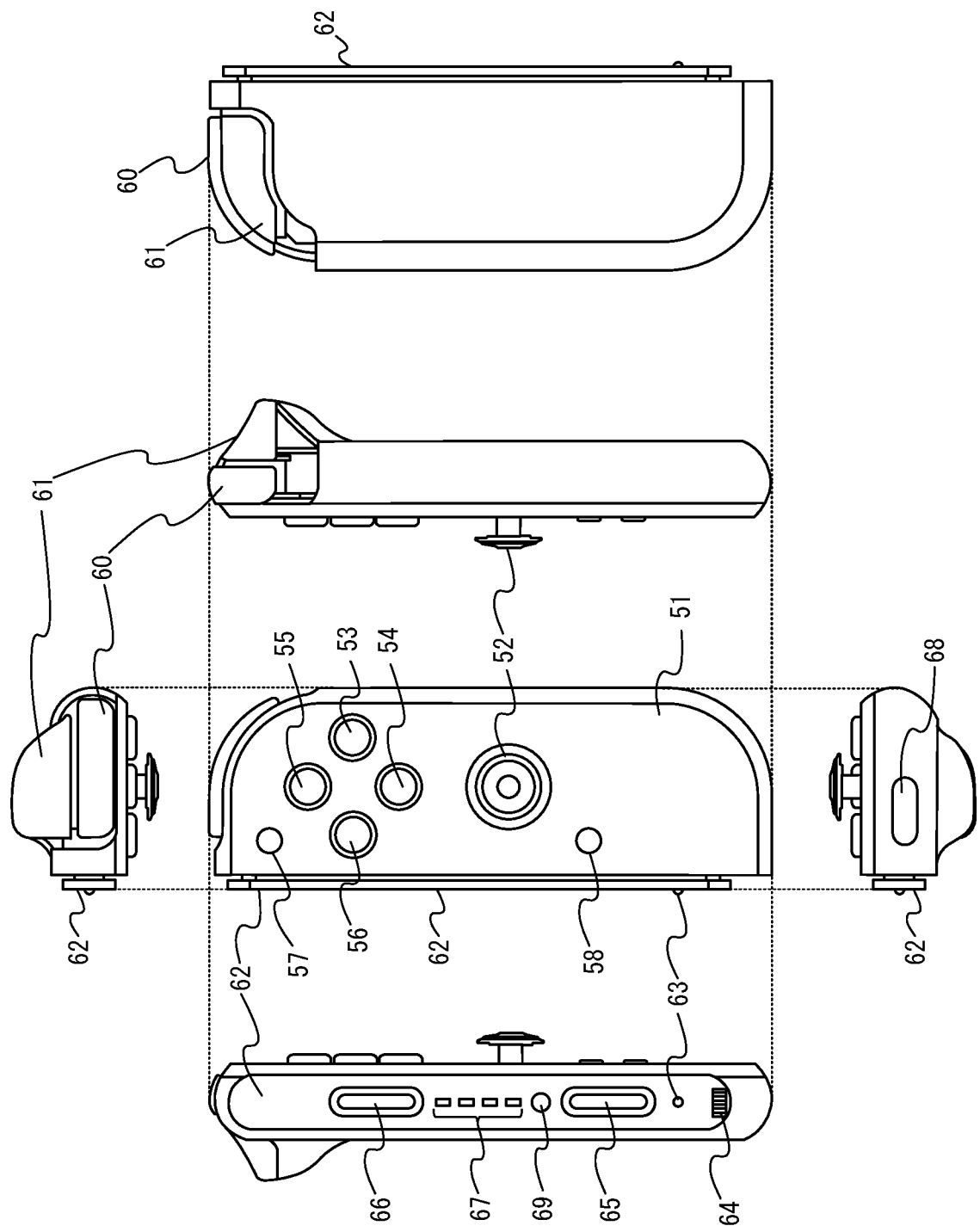
FIG. 6 is a six-sided view showing an example right controller.

FIG. 6 is a six-sided view showing an example of the right controller 4. As shown in FIG. 6, the right controller 4 includes a generally plate-shaped housing 51. In the present embodiment, the primary surface (in other words, the front-side surface, i.e., the surface on the z-axis negative direction side shown in FIG. 1) of the housing 51 has a generally rectangular shape. In the present embodiment, the housing 51 has a vertically-elongated shape, i.e., a shape that is elongated in the up-down direction. Note that when detached from the main unit 2, the right controller 4 may be held in a portrait position (see FIG. 18) or may be held in a landscape position (see FIG. 16).

As with the housing 31 of the left controller 3, the length of the housing 51 of the right controller 4 in the up-down direction is generally equal to the length of the housing 11 of the main unit 2 in the up-down direction, and the thickness thereof is generally equal to the thickness of the housing 11 of the main unit 2. Therefore, when the right controller 4 is attached to the main unit 2 (see FIG. 1), a user can hold the main unit 2 and the right controller 4 as if they were an integral unit.

As shown in FIG. 6, the right-side corner portion of the primary surface of the housing 51 has a more rounded shape than the left-side corner portion thereof. That is, the connecting portion between the upper side surface and the right side surface of the housing 51 and the connecting portion between the lower side surface and the right side surface of the housing 51 are more rounded (in other words, round-cornered with a greater radius) than the connecting portion between the upper side surface and the left side surface and the connecting portion between the lower side surface and the left side surface. Therefore, when the right controller 4 is attached to the main unit 2 (see FIG. 1), the right side of the information processing device 1 will have a rounded shape, making it easier for a user to hold the device.

As does the left controller 3, the right controller 4 includes an analog stick 52 as the directional input section. In the present embodiment, the analog stick 52 has the same configuration as the analog stick 32 of the left controller 3. As does the left controller 3, the right controller 4 includes four operation buttons 53 to 56 (specifically, the A button 53, the B button 54, the X button 55 and the Y button 56). In the present embodiment, these four operation buttons 53 to 56 are of the same mechanism as the four operation buttons 33 to 36 of the left controller 3. As shown in FIG. 6, the analog stick 52 and the operation buttons 53 to 56 are provided on the primary surface of the housing 51. Note that while the number of operation buttons provided on the primary surface of the right controller 4 is four in the present embodiment, there is no particular limitation on the number of operation buttons.

In the present embodiment, the positional relationship between the two types of operation sections (the analog stick and the operation buttons) of the right controller 4 is opposite from the positional relationship between these two types of operation sections of the left controller 3. That is, the analog stick 52 is arranged above the operation buttons 53 to 56 on the right controller 4, whereas the analog stick 32 is arranged below the operation buttons 33 to 36 on the left controller 3. With such an arrangement, the left and right controllers 3 and 4, when detached from the main unit 2, can be operated in a similar fashion, the details of which will be described later.

The right controller 4 also includes a plus (+) button 57. As shown in FIG. 6, the plus button 57 is provided on the primary surface of the housing 51, more specifically, in an upper left area of the primary surface. As are the other operation buttons 53 to 56, the plus button 57 is used to give instructions in accordance with various programs executed on the main unit 2 (e.g., the OS program and application programs). The plus button 57 is used, for example, as a start button in a game application (e.g., a button used to give an instruction to start the game).

The right controller 4 includes a home button 58. As shown in FIG. 6, the home button 58 is provided on the primary surface of the housing 51, more specifically, in a lower left area of the primary surface. The home button 58 is a button for displaying a predetermined menu screen on the display 12 of the main unit 2. The menu screen is, for example, a screen where a user can launch an application specified by the user, from among a plurality of applications that can be executed on the main unit 2. The menu screen may be displayed at the start-up of the main unit 2, for example. In the present embodiment, a predetermined control screen may be displayed on the display 12 (the menu screen may be displayed instead of the control screen) when the home button 58 is pressed while an application is executed on the main unit 2 (i.e., while the image of the application is displayed on the display 12). Note that the control screen is, for example, a screen where a user can give an instruction to end an application and display the menu screen on the display 12, and an instruction to resume an application, etc.

The operation sections provided on the primary surface of the right controller 4 (specifically, the analog stick 52 and the buttons 53 to 59) are operated with the thumb of the right hand, for example, of a user holding the information processing device 1 when the right controller 4 is attached to the main unit 2 (see FIG. 14). When the right controller 4 is used detached from the main unit 2, the operation sections are operated with the left and right thumbs, for example, of a user holding the right controller 4 (see FIG. 15). Specifically, in such a case, the analog stick 52 is operated with the thumb of the left hand of the user, and the operation buttons 53 to 56 are operated with the thumb of the right hand of the user.

The right controller 4 includes a first R button 60. The right controller 4 includes a ZR button 61. As shown in FIG.

6, the first R button 60 is provided over a corner portion between the right side surface and the upper side surface of the housing 51. The ZR button 61 is provided to extend over a corner portion between the right side surface and the upper side surface of the housing 51 (strictly speaking, between the right side surface and the upper side surface as seen from the front side of the housing 51) while extending into the reverse surface of the housing 51. That is, the ZR button 61 is provided on the rear side (the z-axis positive direction side shown in FIG. 1) of the first R button 60. In the present embodiment, since the upper right corner portion of the housing 51 has a rounded shape, the first R button 60 and the ZR button 61 each have a rounded shape in conformity with the rounded shape of the upper right portion of the housing 51.

When the right controller 4 is attached to the main unit 2, the first R button 60 and the ZR button 61 will be placed over the upper right portion of the information processing device 1 (see FIG. 1). Therefore, a user holding the information processing device 1 is allowed to operate the first R button 60 and the ZR button 61 with the index finger or the middle finger of the right hand (see FIG. 15).

As shown in FIG. 6, the ZR button 61 of the right controller 4 is provided so as to project from the housing 51, as is the ZL button 39 of the left controller 3. That is, a portion of the reverse surface of the housing 51 where the ZR button 61 is provided (more specifically, at least a portion of the perimeter of the ZR button 61) projects past the remaining portion of the housing 51. The ZR button 61 is provided so as to project past the remaining portion of the housing 51 on the reverse surface. Therefore, when the right controller 4 is attached to the main unit 2, as is the case when the left controller 3 is attached to the main unit 2, when the main unit 2 is placed on a flat surface in such an orientation that the reverse surface of the right controller 4 faces the horizontal flat surface, the projecting portions of the housing 51 are in contact with the flat surface. As a result, the main unit 2 is placed so that the upper side thereof is slightly raised from than the lower side thereof, and it is therefore easy for a user to see the display 12.

Note that in the present embodiment, as with the ZL button 39 of the left controller 3, the ZR button 61 of the right controller 4 can be pressed down primarily in the up-down direction (the y-axis direction). Therefore, as with the ZL button 39, the ZR button 61 is unlikely to be pressed down when the information processing device 1 is placed so that the ZR button 61 is in contact with a flat surface. Thus, the ZR button 61 is unlikely to be pressed in error. Note that in other embodiments, the housing 51 may be formed so that the reverse surface of the housing 51 projects past the ZR button 61. In other embodiments, as is the ZL button 39 of the left controller 3, the ZR button 61 may be formed so as not to project from the reverse surface of the housing 51.

In the present embodiment, the shape of the first L button 38 and the shape of the first R button 60 are not in left-right symmetry, and the shape of the ZL button 39 and the shape of the ZR button 61 are not in left-right symmetry. Note however that in other embodiments, the shape of the first L button 38 and the shape of the first R button 60 may be in left-right symmetry, and the shape of the ZL button 39 and the shape of the ZR button 61 may be in left-right symmetry.

The right controller 4 includes a similar slider mechanism to that of the left controller 3. That is, the right controller 4 includes the slider 62 described above. As shown in FIG. 6, the slider 62 is provided so as to extend in the up-down direction on the left side surface of the housing 51. The slider 62 has such a shape that it can engage with the right rail member 19 (more specifically, the groove of the right rail member 19) of the main unit 2. Specifically, the cross section (specifically, the cross section perpendicular to the up-down direction) of the slider 62 is T-shaped. More specifically, the cross section of the slider 62 is T-shaped in conformity with the cross-sectional shape of the right rail member 19 (see FIG. 7). Therefore, the slider 62 in engagement with the right rail member 19 is locked so as not to come off in the direction perpendicular to the sliding direction (in other words, the direction in which the right rail member 19 extends) (see FIG. 7).

The slider 62 is provided with the projection 63. The projection 63 is arranged at such a position that allows the projection 63 to be inserted into the engagement hole 20 when the right controller 4 is attached to the main unit 2. There is no particular limitation on the specific position of the projection 63. In the present embodiment, the projection 63 is provided on the engaging surface of the slider 62. Note that the engaging surface of the slider 62 refers to a surface that faces the bottom surface of the right rail member 19 when the right controller 4 is attached to the main unit 2. The projection 63 is shaped so that the projection 63 can engage with the engagement hole 20 of the right rail member 19.

In the present embodiment, as is the projection 41 of the left controller 3, the projection 63 of the right controller 4 is biased from the inside of the slider 62 toward the outside of the slider 62. Thus, when a force from the outside of the slider 62 toward the inside of the slider 62 is applied on the projection 63, the projection 63 moves toward the inside of the slider 62 (i.e., retracts into the slider 62). Note that there is no particular limitation on the configuration for biasing the projection 63 as described above, and it may be a similar configuration to the projection 41 of the left controller 3.

The right controller 4 includes the terminal 64 for allowing the right controller 4 to communicate with the main unit 2 in wired communication. The terminal 64 is located so as to be in contact with the right-side terminal 21 of the main unit 2 (FIG. 3) when the right controller 4 is attached to the main unit 2. There is no particular limitation on the specific position of the terminal 64. In the present embodiment, as shown in FIG. 6, the terminal 64 is provided on the engaging surface of the slider 62. In the present embodiment, the terminal 64 is provided near the lower end on the engaging surface of the slider 62. The terminal 64 is provided below the projection 63 (in other words, on the front side with respect to the insertion of the slider 62 into the right rail member 19).

As does the left controller 3, the right controller 4 also includes a second L button 65 and a second R button 66. As are the operation buttons 53 to 56, these buttons 65 and 66 are used to give instructions in accordance with various programs executed on the main unit 2. As shown in FIG. 6, the second L button 65 and the second R button 66 are provided on the engaging surface of the slider 62. The second L button 65 is provided on the engaging surface of the slider 62 below the center of the engaging surface with respect to the up-down direction (the y-axis direction shown in FIG. 1). The second R button 66 is provided on the engaging surface of the slider 62 above the center of the engaging surface with respect to the up-down direction. As are the second L button 43 and the second R button 44 of the left controller 3, the second L button 65 and the second R button 66 are arranged at such positions that they cannot be pressed down with the right controller 4 attached to the main unit 2, and they are buttons that are used when the right controller 4 is detached from the main unit 2. For example, the second L button 65 and the second R button 66 are operated with the index finger or the middle finger of the left hand and the right hand of a user holding the right controller 4 detached from the main unit 2 (see FIG. 16).

The right controller 4 includes an indicator LED 67. As is the indicator LED 45 of the left controller 3, the indicator LED 67 is an indicator section for indicating predetermined information to the user. As does the left controller 3, the right controller 4 includes four LEDs as the indicator LED 67, and one of the four LEDs is lit, which is associated with the number assigned to the right controller 4. In the present embodiment, as is the indicator LED 45, the indicator LED 67 is provided on the engaging surface of the slider 62 (FIG. 6). Thus, the indicator LED 67 is arranged at such a position that the indicator LED 67 cannot be seen with the right controller 4 attached to the main unit 2, and the indicator LED 67 is used when the right controller 4 is detached from the main unit 2.

The right controller 4 includes a pairing button 69. As is the pairing button 46 of the left controller 3, the pairing button 69 is used to give an instruction for a setting (referred to also as "pairing") process regarding wireless communication between the right controller 4 and the main unit 2, and to give an instruction for a resetting process of resetting the right controller 4. The setting process and the resetting process are the same as those for the left controller 3, and will not therefore be described in detail below. In the present embodiment, the pairing button 69 is provided on the engaging surface of the slider 62 as shown in FIG. 6. That is, for the same reason for the pairing button 46 of the left controller 3, the pairing button 69 is arranged at such a position that the pairing button 69 cannot be seen with the right controller 4 attached to the main unit 2.

With the right controller 4, as with the left controller 3, the buttons provided on the engaging surface of the slider 62 (specifically, the second L button 65, the second R button 66 and the pairing button 69) are provided so as not to protrude past the engaging surface. This allows the slider 62 to slide smoothly against the right rail member 19 when the slider 62 is engaged with the right rail member 19 of the main unit 2.

A window portion 68 is provided in the lower side surface of the housing 51. The right controller 4 includes an infrared image-capturing section (an infrared image-capturing section 123 shown in FIG. 12), the details of which will be described later, to detect a hand movement and/or the gesture, etc., of the user by means of the infrared image-capturing section 123. The window portion 68 is provided so as to allow the camera of the infrared image-capturing section 123 arranged inside the housing 51 to capture an image around the right controller 4. The window portion 68 is provided for protecting the lens of the camera of the infrared image-capturing section 123, and is made of a material (e.g., a transparent material) that allows light of a wavelength to be detected by the camera to pass therethrough. Note that the window portion 68 may be a hole formed in the housing 51. Note that in the present embodiment, the infrared image-capturing section 123 itself has a filter member for suppressing the transmission therethrough of light of wavelengths other than the light (in the present embodiment, infrared light) to be detected by the camera. Note however that in other embodiments, the window portion may have a filter function.

Note that for the controllers 3 and 4, there is no particular limitation on the shape, the number and the arrangement of the various elements (specifically, the slider, the stick, the buttons, the LEDs, etc.) provided on the housing 31 or 51. For example, in other embodiments, the controllers 3 and 4 may include a directional input section of a different type from an analog stick. The slider 40 or 62 may be arranged at a position that corresponds to the position of the rail member 15 or 19 provided on the main unit 2, and may be, for example, arranged on the primary surface or the reverse surface of the housing 31 or 51. In other embodiments, one or more of the various elements described above may be absent on the controllers 3 and 4.

[1-1-4: Attachment Action]

Figure 7:
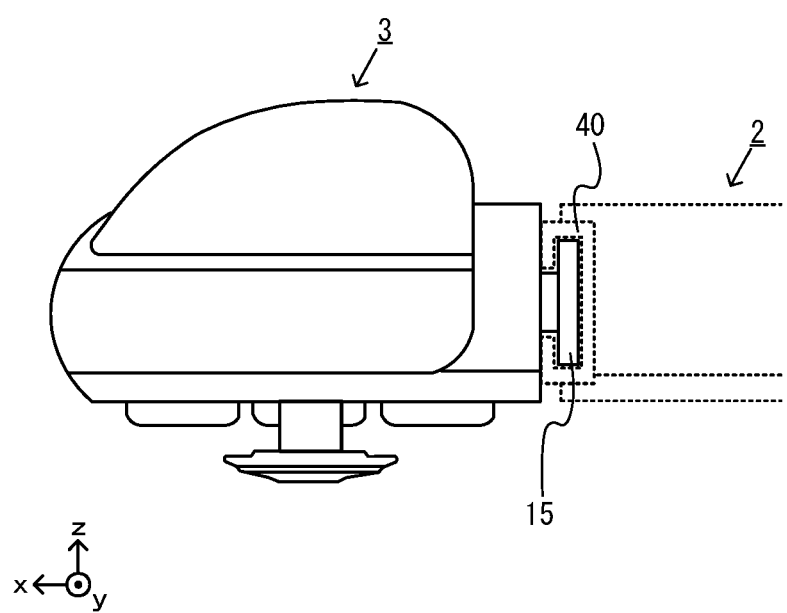
FIG. 7 is a diagram showing an example of how a left rail member and a slider engage with each other.

Next, referring to FIG. 7 and FIG. 8, the action of attaching and detaching a controller to and from the main unit 2 will be described. Note that although the description below is directed to the action of attaching and detaching the left controller 3 to and from the main unit 2, the action of attaching and detaching the right controller 4 to and from the main unit 2 can be done in the same manner as the left controller 3.

When the left controller 3 is attached to the main unit 2, a user first inserts the lower end of the slider 40 of the left controller 3 into a groove of the left rail member 15 of the main unit 2 via the upper end of the left rail member 15. FIG. 7 is a diagram showing an example of how the left rail member 15 and the slider 40 engage with each other. Note that in order to facilitate understanding of the figure, elements of the main unit 2 are shown in phantom line in FIG. 7. As shown in FIG. 7, the slider 40 is inserted into the left rail member 15 so that the T-shaped cross section of the slider 40 engages with (or is fitted to) the C-shaped cross section of the left rail member 15 (in other words, the groove of the left rail member 15).

After inserting the lower end of the slider 40 into the groove of the left rail member 15, the user further inserts the slider 40 down the groove of the left rail member 15. That is, the user slides the left controller 3 downward against the main unit 2. Then, when the left controller 3 has been slid until the lower end of the slider 40 reaches the position of the stopper 18 of the main unit 2, the left controller 3 is locked to the main unit 2.

FIG. 8 is diagram showing an example of how the slider 40 is locked to the left rail member 15. Note that FIG. 8 shows a cross section of the left rail member 15 perpendicular to the front-rear direction (the z-axis direction). In order to facilitate understanding of elements of interest to be discussed in conjunction with the figure, the elements are shown in FIG. 8 with different positional relationships and different sizes from FIG. 3, etc.

Figure 8A:
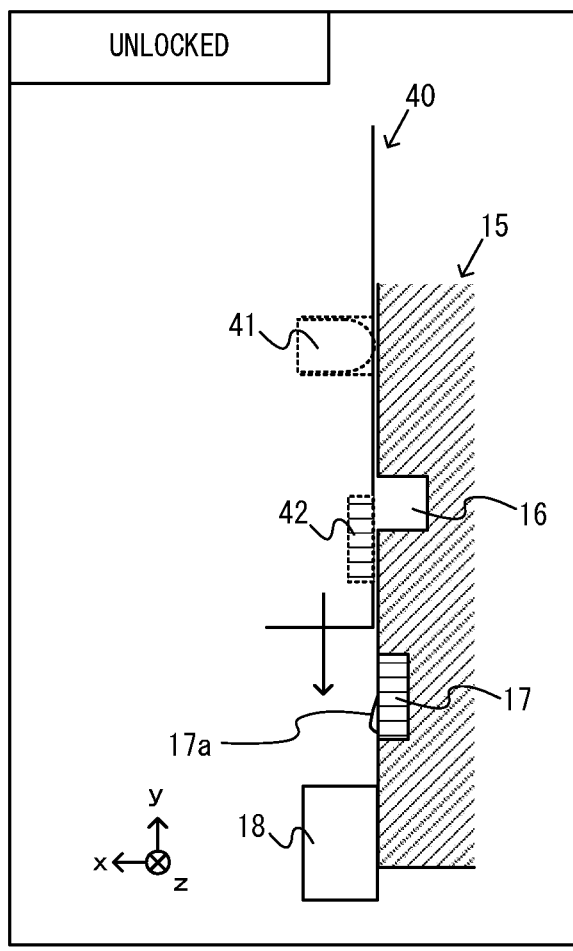
FIGS. 8(a) and 8(b) are diagrams showing an example of how the slider is locked to the left rail member.

As shown in FIG. 8(a), when the left controller 3 is not completely attached to the main unit 2 (i.e., when the lower end of the slider 40 has not reached the stopper 18 of the main unit 2), the projection 41 of the slider 40 is retracted inside the slider 40 by being in contact with the bottom surface of the rail member 15.

Figure 8B:
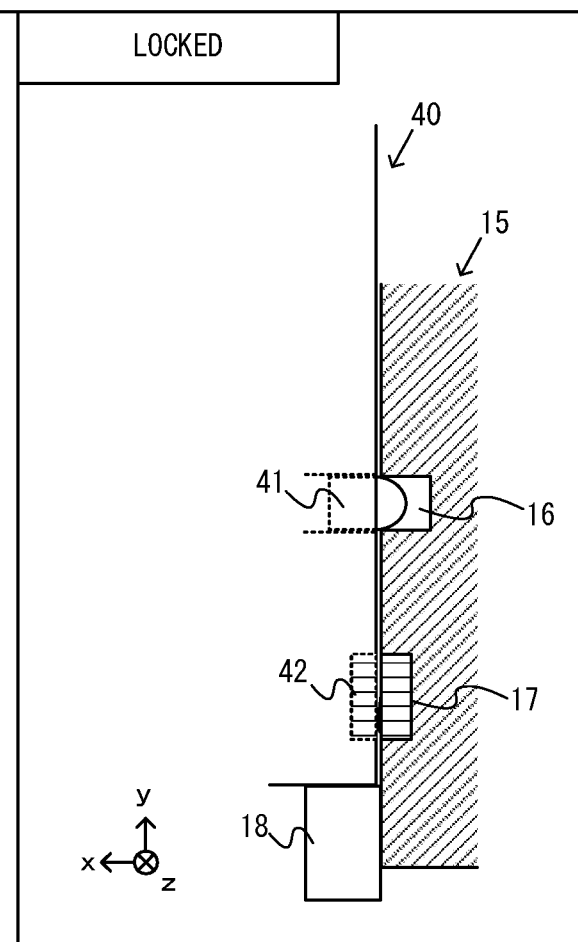

After the state shown in FIG. 8(a), the slider 40 is slid further down the left rail member 15, the lower end of the slider 40 reaches the position of the stopper 18 of the main unit 2 (see FIG. 8(b)). Then, as shown in FIG. 8(b), the projection 41 of the slider 40 faces the engagement hole 16 of the left rail member 15. Therefore, the projection 41 protrudes from the engaging surface of the slider 40 to be inserted into the engagement hole 16. Thus, the projection 41 engages with the engagement hole 16, thereby locking the left controller 3 to the main unit 2 (in other words, locking the slider 40 to the left rail member 15) to such a degree that a small force will not cause the left controller 3 to come off.

When the left controller 3 is locked to the main unit 2, the terminal 42 of the slider 40 is located so as to face the left-side terminal 17 of the left rail member 15 as shown in FIG. 8(b). Thus, the terminal 42 and the left-side terminal 17 are connected together. This enables wired communication (in other words, communication via physical connection between terminals) between the left controller 3 and the main unit 2. This also allows power to be supplied from the main unit 2 to the left controller 3.

Note that one or both of the controller-side terminal (i.e., the terminal 42) and the main unit-side terminal (i.e., the left-side terminal 17) protrudes (only slightly) from the base surface. In the present embodiment, as shown in FIG. 8(a), the left-side terminal 17 on the main unit side is provided to slightly protrude from the base surface (i.e., the bottom surface of the left rail member 15). A metal portion 17a to be the contact point of the terminal provided to protrude is able to deform toward its base surface. Therefore, when the terminals come into contact with each other, each terminal receives a pressing force from the other terminal so as to be biased in the direction in which it protrudes, as shown in FIG. 8(b). This as a result ensures a reliable contact between the terminals.

In the present embodiment, the left-side terminal 17 of the main unit 2 is provided below the engagement hole 16. The terminal 42 of the left controller 3 is provided below the projection 41. Therefore, when the slider 40 is inserted into the left rail member 15, the projection 41 will not come into contact with the left-side terminal 17, thereby lowering the possibility of the projection 41 damaging the left-side terminal 17.

When detaching the left controller 3 from the main unit 2, a user slides the left controller 3 upward against the main unit 2. Note that when the left controller 3 is attached to the main unit 2, the left controller 3 is locked to the main unit 2 by means of the projection 41 and the engagement hole 16. Note however that a certain force or more for sliding the left controller 3 upward will dislocate the projection 41 off the position of the engagement hole 16, thereby releasing the lock. After the lock is released, the left controller 3 can be further slid up to remove the left controller 3 from the main unit 2.

Note that in other embodiments, the left controller 3 may include a mechanism capable of retracting the projection 41 into the slider 40. The left controller 3 may include a mechanism for retracting the projection 41 into the slider 40 in response to a user pressing a predetermined button provided on the left controller 3, for example. Thus, by performing the operation described above, the user can easily release the lock of the left controller 3 to the main unit 2 by means of the projection 41.

As described above, in the present embodiment, the controllers 3 and 4 can be detachably attached to the main unit 2 by means of a slide mechanism including a rail member and a slider. With a slide mechanism, the controllers 3 and 4 can be securely locked to the main unit 2 for directions other than the slide direction. Therefore, a user can easily hold the information processing device 1 with the controllers 3 and 4 attached to the main unit 2, with little shaking of the controllers 3 and 4. In the present embodiment, also for the slide direction, the projection and the engagement hole allow the controllers 3 and 4 to be locked to the main unit 2. This also reduces the shaking of the controllers 3 and 4 attached to the main unit 2, thereby allowing a user to easily hold the information processing device 1.

[1-2. Configuration of Cradle]

Figure 9:
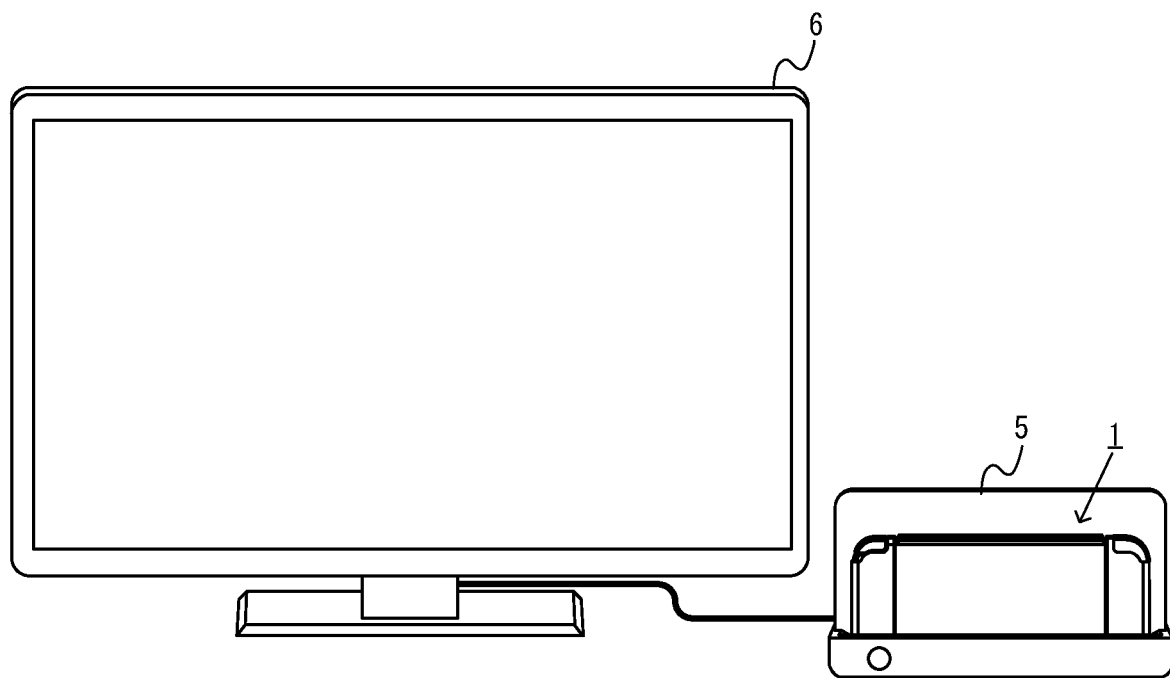
FIG. 9 is a diagram showing an overall configuration of an example information processing system according to the present embodiment.

FIG. 9 is a diagram showing an overall configuration of an example information processing system according to the present embodiment. As described above, the information processing system includes the information processing device 1 and the cradle 5. As shown in FIG. 9, the information processing device 1 can be placed in the cradle 5. The cradle 5 can communicate (either via wired communication or wireless communication) with a TV 6, which is an example of an external display device separate from the display 12. When the information processing device 1 is placed in the cradle 5, the information processing system can display the image obtained or produced by the information processing device 1 on the TV 6, the details of which will be described later. In the present embodiment, the cradle 5 has a function of charging the information processing device 1 placed therein and a function as a hub device (specifically, a USB hub), the details of which will be described later.

Figure 10:
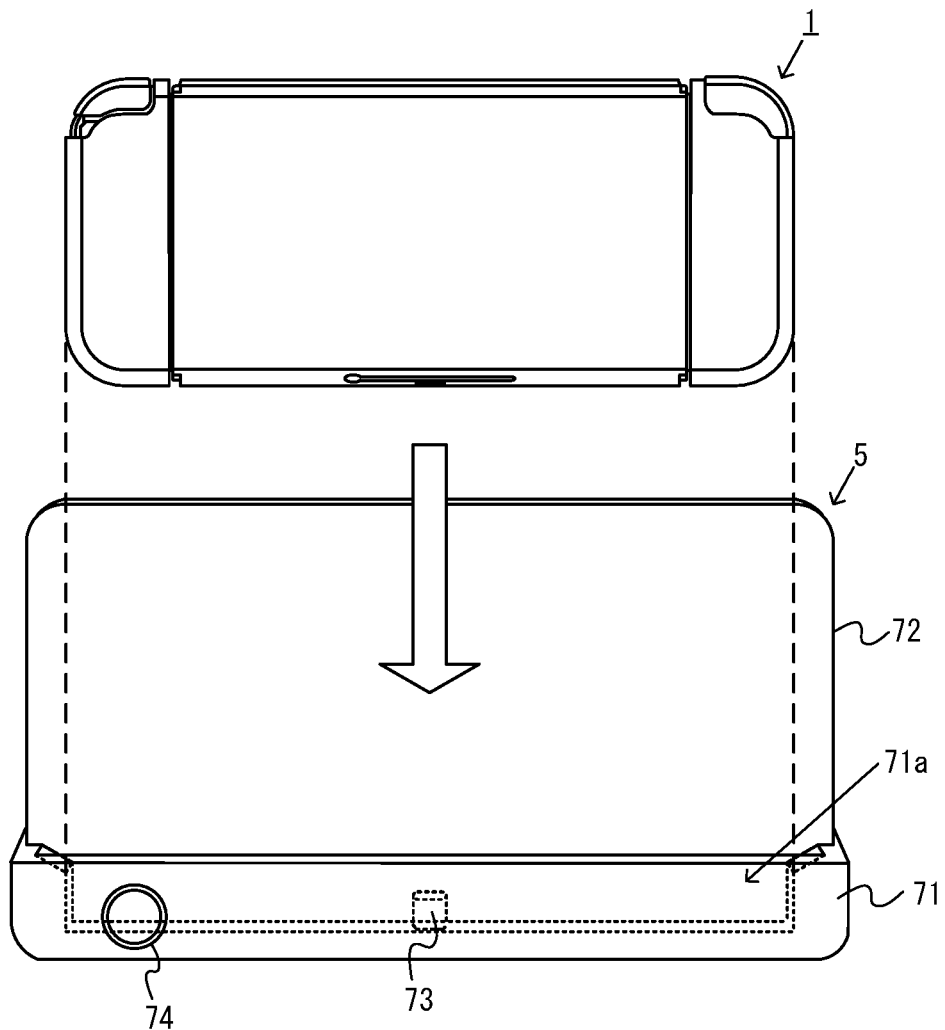
FIG. 10 is a diagram showing an external configuration of an example cradle.

FIG. 10 is a diagram showing an external configuration of an example of the cradle 5. The cradle 5 has a housing such that the information processing device 1 can be placed therein (or attached thereto, in other words). In the present embodiment, the housing includes a first support 71 provided with a groove 71a, and a generally-planar second support 72, as shown in FIG. 10.

As shown in FIG. 10, the groove 71a provided in the first support 71 is shaped in conformity with the shape of the lower portion of the information processing device 1. Specifically, the groove 71a is shaped so as to allow the lower portion of the information processing device 1 to be inserted into the groove 71a, and more specifically is shaped to generally match the shape of the lower portion of the information processing device 1. Thus, the information processing device 1 can be placed in the cradle 5 by inserting the lower portion of the information processing device 1 into the groove 71a. The second support 72 supports the surface (i.e., the surface on which the display 12 is provided) of the information processing device 1, of which the lower portion has been inserted into the groove 71a. With the second support 72, the cradle 5 can more stably support the information processing device 1. Note that the shape of the housing shown in FIG. 10 is merely an example, and the housing of the cradle 5 may have any other shape in other embodiments that allows the information processing device 1 to be placed in the cradle 5.

Note that in FIG. 10, the information processing device 1 is placed in the cradle 5 so that the primary surface of the main unit 2 (i.e., the surface of the display 12) faces the second support 72. Note however that in the present embodiment, the information processing device 1 may be placed in the cradle 5 so that the reverse surface of the main unit 2 faces the second support 72. That is, in the present embodiment, a user can place the information processing device 1 in the cradle 5 in the front-facing orientation (i.e., an orientation such that the display 12 can be seen), or place the information processing device 1 in the cradle 5 in the back-facing orientation (i.e., an orientation such that the display 12 is hidden).

As shown in FIG. 10, the cradle 5 also includes the main body terminal 73 for allowing the cradle 5 to communicate with the information processing device 1. As shown in FIG. 10, the main body terminal 73 is provided on the bottom surface of the groove 71a formed in the first support 71. More specifically, the main body terminal 73 is located so as to be in contact with the lower terminal 27 of the information processing device 1 when the information processing device 1 is attached to the cradle 5. In the present embodiment, the main body terminal 73 is a USB connector (more specifically, a male-side connector). Note that in the present embodiment, the information processing device 1 can be attached to the cradle 5 either in the front-facing orientation or in the back-facing orientation, as described above. Thus, the lower terminal 27 of the information processing device 1 and the main body terminal 73 of the cradle 5 are each symmetric with respect to the depth direction (i.e., the z-axis direction shown in FIG. 1), allowing them to communicate with each other whether they are connected in one orientation or the other with respect to the depth direction.

As shown in FIG. 10, the cradle 5 includes a sleep button 74. The sleep button 74 is button for switching between the ON mode and the sleep mode of the main unit 2 attached to the cradle 5. Note that in other embodiments, the sleep button 74 may have the function of turning ON/OFF the power of the main unit 2, in addition to (or instead of) the function of switching between the ON mode and the sleep mode of the main unit 2.

Note that in the present embodiment, the sleep button 74 is provided on the front surface of the first support 71. The sleep button 74 may be provided at any position such that the sleep button 74 can be pressed down with the information processing device 1 attached to the cradle 5. For example, the sleep button 74 may be provided on the side surface of the housing of the cradle 5 or on the back surface of the second support 72.

In the present embodiment, the sleep button 74 includes a light-emitting portion (specifically, LED). The light-emitting portion of the sleep button 74 is used to indicate, to the user, the status of the main unit 2 attached to the cradle 5. That is, the light-emitting portion varies how light is emitted (in other words, how it is lit) depending on the status of the main unit 2 attached to the cradle 5. For example, in the present embodiment, the light-emitting portion is lit when the main unit 2 attached to the cradle 5 is in the ON mode, and the light-emitting portion is turned OFF when the main unit 2 is in the sleep mode or in the power-off mode. Moreover, when the main unit 2 has information that should be indicated to the user (e.g., program update information, announcement, advertisement, etc.), the light-emitting portion blinks. Note that the light-emitting portion does not need to be provided on the sleep button 74, but it may be provided at any position on the housing of the cradle 5, for example.

Figure 13:
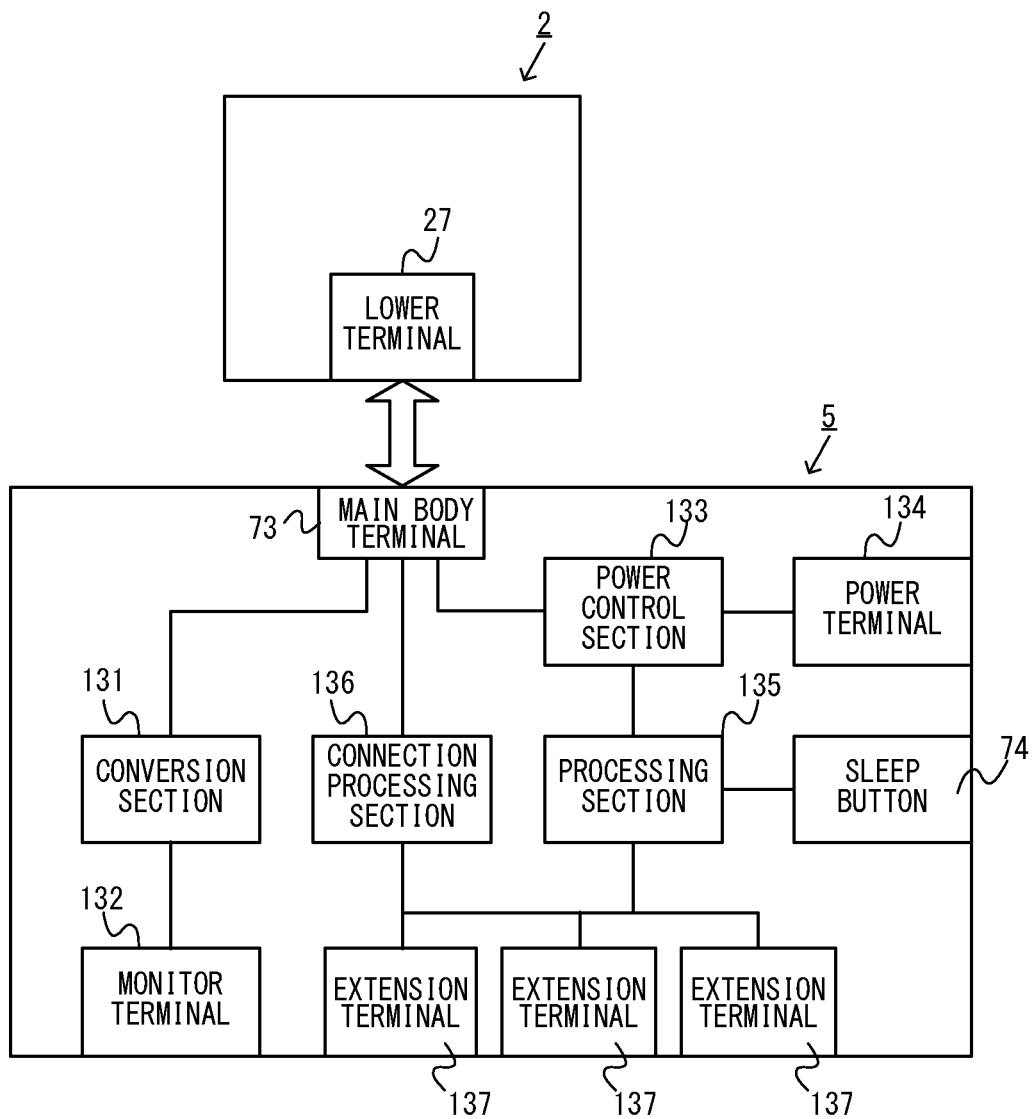
FIG. 13 is a block diagram showing an example internal configuration of the cradle.

Although not shown in FIG. 10, the cradle 5 includes a terminal (in the present embodiment, a plurality of terminals, specifically, a monitor terminal 132, a power terminal 134 and extension terminals 137 shown in FIG. 13) provided on the back surface of the housing. The details of these terminals will be described later.

There is no particular limitation on the shape, the number and the arrangement of the various elements provided on the cradle 5 (specifically, the housing, the terminals and the button) described above. For example, in other embodiments, the housing may have any other shape such that the information processing device 1 can be supported by the housing. Some of the terminals provided on the housing may be provided on the front surface of the housing. In other embodiments, some of the various elements described above may be absent from the cradle 5.

2. Internal Configuration of Various Units

[2-1. Internal Configuration of Main Unit 2]

Figure 11:
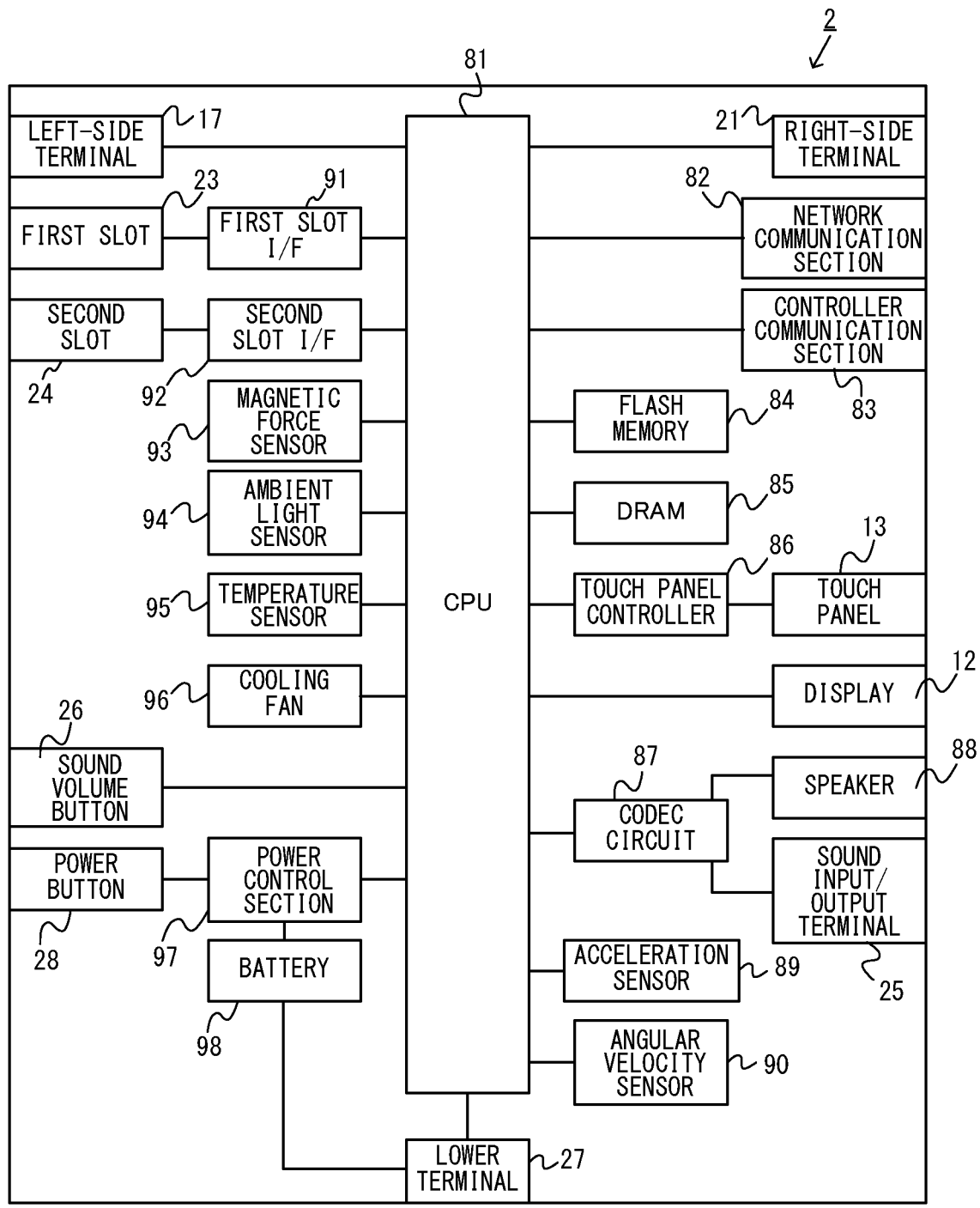
FIG. 11 is a block diagram showing an example internal configuration of the main unit.

FIG. 11 is a block diagram showing an example internal configuration of the main unit 2. In addition to the elements shown in FIG. 3, the main unit 2 also includes elements 81 to 98 shown in FIG. 11. Some of these elements 81 to 98 may be mounted, as electronic components, on an electronic circuit board and accommodated in the housing 11.

(Elements Regarding Execution of Information Process)

The main unit 2 includes a CPU (Central Processing Unit) 81. The CPU 81 is an information processing section for executing various information processes to be executed on the main unit 2. The CPU 81 executes various information processes by executing an information processing program stored in a storage section that can be accessed by the CPU 81 (specifically, an internal storage medium such as a flash memory 84 or external storage media attached to the slots 23 and 24, etc.).

The main unit 2 includes, as an example internal storage medium provided in the main unit 2, the flash memory 84 and a DRAM (Dynamic Random Access Memory) 85. The flash memory 84 and the DRAM 85 are connected to the CPU 81. The flash memory 84 is a memory used primarily for storing various data (which may be programs) saved on the main unit 2. The DRAM 85 is a memory used for temporarily storing various data used in information processes.

The main unit 2 includes a first slot interface (hereinafter abbreviated as "I/F") 91. The main unit 2 also includes a second slot I/F 92. The slot I/Fs 91 and 92 are connected to the CPU 81. The first slot I/F 91 is connected to the first slot 23, and reads and writes data from and to a storage medium of the first type (e.g., an SD card) inserted in the first slot 23, in response to an instruction from the CPU 81. The second slot I/F 92 is connected to the second slot 24, and reads and writes data from and to a storage medium of the second type (e.g., a dedicated memory card) inserted in the second slot 24, in response to an instruction from the CPU 81.

The CPU 81 executes the information processes described above by reading and writing data from and to the memories 84 and 85 and the storage media.

(Elements Regarding Communication)

The main unit 2 includes a network communication section 82. The network communication section 82 is connected to the CPU 81. The network communication section 82 communicates (specifically, in wireless communication) with an external device via a network. In the present embodiment, the network communication section 82 is a Wi-Fi certified communication module, for example, and communicates with an external device via a wireless LAN. Note that in other embodiments, the main unit 2 may have the function of implementing communication by connecting to a mobile communication network (in other words, a mobile telephone communication network), in addition to (or instead of) the function of implementing communication by connecting to a wireless LAN.

The main unit 2 includes a controller communication section 83. The controller communication section 83 is connected to the CPU 81. The controller communication section 83 communicates with the controllers 3 and/or 4 in wireless communication. While there is no particular limitation on the communication scheme between the main unit 2 and the controllers, the controller communication section 83 communicates with the controllers in accordance with the Bluetooth (registered trademark) standard in the present embodiment.

The CPU 81 is connected to the left-side terminal 17, the right-side terminal 21 and the lower terminal 27 described above. When communicating with the left controller 3 in wired communication, the CPU 81 transmits data to the left controller 3 via the left-side terminal 17. When communicating with the right controller 4 in wired communication, the CPU 81 transmits data to the right controller 4 via the right-side terminal 21. When communicating with the cradle 5, the CPU 81 transmits data to the cradle 5 via the lower terminal 27.

Thus, in the present embodiment, the main unit 2 is capable of communicating with the left and right controllers 3 and 4 either in wired communication or in wireless communication. Note that the process of switching between wired communication and wireless communication will be described later.

The main unit 2 can communicate with a plurality of left controllers simultaneously (in other words, in parallel). The main unit 2 can communicate with a plurality of right controllers simultaneously (in other words, in parallel). Therefore, users can make inputs to the information processing device 1 by using a plurality of left controllers and a plurality of right controllers.

(Elements Regarding Input/Output to/from Main Unit 2)

The main unit 2 includes a touch panel controller 86, which is a circuit for controlling the touch panel 13. The touch panel controller 86 is connected to the touch panel 13, and is connected to the CPU 81. Based on a signal from the touch panel 13, for example, the touch panel controller 86 generates data representing the position at which the touch input has been performed, and outputs the data to the CPU 81.

The display 12 described above is connected to the CPU 81. The CPU 81 displays images generated and/or images obtained from outside on the display 12 (e.g., by executing the information processes described above).

The main unit 2 includes a codec circuit 87 and a speaker (specifically, a left speaker and a right speaker) 88. The codec circuit 87 is connected to the speaker 88 and the sound input/output terminal 25, and is also connected to the CPU 81. The codec circuit 87 is a circuit for controlling the input/output of sound data to/from the speaker 88 and the sound input/output terminal 25. That is, when sound data is received from the CPU 81, the codec circuit 87 outputs, to the speaker 88 or the sound input/output terminal 25, a sound signal obtained by performing a D/A conversion on the sound data. Thus, a sound is output from the speaker 88 or a sound output section (e.g., an earphone) connected to the sound input/output terminal 25. When a sound signal is received from the sound input/output terminal 25, the codec circuit 87 performs an A/D conversion on the sound signal and outputs sound data of a predetermined format to the CPU 81.

The sound volume button 26 described above (specifically, the sound volume buttons 26a and 26b shown in FIG. 3) is connected to the CPU 81. The CPU 81 controls the sound volume of the output from the speaker 88 or the sound output section based on an input on the sound volume button 26.

The main unit 2 includes an acceleration sensor 89. In the present embodiment, the acceleration sensor 89 detects the magnitude of the linear acceleration along directions of three predetermined axes (e.g., the xyz axes shown in FIG. 1). Note that the acceleration sensor 89 may detect acceleration in one axis direction or two axis directions.

The main unit 2 includes an angular velocity sensor 90. In the present embodiment, the angular velocity sensor 90 detects the angular velocity about three predetermined axes (e.g., the xyz axes shown in FIG. 1). Note that the angular velocity sensor 90 may detect the angular velocity about one axis or two axes.

The acceleration sensor 89 and the angular velocity sensor 90 are connected to the CPU 81, and the detection results of the acceleration sensor 89 and the angular velocity sensor 90 are output to the CPU 81. Based on the detection results of the acceleration sensor 89 and the angular velocity sensor 90, the CPU 81 can calculate information regarding movement and/or attitude of the main unit 2.

(Elements Regarding Power)

The main unit 2 includes a power control section 97 and a battery 98. The power control section 97 is connected to the battery 98 and the CPU 81. Although not shown in the figure, the power control section 97 is connected to various sections of the main unit 2 (specifically, various sections receiving power supply from the battery 98, the left-side terminal 17 and the right-side terminal 21). The power control section 97 controls the power supply from the battery 98 to the various sections based on an instruction from the CPU 81. The power control section 97 is connected to the power button 28. The power control section 97 controls the power supply to the various sections based on an input on the power button 28. That is, when the power-OFF operation is performed on the power button 28, the power control section 97 stops the power supply to some or all of the various sections, and when the power-ON operation is performed on the power button 28, the power control section 97 starts the power supply to some or all of the various sections. When an instruction to switch to the sleep mode is given to the power button 28, the power control section 97 stops the power supply to some elements, including the display 12, and when an instruction to switch to the ON mode is given to the power button 28, the power control section 97 starts the power supply to the elements. The power control section 97 also outputs, to the CPU 81, information representing the input on the power button 28 (specifically, information indicating whether or not the power button 28 is being pressed).

The battery 98 is connected to the lower terminal 27. Where an external charging device (e.g., the cradle 5) is connected to the lower terminal 27, and power is supplied to the main unit 2 via the lower terminal 27, the battery 98 is charged with the power supplied thereto. Note that in the present embodiment, the charging capacity of the battery 98 of the main unit 2 is larger than the charging capacity of the battery of the controllers 3 and 4 to be described later.

(Other Elements)

The main unit 2 includes a magnetic force sensor (referred to also as a magnetic sensor) 93 for detecting the intensity and/or the direction of a magnetic field. The magnetic force sensor 93 is connected to the CPU 81, and the detection results of the magnetic force sensor 93 are output to the CPU 81. In the present embodiment, the magnetic force sensor 93 is used to detect whether a protection cover (not shown) attached to the information processing device 1 is open or closed. For example, the protection cover is provided with a magnet, and the CPU 81 detects when the primary surface of the main unit 2 is covered by the protection cover based on the detection results of the magnetic force sensor 93. Note that when such a state is detected, the CPU 81 turns OFF the display of the display 12, for example.

The main unit 2 includes the ambient light sensor 94 for detecting the intensity of the ambient light around the main unit 2. The ambient light sensor 94 is connected to the CPU 81, and the detection results of the ambient light sensor 94 are output to the CPU 81. In the present embodiment, the ambient light sensor 94 is used to adjust the brightness of the display 12. That is, the CPU 81 controls the brightness of the display 12 based on the detection results of the ambient light sensor 94.

The main unit 2 includes a cooling fan 96 for radiating heat from inside the main unit 2. With the cooling fan 96 in operation, the air outside the housing 11 is introduced into the housing 11 through the air inlet hole 11*d* and the air inside the housing 11 is discharged through the air outlet hole 11*c*, thereby discharging heat from inside the housing 11. The cooling fan 96 is connected to the CPU 81, and the operation of the cooling fan 96 is controlled by the CPU 81. The main unit 2 includes a temperature sensor 95 for detecting the temperature inside the main unit 2. The temperature sensor 95 is connected to the CPU 81, and the detection results of the temperature sensor 95 are output to the CPU 81. The CPU 81 controls the operation of the cooling fan 96 based on the detection results of the temperature sensor 95.

[2-2. Internal Configuration of Left Controller 3]

Figure 12:
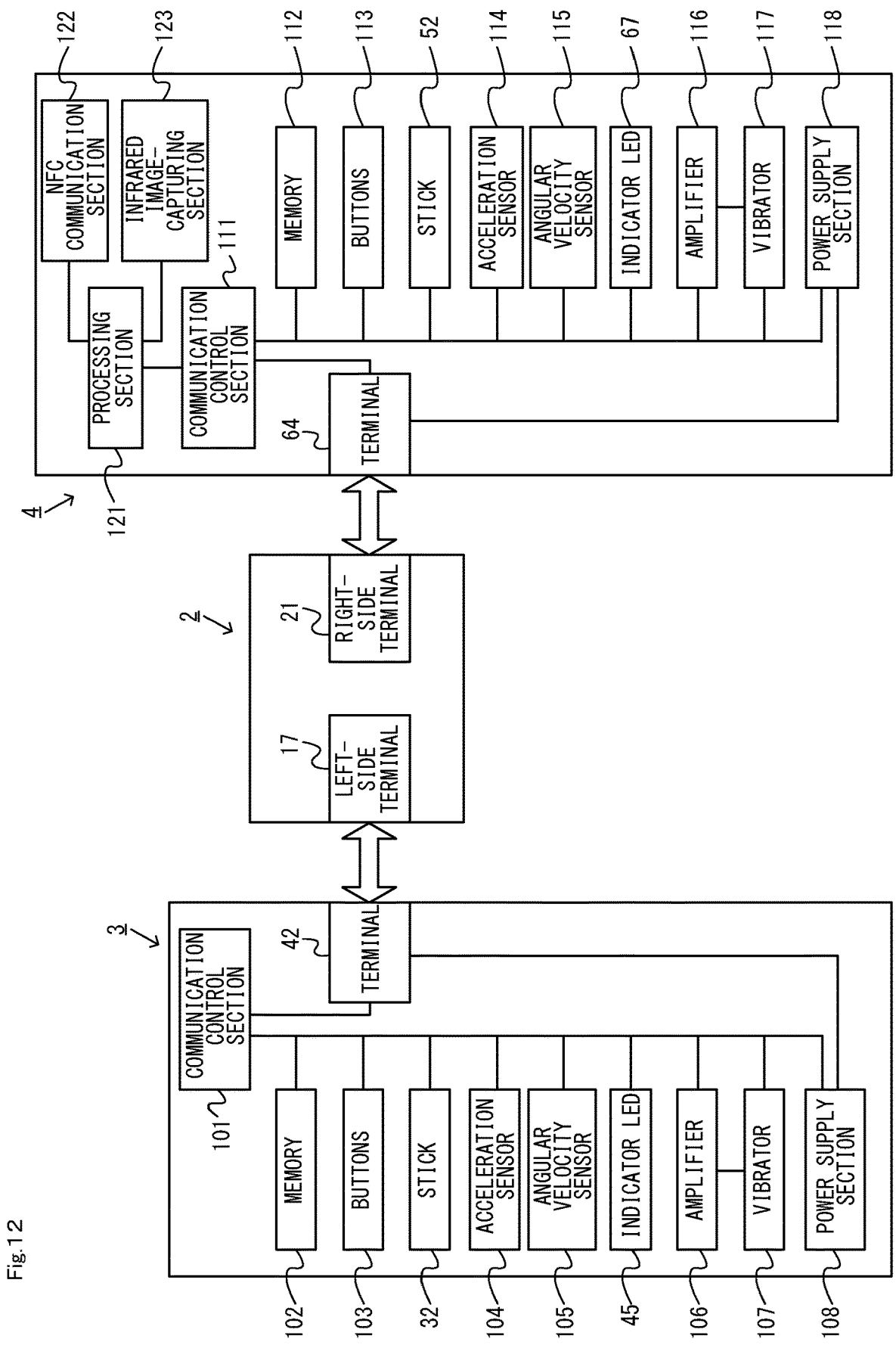
FIG. 12 is a block diagram showing an example internal configuration of the information processing device.

FIG. 12 a block diagram showing an example internal configuration of the information processing device 1. Note that the details of the internal configuration of the information processing device 1 that are related to the main unit 2 are shown in FIG. 11, and are therefore not shown in FIG. 12.

(Elements Regarding Communication)

The left controller 3 includes a communication control section 101 for communicating with the main unit 2. As shown in FIG. 12, the communication control section 101 is connected to various elements including the terminal 42 described above. In the present embodiment, the communication control section 101 is capable of communicating with the main unit 2 both in wired communication via the terminal 42 and in wireless communication without using the terminal 42. The communication control section 101 controls the communication method used by the left controller 3 for communicating with the main unit 2. That is, when the left controller 3 is attached to the main unit 2, the communication control section 101 communicates with the main unit 2 via the terminal 42. When the left controller 3 is detached from the main unit 2, the communication control section 101 communicates with the main unit 2 (specifically, with the controller communication section 83) in wireless communication. The wireless communication between the controller communication section 83 and the communication control section 101 is in accordance with the Bluetooth (registered trademark) standard.

The left controller 3 includes a memory 102 such as a flash memory, for example. The communication control section 101 is a microcomputer (referred to also as a microprocessor), for example, and executes various processes by executing firmware stored in the memory 102.

(Elements Regarding Input)

The left controller 3 includes the buttons 103 (specifically, the buttons 33 to 39, 43 and 44). The left controller 3 includes the analog stick (labeled "stick" in FIG. 12) 32 described above. The buttons 103 and the analog stick 32 repeatedly output, with appropriate timing, information regarding operations performed thereon to the communication control section 101.

The left controller 3 includes an acceleration sensor 104. In the present embodiment, the acceleration sensor 104 detects the magnitude of the linear acceleration along directions of threes predetermined axes (e.g., the xyz axes shown in FIG. 1). Note that the acceleration sensor 104 may detect acceleration in one axis direction or two axis directions.

The left controller 3 includes an angular velocity sensor 105. In the present embodiment, the angular velocity sensor 105 detects the angular velocity about three predetermined axes (e.g., the xyz axes shown in FIG. 1). Note that the angular velocity sensor 105 may detect the angular velocity about one axis or two axes.

The acceleration sensor 104 and the angular velocity sensor 105 are connected to the communication control section 101. The detection results of the acceleration sensor 104 and the angular velocity sensor 105 are repeatedly output, with appropriate timing, to the communication control section 101.

The communication control section 101 obtains input-related information (specifically, information regarding operations or detection results of sensors) from the input sections (specifically, the buttons 103, the analog stick 32 and the sensors 104 and 105). The communication control section 101 transmits operation data including the obtained information (or information obtained by performing a predetermined process on the obtained information) to the main unit 2. Note that operation data is transmitted repeatedly once per a predetermined period of time. Note that the interval at which the input-related information is transmitted to the main unit 2 may or may not be the same among different input sections.

As the operation data is transmitted to the main unit 2, the main unit 2 can know the input that has been performed on the left controller 3. That is, the main unit 2 can determine operations performed on the buttons 103 and the analog stick 32 based on the operation data. The main unit 2 can calculate information regarding movement and/or attitude of the left controller 3 based on the operation data (specifically, the detection results of the sensors 104 and 105).

(Elements Regarding Output)

The indicator LED 45 described above is connected to the communication control section 101. In the present embodiment, the indicator LED 45 is controlled by an instruction from the main unit 2. That is, when the instruction is received from the main unit 2, the communication control section 101 outputs, to the indicator LED 45, a control signal for controlling the lighting of the indicator LED 45 in accordance with the instruction.

The left controller 3 includes a vibrator 107 for indications to the user through vibration. In the present embodiment, the vibrator 107 is controlled by an instruction from the main unit 2. That is, when the instruction is received from the main unit 2, the communication control section 101 drives the vibrator 107 in accordance with the instruction. The left controller 3 includes an amplifier 106. When the instruction is received, the communication control section 101 outputs a control signal in accordance with the instruction to the amplifier 106. The amplifier 106 amplifies the control signal from the communication control section 101 and generates a driving signal for driving the vibrator 107 to give the driving signal to the vibrator 107. This actuates the vibrator 107.

(Elements Regarding Power)

The left controller 3 includes a power supply section 108. In the present embodiment, the power supply section 108 includes a battery and a power control circuit. Although not shown in the figure, the power control circuit is connected to the battery and is connected to the various sections of the left controller 3 (specifically, various sections receiving power supply from the battery). The power control circuit controls the power supply from the battery to the various sections.

The battery is also connected to the terminal 42. In the present embodiment, when the left controller 3 is attached to the main unit 2, the battery is charged with the power supply from the main unit 2 via the terminal 42 under a predetermined condition, the details of which will be described later.

[2-3. Internal Configuration of Right Controller 4]
(Elements Regarding Communication)

As shown in FIG. 12, the right controller 4 includes a communication control section 111 for communicating with the main unit 2. The right controller 4 includes a memory 112 connected to the communication control section 111. The communication control section 111 is connected to various element including the terminal 64 described above. The communication control section 111 and the memory 112 have similar functions to the communication control section 101 and the memory 102 of the left controller 3. Therefore, the communication control section 111 is capable of communicating with the main unit 2 both in wired communication via the terminal 64 and in wireless communication without using the terminal 64 (specifically, communication in accordance with the Bluetooth (registered trademark) standard), and controls the communication method by which the right controller 4 communicates with the main unit 2.

(Elements Regarding Input)

The right controller 4 includes similar input sections (specifically, the buttons 113, the analog stick 52, an acceleration sensor 114 and an angular velocity sensor 115) to those of the left controller 3. These input sections have similar functions and operate in a similar fashion to the input sections of the left controller 3.

(Elements Regarding Output)

The indicator LED 67 of the right controller 4 operates in a similar fashion to the indicator LED 45 of the left controller 3. That is, when the instruction from the main unit 2 is received, the communication control section 111 outputs, to the indicator LED 67, a control signal for controlling the lighting of the indicator LED 67 in accordance with the instruction.

The right controller 4 includes a vibrator 117 and an amplifier 116. The vibrator 117 and the amplifier 116 operate in a similar fashion to the vibrator 107 and the amplifier 106 of the left controller 3. That is, the communication control section 111 actuates the vibrator 117 using the amplifier 116 in accordance with an instruction from the main unit 2.

(Elements Regarding Power)

The right controller 4 includes a power supply section 118. The power supply section 118 has a similar function and operates in a similar fashion to the power supply section 108 of the left controller 3. That is, the power supply section 118 controls the power supply to the various sections receiving power supply from the battery. When the right controller 4 is attached to the main unit 2, the battery is charged with the power supply from the main unit 2 via the terminal 64 under a predetermined condition.

(Other Elements)

The right controller 4 includes an NFC communication section 122. The NFC communication section 122 implements near-field wireless communication in accordance with the NFC (Near Field Communication) standard. The NFC communication section 122 has the function of a so-called NFC reader/writer. For example, the NFC communication section 122 includes an antenna used for the near-field wireless communication, and a circuit (e.g., an NFC chip) for generating a signal (radio wave) to be transmitted from the antenna. Note that the near-field wireless communication is not limited to those based on the NFC standard, but may also be any proximity communication (referred to also as non-contact communication). The proximity communication for example includes communication schemes in which one device generates an electromotive force on the other device by radio waves therefrom (e.g., through electromagnetic induction).

The right controller 4 includes the infrared image-capturing section 123. The infrared image-capturing section 123 includes an infrared camera for capturing an image around the right controller 4. In the present embodiment, the infrared image-capturing section 123 is used to capture an image of a hand of a user. The information processing device 1 identifies an input made with the hand (e.g., a gesture input, etc.) based on information (e.g., the position, the size, the shape, etc.) of the hand of which the image has been captured. The infrared image-capturing section 123 includes an illuminating section for outputting infrared light. The illuminating section outputs infrared light in synchronism with the timing at which the infrared camera captures an image, for example. The infrared light output from the illuminating section is reflected by an object (e.g., a hand of a user), and the reflected infrared light is received by the infrared camera, thus obtaining an image of the infrared light. Thus, it is possible to obtain a clearer infrared light image. Note that while the infrared image-capturing section 123 including an infrared camera is used in the present embodiment, a visible light camera (a camera using a visible light image sensor) may be used, instead of an infrared camera, as an image-capturing device, in other embodiments.

The right controller 4 includes a processing section 121. The processing section 121 is connected to the communication control section 111 and also connected to the NFC communication section 122. The processing section 121 executes a management process for the NFC communication section 122 in response to an instruction from the main unit 2. For example, the processing section 121 controls the action of the NFC communication section 122 in response to an instruction from the main unit 2. The processing section 121 also controls the activation of the NFC communication section 122, and controls the action (specifically, reading and writing, etc.) of the NFC communication section 122 on a communication partner (e.g., an NFC tag). The processing section 121 also receives information to be transmitted to the communication partner from the main unit 2 via the communication control section 111 to pass this information to the NFC communication section 122, and obtains from the NFC communication section 122 information received from the communication partner to transmit this information to the main unit 2 via the communication control section 111.

The processing section 121 executes a management process for the infrared image-capturing section 123 in response to an instruction from the main unit 2. For example, the processing section 121 causes the infrared image-capturing section 123 to perform an image-capturing operation, and obtains information based on the image-capturing result (information of the captured image or information calculated from such information, etc.) to transmit this information to the main unit 2 via the communication control section 111.

[2-4. Internal Configuration of Cradle 5]

FIG. 13 is a block diagram showing an example internal configuration of the cradle 5. Note that the details of the internal configuration regarding the main unit 2 are shown in FIG. 11 and are therefore not shown in FIG. 13.

(Elements Regarding Image Conversion)

As shown in FIG. 13, the cradle 5 includes a conversion section 131 and the monitor terminal 132. The conversion section 131 is connected to the main body terminal 73 and the monitor terminal 132. The conversion section 131 converts a signal format regarding an image (referred to also as a video) and a sound received from the main unit 2 into a format to be output to the TV 6. In the present embodiment, the main unit 2 outputs image and sound signals to the cradle 5 as a display port signal (i.e., a signal in accordance with the DisplayPort standard). In the present embodiment, communication based on the HDMI (registered trademark) standard is used for communication between the cradle 5 and the TV 6. That is, the monitor terminal 132 is an HDMI terminal, and the cradle 5 and the TV 6 are connected together by an HDMI cable. Thus, the conversion section 131 converts the display port signal (specifically, a signal representing a video and a sound) received from the main unit 2 via the main body terminal 73 into an HDMI signal. The converted HDMI signal is output to the TV 6 via the monitor terminal 132.

The cradle 5 includes a processing section 135 for executing various information processes on the cradle 5. The processing section 135 is connected to the sleep button 74 described above, and is connected to the main body terminal 73 via a connection processing section 136 (the details of which will be described later). The processing section 135 detects an operation performed on the sleep button 74, and notifies the main unit 2 of the operation. When receiving such a notification, the main unit 2 switches between the ON mode and the sleep mode thereof. Thus, in the present embodiment, when the main unit 2 is attached to the cradle 5, the ON mode and the sleep mode of the information processing device 1 are switched from one to another in response to the sleep button 74 being pressed down.

(Elements Regarding Charging)

The cradle 5 includes a power control section 133 and the power terminal 134. The power terminal 134 is a terminal for connecting a charging device (not shown) (e.g., an AC adaptor, etc.). In the present embodiment, it is assumed that an AC adaptor is connected to the power terminal 134, and the cradle 5 is receiving commercial power supply.

When the main unit 2 is attached to the cradle 5, the power control section 133 supplies power from the power terminal 134 to the main unit 2 via the main body terminal 73. Thus, the battery 98 of the main unit 2 is charged as described above.

Note that in the present embodiment, the power terminal 134 is a connector (i.e., a female-side USB terminal) of the same shape as the lower terminal 27 of the information processing device 1. Therefore, in the present embodiment, the charging device may be connected to the cradle 5 to charge the information processing device 1 via the cradle 5, or the charging device may be connected directly to the main unit 2 to charge the information processing device 1.

(Other Elements)

The cradle 5 includes the connection processing section 136 and the extension terminals 137. The extension terminals 137 are terminals for connecting other devices. In the present embodiment, the cradle 5 includes a plurality (more specifically, three) of USB terminals as the extension terminals 137. The connection processing section 136 is connected to the main body terminal 73 and the extension terminals 137. The connection processing section 136 has a function of a USB hub, and manages the communication between devices connected to the extension terminals 137 and the main unit 2 connected to the main body terminal 73, for example, (i.e., a signal from one device is appropriately distributed among other devices). As described above, in the present embodiment, the information processing device 1 is capable of communicating with other devices via the cradle 5. Note that the connection processing section 136 may be capable of converting the communication speed or supply power to devices connected to the extension terminals 137.

3. Outline of Operation of Information Processing System

As described above, in the present embodiment, the left and right controllers 3 and 4 can be attached to and detached from the information processing device 1. By being attached to the cradle 5, the information processing device 1 is capable of outputting images (and sound) to the TV 6. Therefore, the information processing device 1 can be used in various modes of use as will be described below. The operation of the information processing system in primary modes of use will now be described.

[3-1. Mode in which Controller is Used Attached to Main Unit]

FIG. 14 is a diagram showing an example of how the information processing device 1 is used with the controllers 3 and 4 attached to the main unit 2 (referred to as the "attached state"). As shown in FIG. 14, when the controllers 3 and 4 are attached to the main unit 2, the information processing device 1 can be used as a portable device (e.g., a portable game device).

In the attached state, the main unit 2 and the controllers 3 and 4 communicate with each other in wired communication (i.e., communication between devices connected together via terminals). That is, the main unit 2 receives operation data from the controllers 3 and 4 attached thereto, and executes an information process based on the received operation data (specifically, by using operation data as an input).

Note that in other embodiments, the main unit 2 and the controllers may communicate with each other in wireless communication in the attached state. In the attached state, wireless communication may not work properly because the main unit 2 and the controllers are too close to each other. In contrast, in the present embodiment, the main unit 2 and the controllers communicate with each other in wired communication in the attached state, thereby improving the reliability of communication.

Note that in the attached state, the four operation buttons 33 to 36 of the left controller 3 may be used to give a directional input (in other words, a directional instruction). Then, a user can make a directional input by using the analog stick 32 or can make a directional input by using the operation buttons 33 to 36. A user is allowed to make a directional input by using a preferred operation mechanism, thereby improving the controllability. Note however that the instruction each operation button is assigned can be freely determined by the program executed on the main unit 2.

In the present embodiment, the arrangement of the analog stick and the four operation buttons (i.e., A, B, X and Y buttons) is reversed between the left controller 3 and the right controller 4. That is, in the attached state, the analog stick 32 is arranged above the four operation buttons 33 to 36 on the left controller 3, whereas the four operation buttons 53 to 56 are arranged above the analog stick 52 on the right controller 4. Therefore, as shown in FIG. 14, when the information processing device 1 is held with the left hand and the right hand at the same height (in other words, at the same position with respect to the up-down direction), it will be easier for one hand to operate the analog stick and for the other hand to operate the four operation buttons. That is, in the present embodiment, it is possible to provide an information processing device, with which it is easy to operate an analog stick and four operation buttons.

Note that controllers of different configurations (e.g., configurations having different functions, configurations where operation sections are arranged differently, etc.) from the present embodiment may be provided as the left controller and/or the right controller (see "[5-1. Other types of controllers]), the details of which will be described later. Then, it is possible to provide an information processing device that can be operated in a different fashion from the present embodiment (i.e., the information processing device 1 shown in FIG. 14) by attaching the left controller and/or the right controller having a different configuration to the main unit 2, instead of the left controller 3 and/or the right controller 4 of the present embodiment.

[3-2. Mode in which a Pair of Controllers are Used Detached]

As described above, in the present embodiment, the information processing device 1 can be used with the left and right controllers 3 and 4 detached from the main unit 2 (referred to as the "detached state). Possible modes in which the information processing device 1 is used in the detached state include at least two modes, one in which a single user uses two controllers 3 and 4, and another in which two users each use one controller.

(Mode in which Single User Uses Two Controllers)

Figure 15:
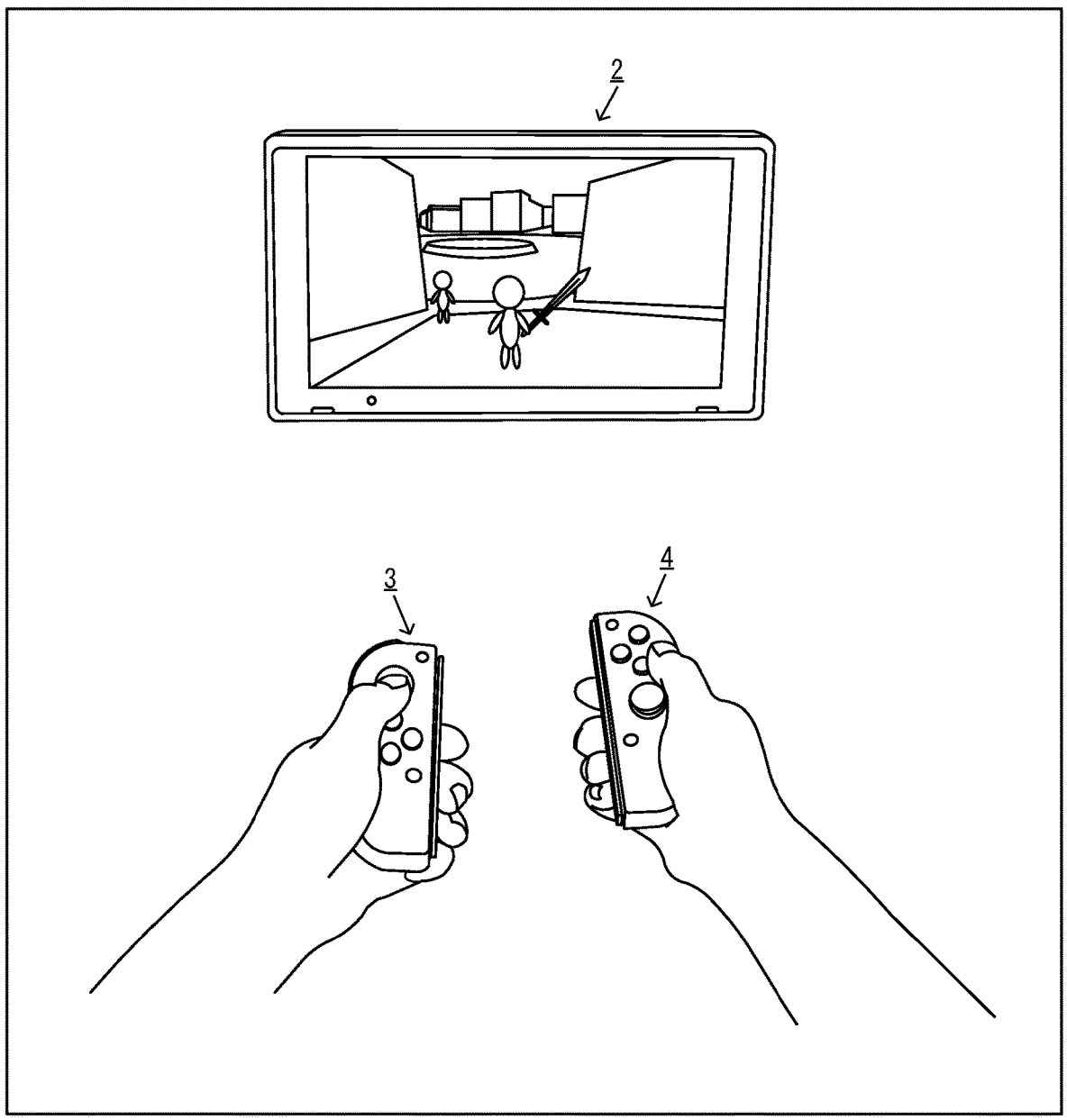
FIG. 15 is a diagram showing an example of a single user holding two controllers to use the information processing device in a detached state.

FIG. 15 is a diagram showing an example of a single user holding two controllers 3 and 4 to use the information processing device 1 in the detached state. As shown in FIG. 15, in the detached state, a user can operate one set of two controllers 3 and 4 by holding them respectively in the left hand and the right hand.

Note that in the present embodiment, it is possible to calculate information regarding the movement and/or the attitude of a controller based on the detection results of the acceleration sensor and/or the angular velocity sensor provided in the controller. Therefore, the information processing device 1 can accept, as an input, the operation of moving the controller itself. A user is allowed to not only perform an operation on the operation sections (the operation buttons and the analog stick) of the controller but also perform an operation of moving the controller itself. That is, in the present embodiment, the information processing device 1, being a portable device, can allow a user to perform an operation of moving the controller (without moving the display). Also, the information processing device 1, being a portable device, can allow a user to perform an operation away from the display 12.

Note that the information processing device 1 can calculate information regarding movement and/or attitude of the information processing device 1 based on the detection results of the acceleration sensor 89 and/or the angular velocity sensor 90 provided in the main unit 2 not only in the detached state but also in the attached state.

In the detached state, the main unit 2 and the controllers 3 and 4 communicate with each other using wireless communication. That is, the main unit 2 receives operation data from the controllers 3 and 4 with which a wireless connection has been established (i.e., which have been paired with the main unit 2), and executes an information process based on the received operation data (specifically, using the operation data as an input).

In the present embodiment, for wireless communication, the main unit 2 distinguishes between two controllers which are communication partners. That is, the main unit 2 identifies whether the received operation data is from the left controller 3 or from the right controller 4. The method for distinguishing between controllers will be described later.

(Mode in which Two Users Each Use One Controller)

Figure 16:
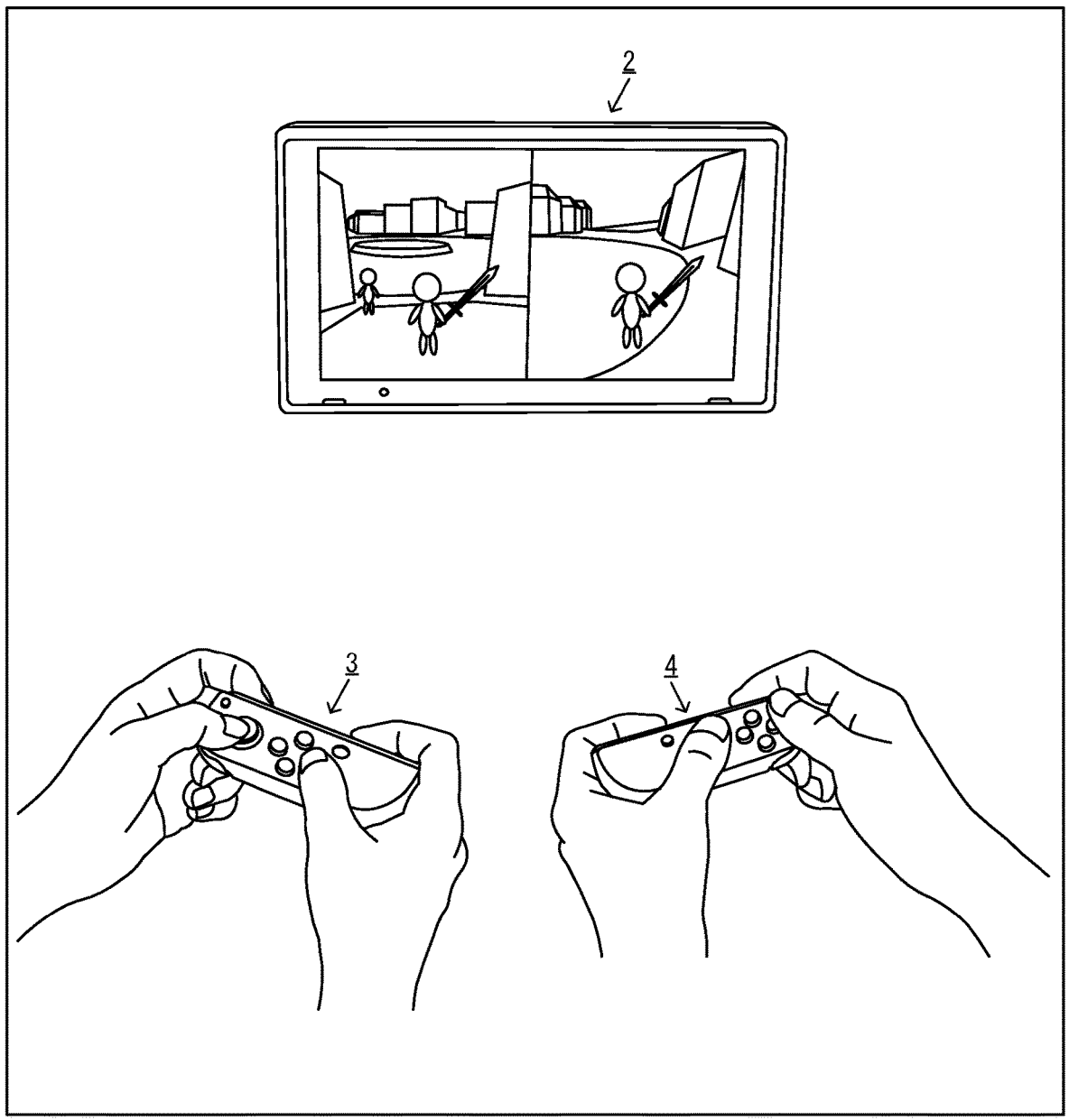
FIG. 16 is a diagram showing an example of two users each holding one controller to use the information processing device in a detached state.

FIG. 16 is a diagram showing an example of two users each holding one controller to use the information processing device 1 in the detached state. As shown in FIG. 16, in the detached state, two users can each perform an operation. Specifically, one user (referred to as the "first user") can perform an operation by using the left controller 3 while the other user (referred to as the "second user") can perform an operation by using the right controller 4. For example, the information processing device 1 executes an information process of controlling the action of a first object (e.g., the player character) in a virtual space based on an operation performed on the left controller 3, and controlling the action of a second object in the virtual space based on an operation performed on the right controller 4. Note that as in the mode shown in FIG. 15, also in the mode shown in FIG. 16, a user can operate the operation sections provided on the controller and/or perform an operation of moving the controller itself.

In the present embodiment, the positional relationship between the analog stick 52 and the operation buttons 53 to 56 on the right controller 4 is opposite from the positional relationship between these two types of operation sections on the left controller 3. Therefore, if two users hold the left controller 3 and the right controller 4 in the same orientation, as shown in FIG. 16, for example, the positional relationship between the two types of operation sections on one of the two controllers will be the same as that on the other controller. That is, in the present embodiment, users can use the left controller 3 and the right controller 4 detached from the main unit 2 in the same fashion with respect to the two types of operation sections. Thus, it is possible to improve the controllability of the controller.

In the detached state, the four operation buttons 33 to 36 of the left controller 3 may be used for the same function as the four operation buttons 53 to 56 of the right controller 4 (in other words, they may be used for giving the same instructions). Specifically, the right direction button 33 may be used for the same function as the Y button 56, the lower direction button 34 for the same function as the X button 55, the upper direction button 35 for the same function as the B button 54, and the left direction button 36 for the same function as the A button 53. Thus, in the present embodiment, the function of the operation buttons 33 to 36 may vary between the attached state and the detached state. Note however that the instruction each operation button is assigned can be freely determined by the program executed on the main unit 2.

Note that in FIG. 16, the information processing device 1 divides the display area of the display 12 into two display areas to display an image for the first user (e.g., an image including the first object) in one of the display areas and an image for the second user (e.g., an image including the second object) in the other display area. Note however that depending on the application running on the information processing device 1, the information processing device 1 may display an image for two users (e.g., an image including both the first object and the second object) without dividing the display area of the display 12.

As in the mode shown in FIG. 15, also in the mode shown in FIG. 16, the main unit 2 and the controllers 3 and 4 communicate with each other in wireless communication. Then, the main unit 2 distinguishes between controllers each being a communication partner.

(Other Modes)

In the present embodiment, the right controller 4 includes the infrared image-capturing section 123. Therefore, with the right controller 4 detached from the main unit 2, the information processing device 1 may execute an information process based on the image-capturing results (referred to also as detection results) from the infrared image-capturing section 123. Examples of the information process include the following processes.

For example, when an attachment including an operation section (hereinafter referred to as an "extension controller") is attached to the right controller 4, the main unit 2 can detect an operation performed on the operation section based on the image-capturing results from the infrared image-capturing section 123. Therefore, the main unit 2 can execute an information process in accordance with an operation performed on the operation section by using the image-capturing results.

Specifically, the extension controller can be attached and detached to and from the right controller 4, and include buttons and a movable operation section such as a stick, for example. The extension controller includes, inside the housing, a movable portion that moves (herein, the movement includes rotation) in response to an operation performed on an operation section. For example, the movable portion is a member configured to move in response to a button, which is an operation section, being pressed down. Here, the extension controller is attached to the right controller 4 so that the infrared image-capturing section 123 can capture an image of the movable portion inside the housing. For example, the housing of the extension controller is provided with a window portion, and the infrared image-capturing section 123 can capture an image of the movable portion via the window portion, with the extension controller attached to the right controller 4. Then, the main unit 2 can identify an operation performed on an operation section of the extension controller based on the position and/or the attitude of the movable portion in the image captured by the infrared image-capturing section 123. Thus, by using captured images, the main unit 2 may execute an information process in response to an operation performed on the operation section.

The main unit 2 may detect a gesture input by using a hand of a user based on the image-capturing results from the infrared image-capturing section 123 so as to execute an information process in accordance with the gesture input. For example, a user holds the right controller 4 in one hand, and an image is captured of the other hand of the user using the infrared camera of the infrared image-capturing section 123. Note that in the present embodiment, the infrared camera is arranged so as to capture an image of an area under the right controller 4. Therefore, a user makes a gesture input by placing the other hand under the right controller 4. The main unit 2 obtains information based on the image-capturing results from the right controller 4 so as to identify a gesture input made by a user. Then, the main unit 2 executes an information process based on the gesture input.

A gesture input may be any input made by using an operation object to be operated (moved) by a user. An operation object may be a body of a user (which may be a part of the body, such as a hand or the face, or may be the whole body), may be an object held by a user, or may include both. The information processing device 1 may recognize the shape of the operation object as a gesture input, may recognize the position, the orientation and/or the movement of the operation object as a gesture input, or may recognize a combination thereof as a gesture input. For example, a user can make a gesture input by using the shape of a hand, the movement of a hand, the position of a hand (with respect to the right controller 4), the orientation (attitude) of a hand, etc.

In addition to (or instead of) identifying a gesture input, the infrared image-capturing section 123 may be used to calculate the position and/or the orientation of the right controller 4 with respect to a predetermined marker. For example, a user may place a marker at an intended position (e.g., around the display 12 or around the TV 6), and perform an operation of moving the right controller 4 within such a range that the infrared camera can capture an image of the marker. Note that the marker may be made of a material that reflects infrared light, for example. Then, the information processing device 1 can calculate the position and/or the orientation of the right controller 4 with respect to the marker based on the image-capturing results from the infrared image-capturing section 123. Moreover, the information processing device 1 can execute an information process by using the calculated information as a user's operation input.

The main unit 2 can also capture an image of a hand of a user (specifically, the vein pattern of the hand) by means of the infrared image-capturing section 123, to thereby authenticate (specifically, by vein authentication) a user based on the captured image. Moreover, the main unit 2 can also measure the pulse of a user by capturing an image of a hand of the user by means of the infrared image-capturing section 123. That is, where infrared light output onto and reflected by a hand of a user is detected by the infrared image-capturing section 123, the main unit 2 can calculate the pulse of the user based on changes in the reflected waves.

Note that the above description has been directed to an example where the infrared image-capturing section 123 is used when the right controller 4 is detached from the main unit 2. Now, the information processing device 1 can also execute an information process based on the image-capturing results from the infrared image-capturing section 123 with the right controller 4 attached to the main unit 2.

In the present embodiment, the main unit 2 is provided with input sections (specifically, the touch panel 13, the acceleration sensor 89, the angular velocity sensor 90, etc.). Therefore, a user can use only the main unit 2 with the controllers 3 and 4 detached therefrom. Then, a user can use the information processing device 1 while the weight thereof is reduced.

In the present embodiment, the information processing device 1 may be used with one of the left controller 3 and the right controller 4 detached from the main unit 2 and with the other controller attached to the main unit 2. Then, the main unit 2 may communicate with the first controller in wireless communication and communicate with the second controller in wired communication.

[3-3. Mode in which Three or More Controllers are Used]

As described above, in the present embodiment, the main unit 2 can communicate with a plurality of left controllers. The main unit 2 can also communicate with a plurality of right controllers. Therefore, in the present embodiment, three or more controllers can be used simultaneously.

FIG. 17 is diagram showing example modes of use where three or more controllers are used. FIG. 17 shows cases in which a total of four controllers, i.e., two left controllers 3*a* and 3*b* and two right controllers 4*a* and 4*b*, are used. Note that it is assumed here that the controllers are detached from the main unit 2. When four controllers are used, one can possibly conceive at least a mode in which four users each use one controller (FIG. 17(*a*)), and a mode in which two users each use two controllers (specifically, a pair of left and right controllers) (FIG. 17(*b*)).

(Mode in which Each User Uses One Controller)

In FIG. 17(*a*), each user uses one of the four controllers 3*a*, 3*b*, 4*a* and 4*b*. That is, in the present embodiment, where four controllers are provided, four users, User A to User D, are allowed to perform operations each using a controller.

For example, based on an operation performed on a controller, the information processing device 1 executes an information process of controlling the action of an object associated with that controller. Note that also in the modes of use shown in FIG. 17, as in the modes of use shown in FIG. 15 and FIG. 16, each user is allowed to perform an operation on an operation section provided on the controller and/or to perform an operation of moving the controller itself.

In FIG. 17(a), the main unit 2 communicates, in wireless communication, with each of the four controllers 3a, 3b, 4a and 4b. In the present embodiment, the main unit 2 distinguishes the four controllers 3a, 3b, 4a and 4b from one another. That is, the main unit 2 identifies from which of the four controllers the operation data has been received. Note that in the case of FIG. 17(a), the main unit 2 distinguishes between the left controller 3a and the left controller 3b, and distinguishes between the right controller 4a and the right controller 4b. Note that the method for distinguishing each controller will be described later.

(Mode in which Each User Uses a Pair of Controllers)

In FIG. 17(b), each user uses a pair of controllers from the four controllers 3a, 3b, 4a and 4b. That is, User A uses a pair of the left controller 3a and the right controller 4a, and User B uses a pair of the left controller 3b and the right controller 4b. Thus, in the present embodiment, where four controllers are provided, two users can each operate a pair of controllers (which can also be referred to as a set of controllers).

The information processing device 1 executes an information process using, as a set of data, two pieces of operation data received from a pair of controllers. For example, based on operations performed on a pair of controllers, the information processing device 1 executes an information process of controlling the action of an object associated with the pair of controllers. Specifically, the action of the first object is controlled based on operations performed on the left controller 3a and the right controller 4a, and the action of the second object is controlled based on operations performed on the left controller 3b and the right controller 4b.

Now, in the present embodiment, in the mode of use shown in FIG. 17(b), the main unit 2 registers each pair of a left controller and a right controller used by a single user. The main unit 2 executes an information process by using operation data from the two controllers included in the registered pair as a set of data (e.g., as operation data for controlling one control object).

While there is no particular limitation on the method for registering a pair of controllers, a left controller and a right controller can be attached to the main unit 2 so as to register the controllers as a pair, in the present embodiment. That is, the main unit 2 registers, as a pair of controllers, a left controller and a right controller that are attached thereto at the same time. For example, when registering pairs of controllers shown in FIG. 17(b), a user first attaches the left controller 3a and the right controller 4a to the main unit 2 and detaches these two controllers, i.e., the left controller 3a and the right controller 4a from the main unit 2, after which the other controllers, i.e., the left controller 3b and the right controller 4b, are attached to the main unit 2. Then, a pair of the left controller 3a and the right controller 4a and a pair of the left controller 3b and the right controller 4b can be registered with the main unit 2. Note that the details of the pairing process will be described later.

Note that where three or more controllers are used, the information processing system can be used in various other modes, other than the modes of use shown in FIG. 17. For example, the information processing system can be used in a mode in which a user uses a pair of left and right controllers while another user uses one controller. For example, a user can use a controller or controllers attached to the main unit 2 while another user uses a controller or controllers detached from the main unit 2.

[3-4. Mode in which Image is Displayed on TV]

Figure 18:
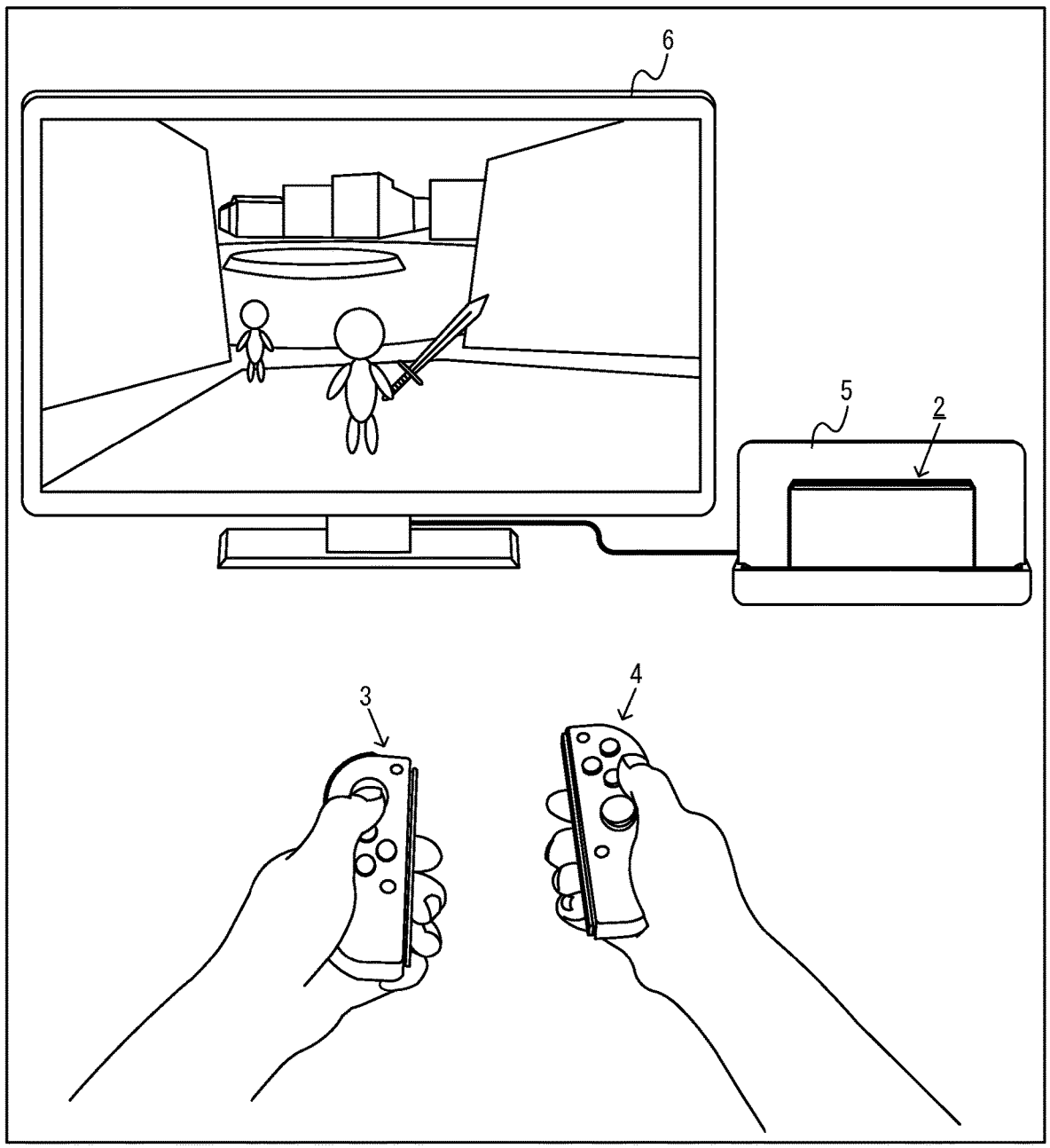
FIG. 18 is a diagram showing an example mode of use where the image is displayed on a TV.

As described above, in the present embodiment, when the information processing device 1 is attached to the cradle 5, the information processing device 1 can output images (and sound) to the TV 6 via the cradle 5. FIG. 18 is a diagram showing an example mode of use where images are displayed on a TV. As shown in FIG. 18, the information processing system in the present embodiment can use the TV 6 as a display device (and a sound output device).

[3-4-1. Operation when Image is Displayed on TV]

Figure 19:
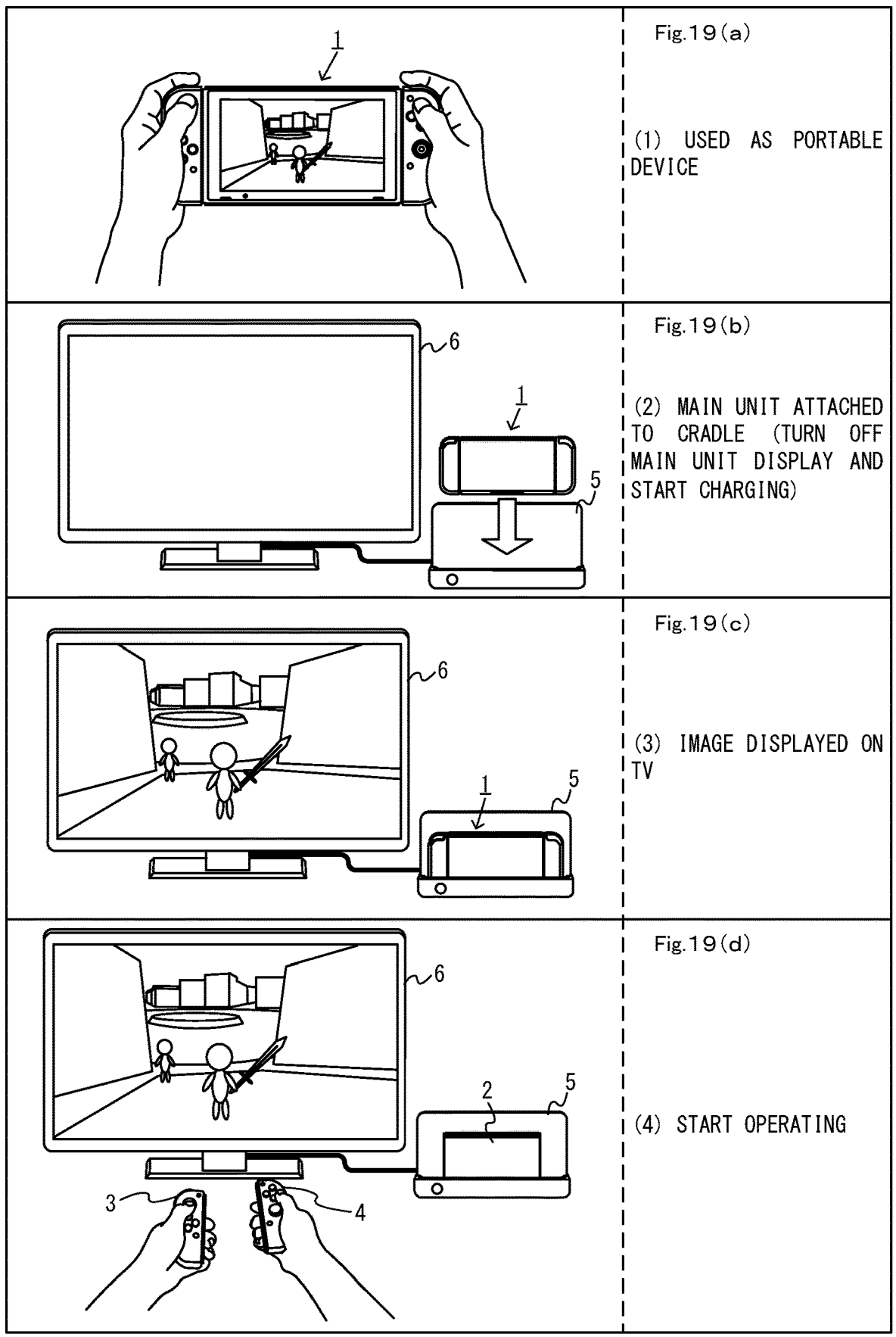
FIG. 19(a) is a diagram showing a state in which an information processing device is not attached to a cradle.
FIG. 19(b) is a diagram showing a state in which the information processing device is attached to the cradle.
FIG. 19(c) is a diagram showing a state in which the information processing device is attached to the cradle and a TV outputs images and sound.
FIG. 19(d) is a diagram showing a state in which operations can be performed using controllers.

FIG. 19 is diagram showing an example operation flow in which images are displayed on a TV. The operation of switching from a mode in which the information processing device 1 is used as a portable device to a mode in which it is used as a console device (i.e., using the TV 6 as a display device) will be described. Note that it is assumed here that the cradle 5 is connected to the TV 6 in advance. It is also assumed that a charging device (not shown) (e.g., an AC adaptor) is connected to the power terminal 134 of the cradle 5, and the cradle 5 is receiving commercial power supply.

First, a user uses the information processing device 1 as a portable device, i.e., in a state in which it is not attached to the cradle ((1) shown in FIG. 19(a)). In this state, when switching to a mode in which the information processing device 1 is used as a console device, the user attaches the information processing device 1 to the cradle 5 ((2) shown in FIG. 19(b)). Thus, the lower terminal 27 of the information processing device 1 and the main body terminal 73 of the cradle 5 are connected together. In this process, the information processing device 1 with the controllers 3 and 4 attached thereto may be attached to the cradle 5, or the information processing device 1 with the controllers 3 and 4 detached therefrom (i.e., the main unit 2) may be attached to the cradle 5.

Note that in the present embodiment, upon detecting the attachment of the information processing device 1 to the cradle 5, the information processing device 1 turns off the display 12, the details of which will be described later. Thus, in the present embodiment, the display 12 of the main unit 2 is not used when attached to the cradle 5. Note that in other embodiments, the main unit 2 may still display images on the display 12 when attached to the cradle 5. In the present embodiment, upon detecting the detachment of the information processing device 1 from the cradle 5, the information processing device 1 turns on the display 12.

As described above, in the present embodiment, the information processing device 1 can be attached to the cradle 5 either in the front-facing orientation or in the back-facing orientation. This allows a user to place the information processing device 1 in any orientation, thereby facilitating the attachment to the cradle 5.

Note that in other embodiments, the cradle 5 may be capable of supporting the information processing device 1 in the back-facing orientation (i.e., in an orientation in which the display 12 is hidden facing the second support 72) and not capable of supporting the information processing device 1 in the front-facing orientation (i.e., in an orientation in which the display 12 is not hidden). In the present embodiment, the display 12 is turned off when the information processing device 1 is placed in the cradle 5. Although turning off the display 12 is the intended operation by the information processing device 1, a user may possibly mistake the display 12 being turned off for a breakdown or a malfunction. This can be avoided by not allowing the information processing device 1 to be placed in the cradle 5 in the front-facing orientation.

In the present embodiment, upon detecting the attachment of the information processing device 1 to the cradle 5, the cradle 5 starts charging the information processing device 1. That is, upon detecting the attachment of the information processing device 1 to the cradle 5, the processing section 135 instructs the power control section 133 to perform an operation of supplying power from the power terminal 134 to the main unit 2. As the power control section 133 starts this operation, the cradle 5 starts charging the main unit 2. That is, the battery 98 in the main unit 2 is charged by the power supplied from the cradle 5 via the lower terminal 27.

If a controller (specifically, the left controller 3 and/or the right controller 4) is attached to the main unit 2 while the main unit 2 is charged by the cradle 5, the main unit 2 charges the controller attached thereto. That is, in such a case, the power control section 97 of the main unit 2 supplies the power from the cradle 5 via the lower terminal 27 to the controller via a terminal corresponding to the controller attached to the main unit 2 (specifically, the left-side terminal 17 and/or the right-side terminal 21). Thus, the controller is charged. That is, when the left controller 3 is charged, the battery of the power supply section 108 is charged by the power supplied via the terminal 42. When the right controller 4 is charged, the battery of the power supply section 118 is charged by the power supplied via the terminal 64.

Note that in other embodiments, the cradle 5 may charge the main unit 2 under a predetermined condition. For example, the power control section 133 of the cradle 5 may perform charging on the condition that the remaining charge of the battery 98 of the main unit 2 attached to the cradle 5 is less than or equal to a predetermined level. Similarly, the main unit 2 may charge a controller under a predetermined condition. For example, the power control section 97 of the main unit 2 may perform charging on the condition that the remaining charge of the battery of a controller attached to the main unit 2 is less than or equal to a predetermined level.

The above operation regarding charging may be executed even when the power of the information processing device 1 is off. That is, even when the information processing device 1 is attached to the cradle 5 when the power of the information processing device 1 is off, the cradle 5 may charge the information processing device 1 (i.e., charge the main unit 2 and/or controllers).

Moreover, in other embodiments, the main unit 2 may charge controllers when the main unit 2 is not attached to the cradle 5. This reduces the possibility that a user can no longer play because the battery of the controller has run out even though the battery 98 of the main unit 2 is still charged sufficiently. As described above, in the present embodiment, the battery 98 of the main unit 2 has a greater charging capacity than the battery of a controller. Thus, it is possible to further reduce such a possibility described above.

When the information processing device 1 is attached to the cradle 5, under a predetermined condition, the information processing device 1 outputs images (and sound) to the TV 6 and causes the TV 6 to output the images (and the sound) ((3) shown in FIG. 19(*c*)). That is, the information processing device 1 transmits data of the images and the sound to be output to the cradle 5 under a predetermined condition. Note that "the images and the sound to be output" in the present embodiment, refer to the images and the sound that are produced or obtained by a program (e.g., an OS program or an application program) running at a point in time when the information processing device 1 is attached to the cradle 5. For example, if a game application is running at such a point in time, the information processing device 1 outputs, to the cradle 5, data of the images and the sound that are produced by the game application. For example, if an application for obtaining and reproducing video images from the Internet is running at such a point in time, the information processing device 1 transmits, to the cradle 5, data of the images and the sound that are obtained by the application.

Note that there is no particular limitation on the condition for the image and the sound to be output to be transmitted to the cradle 5 (referred to as the "image output condition"), but the image output condition in the present embodiment is the satisfaction of Conditions 1 to 3 below.

Condition 1: the cradle 5 is connected to the TV 6.
Condition 2: the cradle 5 is receiving power supply.
Condition 3: the cradle 5 is an authorized product (or a genuine product) (in other words, the cradle 5 is a product that is authorized by the manufacturer of the information processing device 1).

When these three conditions are satisfied, the information processing device 1 determines that the image output condition is satisfied. In this case, the information processing device 1 transmits, to the cradle 5, the image and the sound to be output. Note that in other embodiments, the information processing device 1 may use, as the image output condition, one or two conditions of Conditions 1 to 3 above, or may use other conditions, as the image output condition, in addition to (or instead of) Conditions 1 to 3 above.

Upon receiving data of the images and the sound from the information processing device 1, the cradle 5 transmits data of the images and the sound to the TV 6. Thus, "the images and the sound to be output" are output from the TV 6 ((3) shown in FIG. 19(*c*)). When the TV 6 is ready to output the images and the sound, a user is allowed to perform operations using controllers ((4) shown in FIG. 19(*d*)).

Note that when no image is displayed on the display 12 of the information processing device 1 (i.e., when the power is off, or when in the sleep mode), no image is displayed on the TV 6 even if the information processing device 1 is attached to the cradle 5.

In the present embodiment, even if the image output condition is not satisfied, the information processing device 1 turns off the image display on the display 12 while attached to the cradle 5. Note however that in other embodiments, if the image output condition is not satisfied, the information processing device 1 may resume the image display on the display 12.

As described above, in the present embodiment, the image display output can be switched from the display 12 to the TV 6 by attaching the information processing device 1 to the cradle 5 while images are displayed on the display 12 of the information processing device 1. That is, in the present embodiment, a user can easily (and seamlessly) switch the image display output only by placing the information processing device 1 on the cradle 5.

Note that as described above, in the present embodiment, the information processing device 1 can be used in a mode of use in which the images are displayed on the display 12 and a mode of use in which the images are displayed on the TV 6. Now, in the present embodiment, the information processing device 1 changes its operation mode depending on these two modes of use. That is, the information processing device 1 can operate at least in two different modes of the portable mode and the console mode. In the portable mode, some of the functions of the information processing device 1 are limited, the details of which will be described later. Note that the switching of the operation mode will be described later (see "[3-5. Changing operation mode]" and "[4-3. Mode setting process]").

Note that in other embodiments, the information processing device 1 may be allowed to communicate directly with the TV 6 (i.e., with no cradle 5 interposed therebetween). Then, the information processing device 1 can transmit the image and/or the sound directly to the TV 6. Note that there is no particular limitation on the communication method used between the information processing device 1 and the TV 6, and it may be, for example, wired communication using a cable (e.g., an HDMI cable) or wireless communication. If the information processing device 1 communicates directly with the TV 6, the cradle 5 may be used for the purpose of charging the information processing device 1, for example. Also in such a case, as in the case of the embodiment described above, the information processing device 1 may transmit the image and/or the sound to the TV 6 at least on the condition that the information processing device 1 is attached to the cradle 5.

[3-4-2. Mode of Use where Image is Displayed on TV]

Where the image and the sound are output from the TV 6, a user can perform operations by using a controller or controllers ((4) shown in FIG. 19). In the case described above, since the main unit 2 is attached to the cradle 5, it is difficult to use the controllers 3 and 4 while the controllers 3 and 4 are attached to the main unit 2. Therefore, in the case described above, a user may perform operations by using a controller or controllers detached from the main unit 2. For example, a user detaches the left controller 3 and/or the right controller 4 from the main unit 2 as necessary, and performs operations. Now, in the present embodiment, the controllers 3 and 4 can be detached from the main unit 2 by sliding them upward against the main unit 2. Therefore, a user can conveniently detach the controllers 3 and 4 from the main unit 2 while the main unit 2 remains attached to the cradle 5.

Note that if controllers other than the controllers 3 and 4 attached to the main unit 2 can communicate with the main unit 2 in wireless communication, such other controllers may be used.

If a controller detached from the main unit 2 is used in a mode of use in which images are displayed on the TV 6, the controller and the main unit 2 communicate with each other in wireless communication.

The mode of use where the TV 6 is used as a display device is similar to the modes of use described above in "[3-2. Mode in which a pair of controllers are used detached]" and "[3-3. Mode in which three or more controllers are used]", except that the TV 6 is used instead of the display 12. That is, in the present embodiment, also in the case where the TV 6 is used as a display device, as in the case in which the display 12 is used, one user may perform operations using a pair of controllers (see FIG. 18), or two users may perform operations each using one controller. When controllers other than the left controller 3 and the right controller 4 are provided, three or more users may perform operations each using one controller, or two or more users may perform operations each using a pair of controllers.

[3-5. Changing Operation Mode]

As described above, in the present embodiment, the information processing device 1 can be used in a mode of use in which images are displayed on the display 12 and a mode of use in which images are displayed on the TV 6. In the present embodiment, the information processing device 1 changes its operation mode depending on these two modes of use. That is, the information processing device 1 can operate at least in two different modes of the portable mode and the console mode.

The portable mode is a mode in which the information processing device 1 is used as a portable device. In the portable mode, images obtained or produced by the information processing device 1 are displayed on the display 12. Sound obtained or produced by the information processing device 1 is output from the speaker 88. In the portable mode, settings of the information processing device 1 are changed as shown in (a) and (b) below.

(a) Setting for Limiting Processing Power of Main Unit 2

In the present embodiment, in the portable mode, the clock frequency range over which the CPU 81 is allowed to operate is limited. In the present embodiment, the clock frequency at which the CPU 81 is allowed to operate can be specified within a predetermined range by the program executed on the main unit 2. In the portable mode, the range over which a clock frequency can be specified by the program is limited as compared with that in the console mode. For example, the range over which a clock frequency can be specified in the console mode is X1 [Hz] or less, whereas it is limited to X2 (<X1) [Hz] in the portable mode. Note that if the main unit 2 includes a GPU (Graphics Processing Unit) in addition to a CPU, the range of processing power (i.e., clock frequency) may be limited for the CPU and/or for the GPU.

In the present embodiment, in the portable mode, the image rendering capacity (which can also be referred to as the image generating capacity) is limited. Specifically, in the portable mode, the resolution (in other words, the number of pixels) of images generated by the main unit 2 is lower than that in the console mode.

With the limitation (a) above, the amount of computation to be executed on the main unit 2 is limited in portable mode, and it is therefore possible to reduce the heat generation and the power consumption of the main unit 2.

(b) Setting for Limiting Operation of Cooling Fan 96

In the present embodiment, in the portable mode, the operation of the cooling fan 96 is limited. Specifically, in the portable mode, the rotations per minute (rpm) at which the cooling fan 96 is allowed to operate (in other words, the fan speed) is limited to be lower than the highest rpm at which the cooling fan 96 is allowed to operate in the console mode. For example, in the portable mode, the cooling fan 96 is controlled to operate at a predetermined rpm or less, which is lower than the maximum rpm.

With the limitation (b) above, it is possible to reduce the operation noise of the cooling fan 96. In the portable mode, it is assumed that a user uses the main unit 2 close to the user. In view of this, in the present embodiment, since the operation noise of the cooling fan 96 can be reduced in the portable mode, it is possible to reduce the possibility that the user may feel the operation noise is too loud.

On the other hand, the console mode is a mode in which the information processing device 1 is used as a console-type device. In the console mode, images obtained or produced by the information processing device 1 are displayed on the TV 6. The sound obtained or produced by the information processing device 1 is output from the speaker of the TV 6. In the console mode, the function suppressions in the portable mode are lifted. That is, in the console mode, the limitations (a) and (b) described above are lifted. Therefore, in the console mode, a program running on the information processing device 1 can make better use of the processing power of the CPU 81. The information processing device 1 can display, on the TV 6, images of a higher resolution than in the portable mode. The information processing device 1 can be cooled by the cooling fan 96 more effectively than in the portable mode.

In the present embodiment, the switching between the portable mode and the console mode is done as follows. That is, when the information processing device 1 is attached to the cradle 5 and the image output condition described above is satisfied, the information processing device 1 switches the operation mode to the console mode. On the other hand, when the information processing device 1 is detached from the cradle 5, the information processing device 1 switches the operation mode to the portable mode. Note that the switching of the operation mode will be described later (see FIG. 24).

Note that differences between settings in the portable mode and those in the console mode are not limited to those described above. For example, in other embodiments, the information processing device 1 may impose only one of the limitations (a) and (b) described above in the portable mode. For example, in other embodiments, the information processing system may use different communication methods for the communication with external devices via a network (e.g., the Internet) (in other words, may switch between different communication methods) in the portable mode and in the console mode. For example, consider a case in which a predetermined network connection device is connected to the cradle 5, the predetermined network connection device having a function of connecting to and communicating with the network. In such a case, in the portable mode, the information processing device 1 may communicate with the network using the network communication section 82. On the other hand, in the console mode, the information processing device 1 may communicate with the network via the cradle 5 and the network connection device.

For example, in an application executed by the information processing device 1, settings in the application may be changed between the portable mode and the console mode. For example, in a game application, particulars of the game (e.g., the rules, the operation method, etc., of the game) may be changed between the portable mode and the console mode (see FIG. 25).

Note that the operation mode (the portable mode and the console mode) is of a different level from the ON mode and the sleep mode. That is, the main unit 2 may be either in the ON mode or in the sleep mode when the operation mode is the portable mode. Or, the main unit 2 may be either in the ON mode or in the sleep mode when the operation mode is the console mode.

4. Specific Example of Process of Information Processing System

Next, some processes to be executed when the information processing system operates as described above will be described by way of more specific examples.

[4-1. Registration Process]

As described above, in the present embodiment, the main unit 2 and the controllers 3 and 4 communicate with each other. Thus, the main unit 2 executes a registration process for registering controllers so that the main unit 2 can identify controllers to communicate with the main unit 2. Note that those controllers offered (specifically, sold) together with the main unit 2 may be pre-registered with the main unit 2 at the time of offering.

Figure 20:
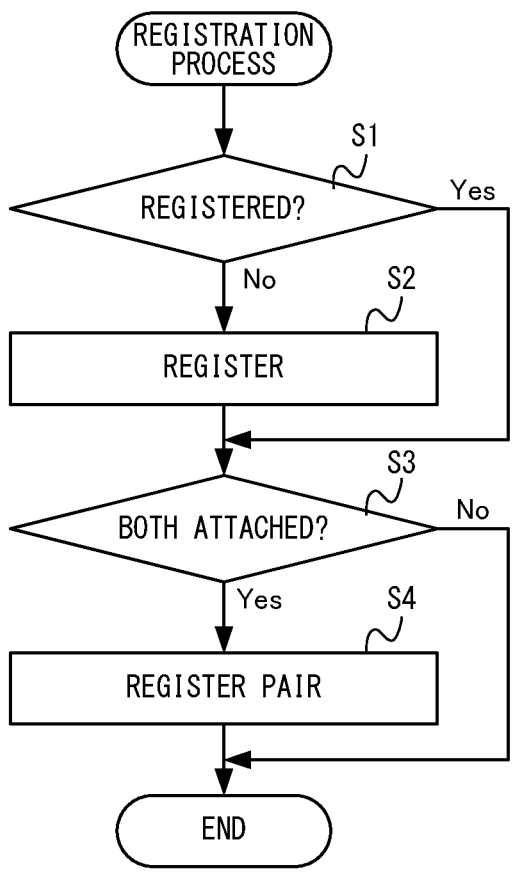
FIG. 20 is a flow chart showing an example flow of a registration process executed on the main unit.

FIG. 20 is a flow chart showing an example flow of a registration process executed on the main unit 2. In the present embodiment, the registration process is executed in response to a controller being attached to the main unit 2. That is, the main unit 2 detects the attachment of the left controller 3 or the right controller 4, and starts executing the registration process shown in FIG. 20 in response to detecting the attachment.

There is no particular limitation on the method for detecting a controller being attached to the main unit 2. For example, the sensing method may be a method based on a signal state (e.g., a voltage state) at a predetermined pin included in the terminal of the main unit 2 and/or controller. For example, the sensing method may be a method in which the subject device mechanically senses the connection of a terminal of another device thereto. The main unit 2 and a controller may both have the sensing function described above, or either one of them may have the sensing function. Where only one of the devices has the sensing function, that device may indicate, to the other device, that the connection has been sensed, as necessary.

Note that the processes of the steps of the flow chart shown in FIG. 20 (this similarly applies to the flow charts in FIG. 23 to FIG. 27 to be discussed later) are merely illustrative, and the order of steps may be switched around as long as similar results are obtained, and other processes may be executed in addition to (or instead of) the process of any step. While the present embodiment is described assuming that the processes of the steps of the flow chart are executed by the CPU 81 of the main unit 2, processes of some of the steps of the flow chart may be executed by a processor or a dedicated circuit other than the CPU 81. Some of the processes executed by the main unit 2 may be executed by another information processing device capable of communicating with the main unit 2 (e.g., a server capable of communicating with the main unit 2 via a network). That is, the processes shown in FIG. 20, FIG. 23 to FIG. 27 may be executed through a cooperation of a plurality of information processing devices including the main unit 2.

In the registration process shown in FIG. 20, first, in step S1, the CPU 81 determines whether or not the controller sensed to have been attached to the main unit 2 has been registered. Now, in the present embodiment, the main unit 2 stores, in a storage section thereof (e.g., the flash memory 84), registration information representing controllers that have been registered. The determination of step S1 is based on this registration information.

FIG. 21 is a diagram showing an example registration information. In the present embodiment, the registration information is information in which number information, identification information and wireless communication information are associated together, as shown in FIG. 21. The number information is a number assigned to a registered controller. The indicator LED described above on the controller may be controlled to represent a value based on this number.

The identification information is information representing a value (e.g., an ID) that is uniquely assigned to a controller. With this identification information, it is possible to uniquely identify a controller. In the present embodiment, identification information includes information representing whether a controller is a left controller or a right controller. That is, the main unit 2 can determine whether a controller is a left controller or a right controller based on the identification information assigned to the controller. Note that in other embodiments, the identification information does not need to include information representing whether a controller is a left controller or a right controller. In such a case, the registration information may include information representing whether a controller is a left controller or a right controller (separately from the identification information). Note that the CPU 81 can determine whether a controller is a left controller or a right controller based on whether the identification information of the controller has been obtained through the left-side terminal 17 or through the right-side terminal 21.

The wireless communication information indicates whether or not the connection setting (i.e., pairing) of the device for wireless communication with the main unit 2 has been done. That is, if the pairing between the main unit 2 and the controller has been done, information representing "registered" is stored as the wireless communication information of the controller. On the other hand, if the pairing between the main unit 2 and the controller has not been done, information representing "unregistered" is stored as the wireless communication information of the controller. Note that the main unit 2 may store information regarding the connection setting for wireless communication (separately from the registration information) so as to eliminate the need to perform pairing again for a controller for which pairing has been done.

Note that a part of the registration information may be deleted or changed in response to an instruction from a user. For example, the main unit 2 may delete information regarding a specified controller or change a number assigned to the controller, in response to an instruction from a user.

Referring back to FIG. 20, in step S1 described above, the CPU 81 first obtains identification information from a controller sensed to have been attached. Note that it is assumed that a memory of a controller (e.g., the memories 102 and 112) stores, in advance, identification information assigned to the controller. A controller transmits the identification information thereof to the main unit 2 in response to the controller being connected to the main unit 2 or in response to a request from the CPU 81. The CPU 81 determines whether or not a controller sensed to have been attached has been registered based on whether or not the obtained identification information is included in the registration information. If the determination result of step S1 is negative, the process of step S2 is executed. On the other hand, if the determination result of step S1 is affirmative, the process of step S3 is executed, skipping the process of step S2.

In step S2, the CPU 81 registers a controller sensed to have been attached. That is, the CPU 81 updates the registration information stored in the storage section so that the number information, the identification information and the wireless communication information of the controller are associated together and added to the registration information. The number information may be, for example, information representing a number that has not been used for any other registered controller. The identification information may be identification information obtained from the controller in step S1 described above. The wireless communication information is set to "unregistered" since pairing has not been done at this point in time. Following step S2, the process of step S3 is executed.

In step S3, the CPU 81 determines whether or not both a left controller and a right controller are attached to the main unit 2. That is, it is determined whether or not the attachment of the left controller 3 and the right controller 4 to the main unit 2 can be sensed at the present point in time. If the determination result of step S3 is affirmative, the process of step S4 is executed. On the other hand, if the determination result of step S3 is negative, the CPU 81 ends the registration process, skipping the process of step S4.

In step S4, the CPU 81 registers the left controller 3 and the right controller 4 attached to the main unit 2 as a pair. Now, in the present embodiment, the main unit 2 stores pairing information representing a pair of a left controller and a right controller in the storage section (e.g., the flash memory 84).

FIG. 22 is a diagram showing an example of pairing information. In the present embodiment, as shown in FIG. 22, the pairing information is information in which left identification information and right identification information are associated together. The left identification information is identification information of a left controller registered as a pair, from among registered controllers (in other words, controllers represented by identification information included in the registration information). The right identification information is identification information of a right controller registered as a pair, from among registered controllers (in other words, controllers represented by identification information included in the registration information). Left identification information and right identification information that are associated together in the pairing information represent a pair of a left controller and a right controller.

In step S4 described above, the CPU 81 first obtains identification information of the left controller and the right controller attached to the main unit 2. Note that for a controller whose identification information has been obtained in step S1 described above, the identification information does not need to be obtained again. Next, the CPU 81 adds, to the pairing information, the obtained identification information of the left controller and that of the right controller, while they are associated together. That is, the CPU 81 updates pairing information so as to add the pair of two identification information obtained to the pairing information (strictly speaking, unupdated pairing information). Then, the updated pairing information is stored in the storage section. Note that if information representing the pair of two identification information is already included in the pairing information, the CPU 81 does not need to update the pairing information. If information representing a pair including one of the two identification information is already included in the pairing information, the CPU 81 deletes such a pair from the pairing information. Thus, any pair including one of two controllers that are included in a pair to be registered is unregistered (i.e., deleted from the pairing information). After step S4, the CPU 81 ends the registration process.

As described above, in the present embodiment, in response to a controller being attached to the main unit 2, the controller is registered with the main unit 2. Thus, a user can easily register controllers. In the present embodiment, since the registration process is executed when the main unit 2 and the controllers communicate with each other in wired communication, it is possible to reduce the possibility that the main unit 2 cannot obtain information (specifically, identification information) from controllers, and to reduce the possibility that registration fails.

In the present embodiment, in response to a left controller and a right controller being both attached to the main unit 2, these two controllers are registered as a pair. A user can attach any two controllers that the user wishes to use as a pair to the main unit 2, and the user can therefore register a pair through an easy and straightforward operation.

Note that in the present embodiment, an accessory (see FIG. 31) may be provided to which a left controller and a right controller can be attached at the same time, the details of which will be described later. Then, when a left controller and a right controller are both attached to the accessory, the main unit 2 registers these two controllers as a pair, as when a left controller and a right controller are both attached to the main unit 2. The details of such a pairing process will be described in "[5-2. Accessory for controllers]" below.

Note that the main unit 2 may register, as a pair, two controllers attached to the main unit 2 at the same time as in the embodiment described above, or may register, as a pair, two controllers that are not attached to the main unit 2 at the same time, unlike in the embodiment described above. For example, the main unit 2 may register, as a pair, a left controller last attached thereto and a right controller last attached thereto.

Note that in other embodiments, any other pairing method may be used for registering pairs of controllers. For example, the main unit 2 may register, as a pair, two controllers on which a predetermined operation is performed within a predetermined period of time. Specifically, the main unit 2 prompts a user to perform a predetermined operation in response to satisfaction of a predetermined condition (e.g., a pairing instruction has been received from a user). Then, the main unit 2 registers, as a pair, two controllers on which the predetermined operation is performed within a predetermined period of time from the prompting, from among two or more controllers being in communication with the main unit 2. Note that the "predetermined operation" may be, for example, an operation of pressing A button, or may be an operation of bumping two controllers against each other (this operation can be determined, for example, based on detection results of an acceleration sensor).

[4-2. Wireless Setting Process]

As described above, in the present embodiment, the main unit 2 and the controllers 3 and 4 may communicate with each other in wireless communication. Therefore, in the present embodiment, the information processing device 1 performs a registration (referred to also as pairing) for enabling wireless communication between the main unit 2 and the controllers. Note that those controllers offered (specifically, sold) together with the main unit 2 may be pre-registered with the main unit 2 for wireless communication at the time of offering.

Figure 23:
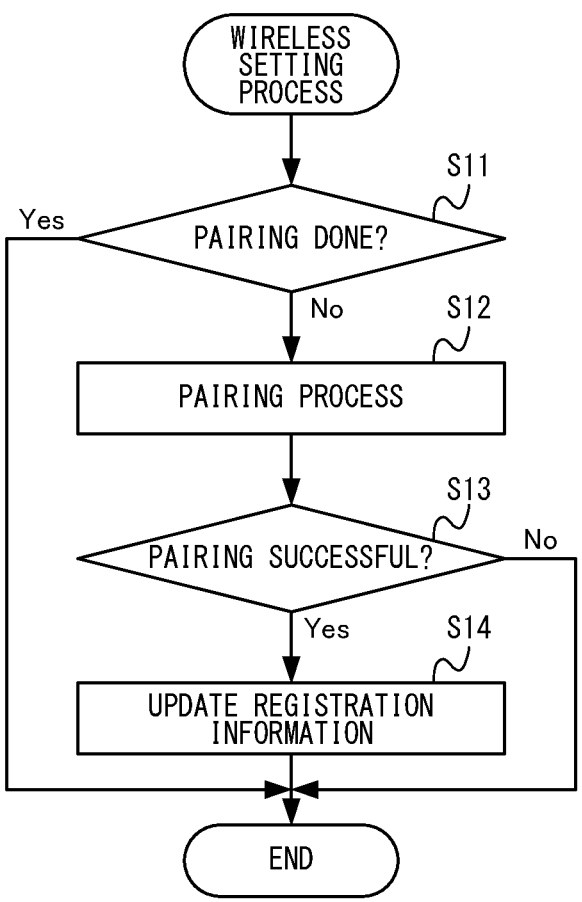
FIG. 23 is a flow chart showing an example flow of a wireless setting process executed on the main unit.

In the present embodiment, the main unit 2 executes a wireless setting process for enabling wireless communication with controllers. FIG. 23 is a flow chart showing an example flow of a wireless setting process executed on the main unit 2. In the present embodiment, the wireless setting process is executed in response to a controller being removed from the main unit 2. That is, the main unit 2 senses the removal of the left controller 3 or the right controller 4, and starts executing the wireless setting process shown in FIG. 23 in response to the removal (referred to as "detachment"). Note that although there is no particular limitation on the method for sensing the detachment of a controller from the main unit 2, a similar method to the method for sensing the attachment of a controller to the main unit 2 may be used, for example.

In the wireless setting process, first, in step S11, the CPU 81 determines whether or not the controller sensed to have been detached from the main unit 2 has been paired for wireless communication. This determination can be done by using the registration information described above. That is, if wireless communication information included in the registration information indicates "registered" for the controller sensed to have been detached, the CPU 81 determines that the controller has been paired for wireless communication. On the other hand, if wireless communication information included in the registration information indicates "unregistered" for the controller sensed to have been detached, the CPU 81 determines that the controller has not been paired for wireless communication. If the determination result of step S11 is negative, the process of step S12 is executed. On the other hand, if the determination result of step S11 is affirmative, the CPU 81 ends the wireless setting process, skipping the process of step S12.

In step S12, the CPU 81 executes a pairing process for enabling wireless communication with a controller sensed to have been detached. The pairing process in the present embodiment may be similar to a pairing process of a conventional communication technique in accordance with the Bluetooth (registered trademark) standard. Note that in the present embodiment, a controller executes the pairing process in response to being removed from the main unit 2, the details of which will be described later. Thus, the main unit 2 and the controller are paired together, establishing a wireless connection therebetween. Following step S12, step S13 is executed.

In step S13, the CPU 81 determines whether or not the pairing with the controller sensed to have been detached has succeeded. Note that the process of step S13 is executed after lapse of a predetermined period of time from the execution of step S12. If the determination result of step S13 is affirmative, the process of step S14 is executed. On the other hand, if the determination result of step S13 is negative, the CPU 81 ends the wireless setting process, skipping the process of step S14.

In step S14, the CPU 81 updates the registration information. That is, the CPU 81 changes the wireless communication information included in the registration information to "registered" for the controller sensed to have been detached. Following step S14, the CPU 81 ends the wireless setting process.

In the present embodiment, for the wireless setting process, the controllers 3 and 4 execute a similar process (referred to as a "controller-side wireless setting process") to that of the main unit 2. Specifically, a controller stores registration information in a storage section (e.g., the memories 102 and/or 112), wherein identification information of the main unit to which the controller is attached and wireless communication information indicating that whether or not the controller has been paired with the main unit are associated together in the registration information. A controller (specifically, the communication control section 101 or 111) determines whether or not it has been paired with the main unit 2 in response to the removal from the main unit 2. If it has not been paired, the controller executes the pairing process. Moreover, the controller determines whether or not the pairing has succeeded, and updates the registration information if the pairing has succeeded. Thus, in the present embodiment, when a controller is removed from the main unit 2, the main unit 2 and the controller each perform the pairing process, and a wireless connection is established upon successful pairing.

As described above, in the present embodiment, in response to the removal of a controller from the main unit 2, a setting process for wireless communication between the main unit 2 and the controller is executed to establish a wireless connection. In the present embodiment, a controller communicates in wired communication while it is attached to the main unit 2, and in wireless communication while it is removed from the main unit 2. Therefore, by executing the setting process when the controller is removed from the main unit 2, it is possible to establish a wireless connection with appropriate timing. Note that in the present embodiment, since a controller is registered when the controller is attached to the main unit 2 for the first time, the setting process is executed when the controller is removed from the main unit 2 for the first time. Then, it is possible to reduce the possibility that "the wireless connection is not established when a registered controller is removed from the main unit 2", thus providing the information processing device 1 that is easy to use for a user. Moreover, according to the present embodiment, a user can easily cause the information processing device 1 to execute the setting process described above by removing a controller from the main unit 2.

Note that the condition on which the setting process for wireless communication is executed on the information processing device 1 may be any condition, and it not limited to the removal of a controller from the main unit 2. For example, in other embodiments, the setting process may be executed in response to a controller being attached to the main unit 2. For example, in other embodiments, the setting process may be executed in response to an instruction from a user. Specifically, the main unit 2 may execute the wireless setting process (FIG. 23) in response to a predetermined instruction from a user. The predetermined instruction may be given by a user selecting a predetermined item displayed on a menu screen, or may be given by a user pressing a predetermined button provided on the main unit 2. Moreover, in response to a predetermined instruction from a user, a controller may execute the "controller-side wireless setting process" described above. This predetermined instruction may be given by pressing down a predetermined button provided on the controller.

In the present embodiment, when a controller is removed from the main unit 2, the main unit 2 and the controller each determine whether or not the controller and the main unit 2 have been paired together, so that the pairing process is executed if they have not been paired together. In other embodiments, the main unit 2 and the controller may execute the pairing process, upon removal of the controller from the main unit 2, without performing the determination process.

(Operation on Controller)

In the present embodiment, if a controller is attached to the main unit 2, the controller regards the main unit 2 as its communication partner. That is, the controller transmits operation data in wired communication to the main unit 2, to which the controller is attached. On the other hand, if a controller is not attached to the main unit 2 but the controller has been paired with another main unit 2, the controller regards the other main unit 2 as its communication partner. That is, the controller transmits operation data in wireless communication to the other main unit 2, with which the controller has been paired. Thus, in the present embodiment, the controller transmits operation data to the main unit 2, irrespective of whether it is attached to the main unit 2. Note that in the present embodiment, if a controller has been paired with a plurality of main units 2, the controller regards one main unit that satisfies a predetermined condition as its communication partner. Although there is no particular limitation on the predetermined condition, it may be, for example, "being the main unit with which the controller has last been paired". Note that if a controller is not attached to the main unit 2 and there is no main unit 2 with which the controller has been paired, the controller does not transmit operation data.

If a controller is able to communicate with a main unit 2, the controller repeatedly transmits operation data to the main unit 2, as its communication partner, at a rate of once per a predetermined period of time. If there is no main unit 2 with which a controller is able to communicate (i.e., where the main unit 2 as its communication partner has been turned OFF or set in the sleep mode), the controller stops transmitting operation data to a main unit 2. If there is newly a main unit 2 with which a controller is able to communicate (i.e., where the main unit 2 as its communication partner has been turned ON or set in the ON mode), the controller resumes transmitting operation data to the main unit 2.

[4-3. Mode Setting Process]

As described above, in the present embodiment, the information processing device 1 operates in the portable mode and in the console mode. Therefore, the information processing device 1 executes a process (referred to as the "mode setting process") of switching the operation mode between the portable mode and the console mode.

Figure 24:
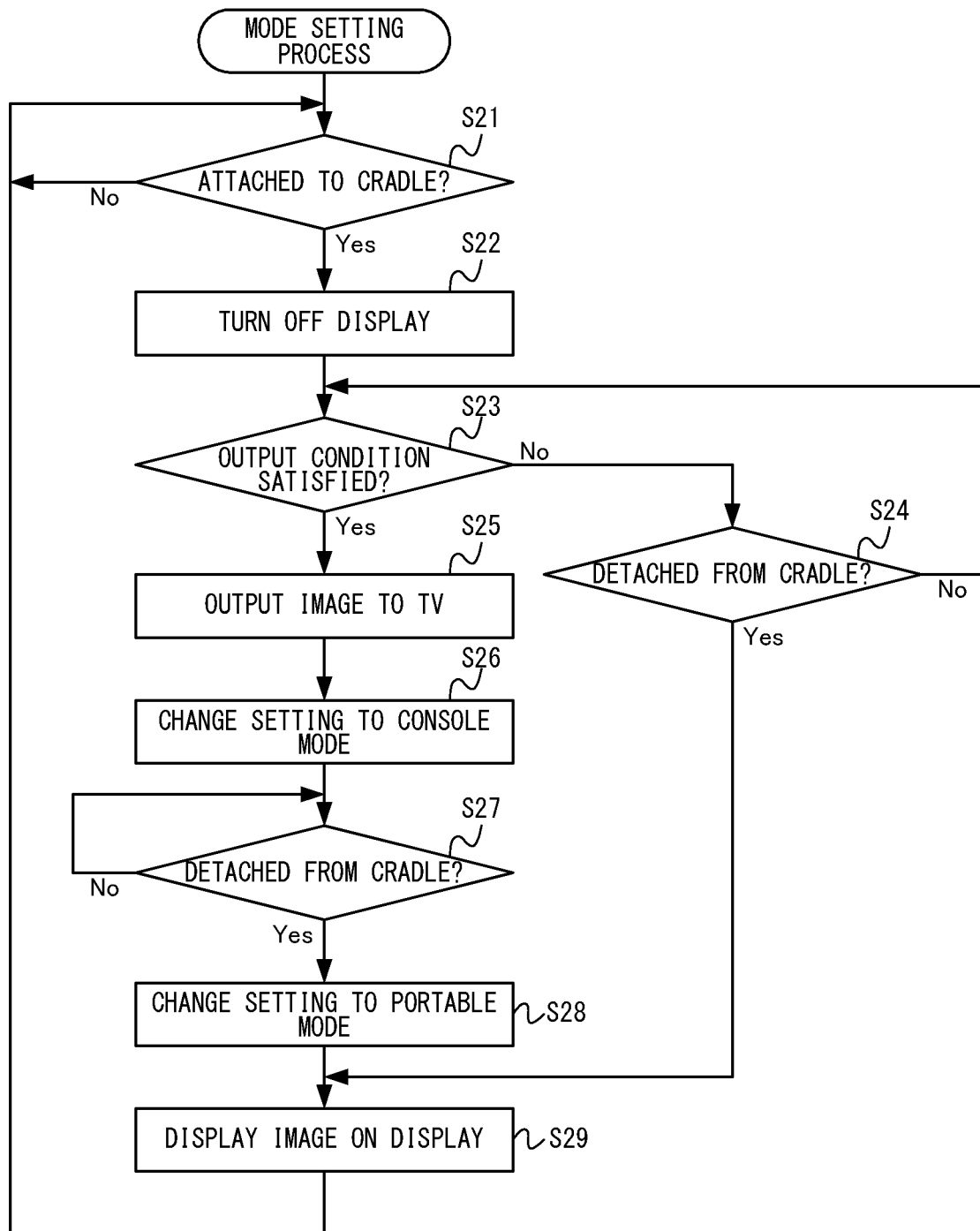
FIG. 24 is a flow chart showing an example flow of a mode setting process executed on the main unit.

FIG. 24 is a flow chart showing an example flow of a mode setting process executed on the main unit 2. In the present embodiment, while the power of the main unit 2 is ON, a series of processes of steps S21 to S29 shown in FIG. 24 is executed repeatedly. Note that in the present embodiment, it is assumed that at the start of the process (i.e., when the power is turned ON), the operation mode of the main unit 2 is set to the portable mode.

In the mode setting process, first, in step S21, the CPU 81 determines whether or not the main unit 2 is attached to the cradle 5. Note that there is no particular limitation on the method for sensing the attachment of the main unit 2 to the cradle 5. For example, the CPU 81 may perform the sensing based on a signal state (e.g., a voltage state) at a predetermined pin included in the terminal of the main unit 2 and/or the cradle 5. If the determination result of step S21 is affirmative, the process of step S22 is executed. On the other hand, if the determination result of step S21 is negative, the process of step S21 is executed again. That is, while the operation mode is the portable mode and the main unit 2 is not attached to the cradle 5, the CPU 81 repeatedly executes the process of step S21. The process of step S21 is executed at a rate of once per a predetermined period of time, for example.

In step S22, the CPU 81 turns off the display 12. Specifically, the CPU 81 stops supplying power to the display 12. The CPU 81 also stops outputting image data to the display 12. Following step S22, the process of step S23 is executed.

As described above, the main unit 2 turns OFF the display 12 at a point when the main unit 2 is attached to the cradle 5. Note that in other embodiments, the main unit 2 may turn OFF the display 12 at a point when the image is output from the main unit 2 to the TV 6, rather than turning OFF the display 12 (i.e., the display 12 is left ON) at the point when the main unit 2 is attached to the cradle 5. In other embodiments, the main unit 2 may not turn OFF the display 12 even when the image is output from the main unit 2 to the TV 6 so that the image is displayed both on the display 12 and on the TV 6. Then, the cradle 5 may be configured so that the display 12 can be viewed while the main unit 2 is attached to the cradle 5. The main unit 2 may generate two different images so that different images are displayed on the TV 6 and on the display 12.

In step S23, the CPU 81 determines whether or not the image output condition is satisfied. That is, the CPU 81 determines whether or not Conditions 1 to 3 described above are satisfied. Note that Conditions 1 to 3 can be determined based on information obtained from the cradle 5. Specifically, for "Condition 1: the cradle 5 is connected to the TV 6", the CPU 81 may obtain information from the cradle 5 that indicates whether or not the cradle 5 is connected to the TV 6, and make the determination based on the obtained information. For "Condition 2: the cradle 5 is receiving power supply", the CPU 81 may obtain information from the cradle 5 that indicates whether or not power is supplied from the power terminal 134 to the cradle 5, and make the determination based on the obtained information. For "Condition 3: the cradle 5 is an authorized product", the CPU 81 may obtain predetermined information with which it is possible to identify an authorized product, and make the determination based on the obtained information. Note that the predetermined information may for example be identification information assigned to the cradle or information that shows predetermined content if the product is an authorized product (in other words, information that shows different content if the product is not an authorized product). The CPU 81 obtains the information at a predetermined timing from the cradle 5, and determines whether or not the image output condition is satisfied based on the obtained information. There is no particular limitation on the predetermined timing, but it may be, for example, when the main unit 2 is attached to the cradle 5 or when step S23 is executed.

If the determination result of step S23 is affirmative, the process of step S25 to be described later is executed. On the other hand, if the determination result of step S23 is negative, the process of step S24 is executed. Note that in this case, no image will be displayed on the TV 6 even though a user has attached the information processing device 1 to the cradle 5. Therefore, the information processing device 1 may indicate to the user that no image will be displayed on the TV 6. For example, the information processing device 1 may indicate by outputting a sound from the speaker 88 or by displaying an image on the display 12. For example, if the cradle 5 includes an indicator light-emitting portion (e.g., an LED provided on the sleep button 74), the information processing device 1 may indicate by controlling the light-emitting portion. If an indicator light-emitting portion is provided on the cradle 5, the information processing device 1 may control the light-emitting portion so as to indicate whether the operation mode is the portable mode or the console mode.

In step S24, the CPU 81 determines whether or not the main unit 2 has been removed from the cradle 5. If the determination result of step S24 is affirmative, the process of step S29 to be described later is executed. On the other hand, if the determination result of step S24 is negative, the process of step S23 described above is executed again. That is, while the main unit 2 is attached to the cradle 5 and the image output condition is not satisfied, the CPU 81 repeatedly executes a series of processes of steps S23 and S24. The series of processes is repeatedly executed at a rate of once per a predetermined period of time.

In step S25, the CPU 81 outputs images to the TV 6. That is, the CPU 81 outputs data of "the images and the sound to be output" to the cradle 5 via the lower terminal 27. The cradle 5 transfers the data to the TV 6. That is, the format of the data is converted through the conversion section 131 of the cradle 5, and the data is output to the TV 6 via the monitor terminal 132. Thus, the images and the sound are output from the TV 6. After the process of step S25, the CPU 81 repeatedly executes the process of outputting the images to the TV 6. This process is continued until the information processing device 1 ends the image display (e.g., the power of the information processing device 1 is turned OFF, or the information processing device 1 is set in the sleep mode), or until the operation mode is changed to the portable mode. Following step S25, the process of step S26 is executed.

In step S26, the CPU 81 changes the operation mode to the console mode. That is, the CPU 81 changes the settings of the main unit 2 so as to lift the functional limitations of the main unit 2 in the portable mode as described in "[3-5. Changing operation mode]" above. Following step S26, the process of step S27 is executed.

In step S27, the CPU 81 determines whether or not the main unit 2 has been removed from the cradle 5. If the determination result of step S27 is affirmative, the process of step S28 is executed. On the other hand, if the determination result of step S27 is negative, the process of step S27 is executed again. That is, while the operation mode is the console mode, the CPU 81 repeatedly executes the process of step S27. The process of step S27 is executed at a rate of once per a predetermined period of time, for example.

In step S28, the CPU 81 changes the operation mode to the portable mode. That is, the CPU 81 changes the settings of the main unit 2 so as to impose functional limitations on the main unit 2 as described in "[3-5. Changing operation mode]" above. The CPU 81 also stops the image output to the TV 6. Following step S28, the process of step S29 is executed.

In step S29, the CPU 81 outputs images to the display 12. That is, the CPU 81 displays the "images to be output" on the display 12. The CPU 81 also outputs the "sound to be output" from the speaker 88 (or the sound input/output terminal 25). After the process of step S29, the CPU 81 repeatedly executes the process of outputting images to the display 12. Following step S29, the process of step S21 is executed again.

As described above, in the present embodiment, the information processing device 1 can switch between the portable mode, in which images are displayed on the display 12, and the console mode, in which images are displayed on the TV 6. Now, the condition for changing the operation mode to the console mode (in other words, the image output condition) may be any condition. For example, the condition may be as follows.

In other embodiments, the image output condition may include a condition that "there has been a user instruction to output images to the TV 6". For example, the cradle 5 may include an output instruction button for giving an instruction to output the images obtained or produced by the information processing device 1 to the TV 6. Then, the information processing device 1 may use, as one of the image output conditions, a condition that "the output instruction button has been pressed while the information processing device 1 is attached to the cradle 5".

In other embodiments, the image output condition may include a condition that "the TV 6 is capable of displaying the images from the cradle 5". Specifically, this condition is that the power of the TV 6 is ON and the input select setting thereof is such that input images from the cradle 5 are displayed. By using image output conditions including the condition described above, it is possible to avoid a situation where no image is displayed on the TV 6 even though images are output from the information processing device 1 via the cradle 5.

In addition, the information processing device 1 may further perform a control, over the TV 6, to turn ON the power of the TV 6, and/or to switch the input select so as to display an input from the cradle 5. Then, a user does not need to operate the TV 6 so as to satisfy the condition described above (i.e., that the TV 6 is able to display the images from the cradle 5), and it is possible to easily display the image on the TV 6. Note that the information processing device 1 can perform a control as described above by causing the cradle 5 to transmit a control signal (e.g., a CEC command of the HDMI standard) to the TV 6.

The information processing device 1 may change the image output condition in response to an instruction from a user. For example, the information processing device 1 may present a plurality of different conditions, as the image output conditions, on a predetermined setting changing screen, and allow a user to select one of the conditions. This is convenient for a user because the user can choose a condition that suits the user's way of using the device.

For example, where the cradle 5 is provided with an output instruction button as described above, information processing system may use a switching-type button as the output instruction button so as to allow a user to change the condition. That is, a first state and a second state can be switched from one to another by pressing the output instruction button of the cradle 5. Then, if the output instruction button is in the first state, the information processing device 1 interprets this to mean that there is a user instruction to output the images on the TV 6, whereas if the output instruction button is in the second state, the information processing device 1 interprets this to mean that there is no user instruction to output the images on the TV 6. Thus, a user can cause the images to be output on the TV 6 (under a certain condition) in response to the attachment of the main unit 2 to the cradle, by leaving the output instruction button in the first state.

In the description above, it can be said that based on the presence/absence of the user instruction described above, the information processing device 1 determines whether a user has attached the information processing device 1 to the cradle 5 merely for charging, or has attached the information processing device 1 to the cradle 5 to display the images on the TV 6. Now, in other embodiments, the information processing device 1 may make the determination above by any other method.

For example, the information processing device 1 may make the determination described above based on the state of the information processing device 1 regarding the execution of an application. Now, "the state of the information processing device 1 regarding the execution of an application" is, for example, a state regarding whether an application is running on the information processing device 1 or a state regarding whether the images produced or obtained by a running application are displayed on the display 12. Specifically, if an application is running or if the images produced or obtained by a running application are displayed on the display 12, the information processing device 1 may determine that a user has attached the information processing device 1 to the cradle 5 in order to display the images on the TV 6. Therefore, in such a case, the information processing device 1 may output the images to the TV 6 on the condition that the image output condition is satisfied. That is, the images output condition may include a condition that "an application is running or the image produced or obtained by a running application are displayed on the display 12".

In other embodiments, the information processing device 1 may store, in a storage section (e.g., the flash memory 84), the operation mode at the point in time when the power of the information processing device 1 is turned OFF. Then, when the power of the information processing device 1 is turned ON, if the operation mode stored in the storage section indicates the portable mode, the information processing device 1 may execute the mode setting process from step S21, whereas if the operation mode stored in the storage section indicates the console mode, the information processing device 1 may execute the mode setting process from step S27. Thus, the operation mode of the information processing device 1 at the time of power-off can be carried on when the power is next turned ON.

[4-4. Example of Executing Information Process Depending on Operation Mode]

As described above, in the present embodiment, the information processing device 1 operates one of operation modes including the portable mode and the console mode. Therefore, in the information processing device 1, information processes executed by various programs executed on the main unit 2 (e.g., the OS program and application programs) may be of different content between the portable mode and the console mode. An example information process, in which a different process is executed depending on the operation mode, will now be described.

Figure 25:
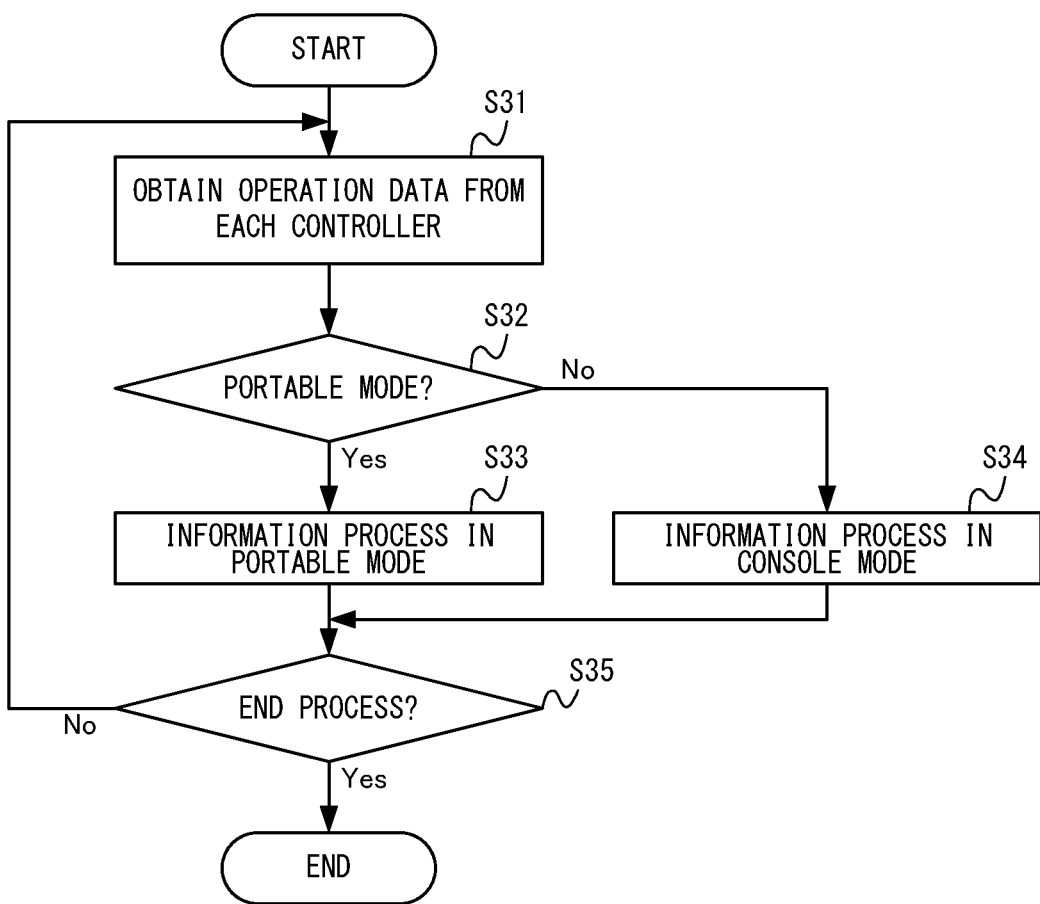
FIG. 25 is a flow chart showing an example flow of an information process executed on the main unit.

FIG. 25 is a flow chart showing an example flow of an information process executed on the main unit 2. A series of information processes shown in FIG. 25 is performed as the CPU 81 executes a program (e.g., an application program or an OS program) that is executable by the information processing device 1, for example. For example, if a program to be executed is an application program, the series of information processes shown in FIG. 25 is started in response to a user instruction to launch the application program. For example, if a program to be executed is an OS program, the series of information processes shown in FIG. 25 is started in response to the power of the main unit 2 being turned ON.

In the series of information processes shown in FIG. 25, first, in step S31, the CPU 81 obtains operation data from each controller. For example, the CPU 81 may obtain operation data from any controller with which the CPU 81 can communicate whether in wired communication or wireless communication. Note that the main unit 2 may obtain operation data with substantially the same frequency from controllers it is communicating in wired communication and from controllers it is communicating in wireless communication. Then, since there is no difference between controllers depending on their communication method, it is possible to improve the controllability of controllers. Following step S31 described above, the process of step S32 is executed.

Depending on the program related to the series of information processes, the CPU 81 may obtain operation data from controllers that satisfy a predetermined condition and not obtain operation data from controllers that do not satisfy the condition. For example, the predetermined condition may be a communication-related condition. That is, the CPU 81 may obtain operation data from controllers that communicate with the main unit 2 in wired communication and not obtain operation data from controllers that communicate with the main unit 2 in wireless communication. For example, the predetermined condition may be a condition regarding the function of a controller. That is, the CPU 81 may obtain operation data from controllers having a predetermined function (e.g., controllers having an analog stick, controllers having the NFC communication function, controllers having an acceleration sensor, etc.) and not obtain operation data from controllers not having these predetermined functions. If there is a controller that is capable of communication but that does not obtain operation data, the main unit 2 may indicate to the user that the controller is not available for use on the running program.

Note that in other embodiments, instead of the CPU 81 not obtaining operation data from controllers that do not satisfy a predetermined condition, the CPU 81 may not use the operation data obtained from the controllers that do not satisfy the predetermined condition in the process or step S33 or S34 to be described later.

In step S32, the CPU 81 determines whether or not the operation mode of the information processing device 1 is the portable mode (i.e., whether it is the portable mode or the console mode). The information processing device 1 has information indicating the current operation mode stored in a predetermined storage section (e.g., the flash memory 84). The determination of step S32 is made based on this information. If the determination result of step S32 is affirmative (i.e., if the operation mode is the portable mode), the process of step S33 is executed. On the other hand, if the determination result of step S32 is negative (i.e., if the operation mode is the console mode), the process of step S34 is executed again.

In step S33, the CPU 81 executes an information process based on operation data in accordance with settings in the portable mode. As described above, in the portable mode, the processing power of the main unit 2 is limited. That is, the CPU 81 executes the information process under such a limitation. For example, the CPU 81 executes a predetermined process (e.g., a game process) using, as an input, the operation data obtained in step S31, and produces images representing the process results, which are displayed on the display 12. Following step S33, the process of step S35 to be described later is executed.

On the other hand, in step S34, the CPU 81 executes an information process based on operation data in accordance with settings in the console mode. As described above, in the console mode, the limitation on the processing power of the main unit 2 is lifted. For example, the CPU 81 may execute a predetermined process (e.g., a game process) using, as an input, the operation data obtained in step S31, and produces images representing the process results, which are displayed on the TV 6. Following step S33, the process of step S35 to be described later is executed.

Depending on the program related to the series of information processes, the CPU 81 may use different content of the predetermined process to be executed in steps S33 and S34 described above depending on the operation mode. For example, if the program is a game program (i.e., if a game application is executed), the information processing device 1 may use different game content depending on the operation mode. Specifically, levels that can be played may differ between the portable mode and the console mode, and there may be levels that can only be played in the portable mode or there may be levels that can only be played in the console mode. Also, the game mode may differ in the portable mode and in the console mode.

For example, if the screen display settings can be changed, the information processing device 1 may use different screen display settings for each operation mode. Note that the "screen display settings" refer, for example, to those settings that are directed to the size of icons on the menu screen and various information to be displayed together with images representing the game space (e.g., images representing the status of the player character, the map image, etc.). Therefore, in the portable mode, for example, since the images are displayed on the display 12 whose screen size is assumed to be small, graphical symbols such as icons are displayed to be larger with respect to the displayed images (in other words, the display screen), whereas in the console mode, since the images are displayed on the TV 6 whose screen size is assumed to be large, those graphical symbols may be displayed to be smaller with respect to the displayed images.

In step S35, the CPU 81 determines whether or not to end the series of information processes shown in FIG. 25. This determination is made based on whether or not there has been a user instruction to end, for example. If the determination result of step S35 is negative, the process of step S31 is executed again. Thereafter, the series of processes of steps S31 to S35 is repeatedly executed until it is determined in step S35 that the series of information processes is to be ended. On the other hand, if the determination result of step S35 is affirmative, the CPU 81 ends the series of information processes shown in FIG. 25.

As described above, in the present embodiment, the information processing device 1 may be configured so that the OS or an application may execute a different process depending on the operation mode. Then, for example, it is possible to give the user a different kind of entertainment (e.g., a different game level or a different game mode) for each operation mode. For example, it is possible to save the trouble for the user to change settings by automatically changing settings (e.g., the screen display settings) depending on the operation mode.

[4-5. Example of Executing Information Process Depending on Attached State of Controller]

As described above, in the present embodiment, the information processing device 1 can be used both in a state in which a controller is removed from the main unit 2 and a state in which they are attached to the main unit 2. Therefore, the information processing device 1 may be configured so that the content of information processes to be executed by various programs executed on the main unit 2 (e.g., the OS program and application programs) may be different from each other depending on the attached state of a controller to the main unit 2 (i.e., whether the controller is attached to or removed from the main unit 2). Examples of information processes depending on the attached state of a controller will now be described below.

Figure 26:
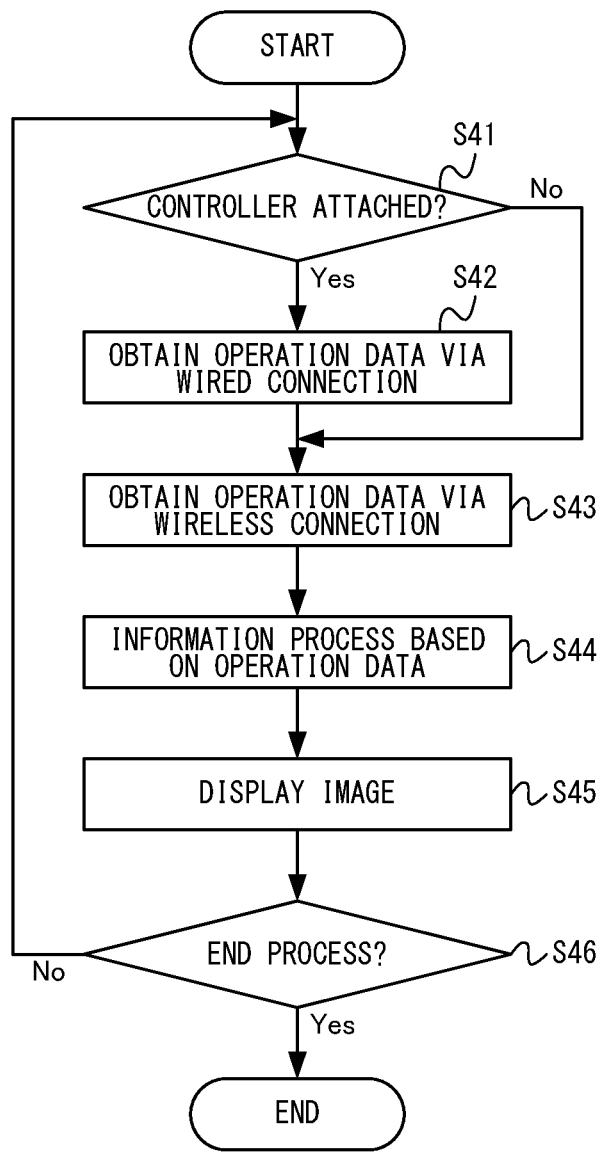
FIG. 26 is a flow chart showing an example flow of an information process executed on the main unit.

FIG. 26 is a flow chart showing an example flow of an information process executed on the main unit 2. As is the series of processes shown in FIG. 25, the series of information processes shown in FIG. 26 is executed by an application program or an OS program executable on the information processing device 1, for example. As is the series of processes shown in FIG. 25, the series of information processes shown in FIG. 26 is also started in response to a user instruction to launch an application program or in response to the power of the main unit 2 being turned ON.

In the series of information processes shown in FIG. 26, first, in step S41, the CPU 81 determines whether or not a controller is attached to the main unit 2. In the present embodiment, the CPU 81 determines whether or not a controller is attached to the main unit 2 for each of the left and right controllers 3 and 4. If it is determined that at least one of the left and right controllers 3 and 4 is attached to the main unit 2, the determination result of step S41 is affirmative. If the left and right controllers 3 and 4 are both removed from the main unit 2, the determination result of step S41 is negative. If the determination result of step S41 is affirmative, the process of step S42 is executed. On the other hand, if the determination result of step S41 is negative, the process of step S43 to be described later is executed.

In step S42, the CPU 81 obtains operation data from a controller attached to the main unit 2 via a wired connection. That is, the CPU 81 obtains operation data received via the left-side terminal 17 and the right-side terminal 21. Note that where only one of the left and right controllers 3 and 4 is attached, the CPU 81 obtains operation data only from the terminal corresponding to that controller. Note that the obtained operation data is stored in a predetermined storage section (e.g., the DRAM 85). Following step S42, the process of step S43 is executed.

In step S43, the CPU 81 obtains operation data from a controller removed from the main unit 2 via a wireless connection. That is, the CPU 81 obtains operation data received via the controller communication section 83. Note that if there are no controllers that are capable of wireless communication (in other words, controllers that are transmitting operation data to the main unit 2) at the point of step S43, the CPU 81 may skip the process of step S43 since no operation data is received by the controller communication section 83. Following step S43, the process of step S44 is executed.

In step S44, the CPU 81 executes a predetermined information process based on the operation data obtained in steps S42 and S43. Note that there is no particular limitation on the content of the information process. For example, if the running program is an OS program, the CPU 81 may move a cursor across the menu screen based on the operation data, or identify an application selected by a user based on the operation data to launch the identified application. If the running program is an application program, the CPU 81 may execute a process according to the application by using the operation data as an input to the application. Following step S44, the process of step S45 is executed.

In step S45, the CPU 81 outputs an image representing the result of the information process of step S44 to a display device (the display 12 or the TV 6). For example, if the running program is an OS program, the menu screen described above is displayed on the display device. For example, if the running program is an application program, an image of the application (e.g., a game image in the game application) is displayed on the display device. Following step S45, the process of step S46 is executed.

In step S46, the CPU 81 determines whether or not to end the series of information processes shown in FIG. 26. This determination is made based on whether or not there has been a user instruction to end, for example. If the determination result of step S46 is negative, the process of step S41 executed again. Thereafter, the series of processes of steps S41 to S46 is repeatedly executed until it is determined in step S46 that the series of information processes is to be ended. On the other hand, if the determination result of step S46 is affirmative, the CPU 81 ends the series of information processes shown in FIG. 26.

As described above, in the present embodiment, the main unit 2 varies the content of the process to be executed depending on the attached state of the controller. That is, if no controller is attached to the main unit 2, the main unit 2 skips the process of obtaining operation data via wired communication. Thus, it is possible to simplify the process to be executed on the main unit 2.

Note that in the series of processes shown in FIG. 26, the main unit 2 executes the process of obtaining operation data via wireless communication (step S43), irrespective of the attached state of the controller. Now, depending on the application executed on the main unit 2, if the determination result of step S41 is affirmative (i.e., if a controller is attached to the main unit 2), the process of step S43 does not need to be executed. That is, depending on the running application, if a controller is attached, the main unit 2 may receive operation data only from the controller attached thereto while not accepting operation data from the other, un-attached controller (via wireless communication).

Figure 27:
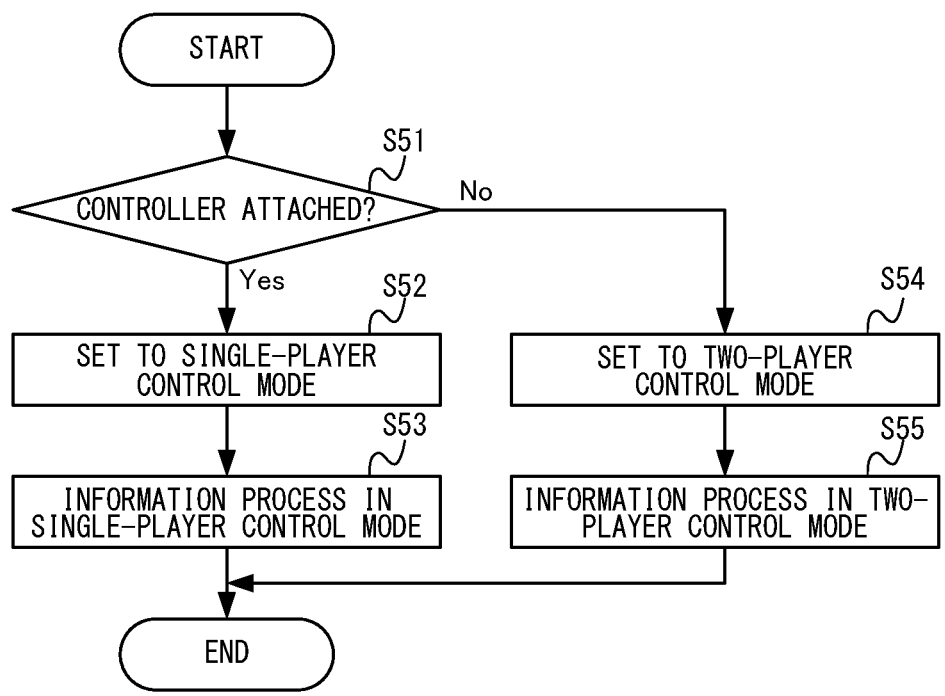
FIG. 27 is a flow chart showing an example flow of an information process executed on the main unit.

FIG. 27 is a flow chart showing an example flow of an information process executed on the main unit 2. As is the series of processes shown in FIG. 25, the series of information processes shown in FIG. 27 is executed by an application program or an OS program executable on the information processing device 1, for example. As is the series of processes shown in FIG. 25, the series of information processes shown in FIG. 27 is also started in response to a user instruction to launch an application program or in response to the power of the main unit 2 being turned ON.

In the series of information processes shown in FIG. 27, first, in step S51, the CPU 81 determines whether or not whether or not a controller is attached to the main unit 2. In the present embodiment, the CPU 81 determines whether the left and right controllers 3 and 4 are both attached to the main unit 2 or at least one of the left and right controllers 3 and 4 is removed from the main unit 2. Note however that in other embodiments, the CPU 81 may determine whether at least one of the left and right controllers 3 and 4 is attached to the main unit 2 or the left and right controllers 3 and 4 are both removed from the main unit 2. If the determination result of step S51 is affirmative, the process of step S52 is executed. On the other hand, if the determination result of step S51 is negative, the process of step S54 is executed.

In step S52, the CPU 81 sets the control mode of the information process to the single-player control mode. That is, if step S52 is executed, since a controller is attached to the main unit 2, it is assumed that a single user performs operations by using the attached controller. The single-player control mode is a mode in which there is one control object, for example. For example, in the game program, the CPU 81 starts a game in which there is one player character. In an application in which operations are performed by using a cursor displayed on the screen, the CPU 81 displays a cursor. Following step S52, the process of step S53 is executed.

In step S53, the CPU 81 executes a predetermined process in the single-player control mode. That is, the CPU 81 obtains operation data from the left and right controllers 3 and 4, and executes a predetermined process based on the operation data. Note that there is no particular limitation on the content of the predetermined process. Now, in the single-player control mode, one control object (e.g., one player character or one cursor) is controlled based on operation data obtained from two controllers 3 and 4. Note that in step S53, the predetermined process described above is repeatedly executed. When a condition for ending the predetermined process is satisfied (e.g., when there is a user instruction to end the application), the CPU 81 ends the process of step S53, thereby ending the series of information processes shown in FIG. 27.

On the other hand, in step S54, the CPU 81 sets the control mode of the information process to the two-player control mode. That is, if step S54 is executed, it means that (at least one) controller is removed from the main unit 2, and it is therefore assumed that a total of two users are performing operations, wherein one user uses the removed controller while the other user uses the other controller. The two-player control mode is a mode in which there are two control objects, for example. For example, in the game program, the CPU 81 starts a game in which there are two player characters. In an application in which operations are performed by using a cursor displayed on the screen, the CPU 81 displays two cursors. Following step S54, the process of step S55 is executed.

In step S55, the CPU 81 executes a predetermined process in the two-player control mode. That is, the CPU 81 obtains operation data from the left and right controllers 3 and 4, and executes a predetermined process based on the operation data. Note that there is no particular limitation on the content of the predetermined process. In the two-player control mode, a first control object (e.g., one player character or one cursor) is controlled based on operation data obtained from the left controller 3, and a second control object, different from the first control object, is controlled based on operation data obtained from the right controller 4. Note that in step S55, as in step S53, the predetermined process is repeatedly executed. When a condition for ending the predetermined process is satisfied (e.g., when there is a user instruction to end the application), the CPU 81 ends the process of step S55, thereby ending the series of information processes shown in FIG. 27.

As described above, in the present embodiment, when a program is launched, the attached state of controllers is sensed, and a control mode is set depending on the attached state (step S52, S54). Thus, an appropriate control mode is selected automatically without the user selecting the control mode, and it is therefore possible to save the trouble for the user.

Note that in FIG. 27, the main unit 2 determines the attached state of controllers at the start of the execution of a program (step S51). Now, in other embodiments, the main unit 2 may determine the attached state of controllers at a predetermined timing during the execution of a program. Then, in response to the attached state of controllers being changed, the main unit 2 may change the control mode. Note that there is no particular limitation on the predetermined timing. For example, where a game application is executed, the main unit 2 may determine the attached state of controllers at the point in time when one play of the game is complete, or may determine the attached state of controllers at the point in time when a predetermined instruction is given by a user.

In FIG. 27, the main unit 2 changes the number of users to perform operations depending on the attached state of controllers. There is no particular limitation on the content of the process to be changed depending on the attached state of controllers. For example, in other embodiments, the interpretation (specifically, the interpretation by the main unit 2) of an operation on a controller may be changed depending on the attached state of controllers. Specifically, when the left controller 3 is attached to the main unit 2, the CPU 81 may interpret the operation of tilting the analog stick 32 in the upper direction (i.e., in the y-axis direction shown in FIG. 1) as being an input of the upper direction. On the other hand, when the left controller 3 is removed from the main unit 2, the CPU 81 may interpret the operation of tilting the analog stick 32 in the upper direction as being an input of the left direction (assuming that the controller is held in a landscape position as shown in FIG. 16).

Note that each of the three series of processes shown in FIG. 25 to FIG. 27 may be executed in any phase on the main unit 2. That is, these three series of processes may each be executed in a different phase (i.e., in the execution of a different program). Two or three of these series of processes may be executed simultaneously (e.g., within a single program). For example, the main unit 2 may execute a process that combines together processes of FIG. 26 and FIG. 27 when a certain application is executed. Specifically, in steps S53 and S55 shown in FIG. 27, the CPU 81 may execute the predetermined process described above based on operation data obtained from the processes of steps S41 to S43 shown in FIG. 26.

5. Other Devices Included in Information Processing System

[5-1. Other Types of Controllers]

As described above, in the present embodiment, the controllers 3 and 4 can be attached and detached to and from the main unit 2. Therefore, there may be provided a left controller different from the left controller 3 shown in FIG. 5, and the other left controller may be attached to the main unit 2. Moreover, there may be provided a right controller different from the right controller 4 shown in FIG. 6, and the other right controller may be attached to the main unit 2. That is, in the present embodiment, controllers attached to the main unit 2 may be detached therefrom and other controllers may be attached thereto.

Figure 28:
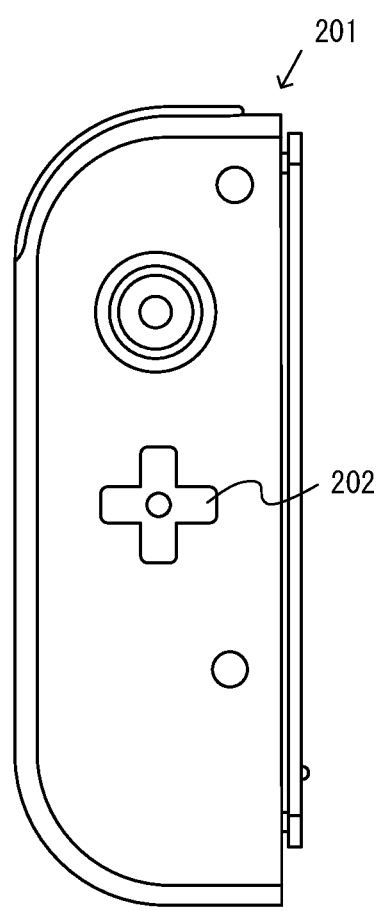
FIG. 28 is a diagram showing another example left controller.
Figure 29:
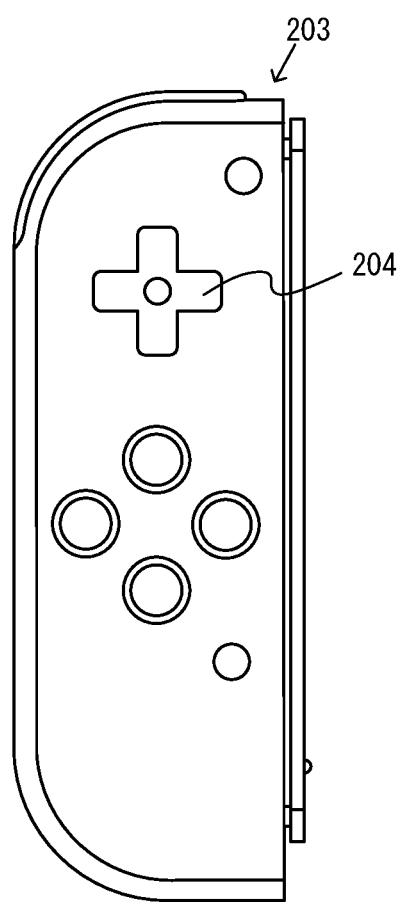
FIG. 29 is a diagram showing another example left controller.

FIG. 28 and FIG. 29 are diagrams each showing another example left controller. A left controller 201 shown in FIG. 28, as compared with the left controller 3 shown in FIG. 5, includes a cross-shaped key 202, instead of the operation buttons 33 to 36. A left controller 203 shown in FIG. 29, as compared with the left controller 3 shown in FIG. 5, includes a cross-shaped key 204, instead of the analog stick 32. Thus, another controller may have a different function from the controllers 3 and 4 shown in FIG. 5 and FIG. 6. Thus, the information processing system may include other controllers having different functions from the controllers 3 and 4, in addition to (or instead of) the controllers 3 and 4.

Figure 30:
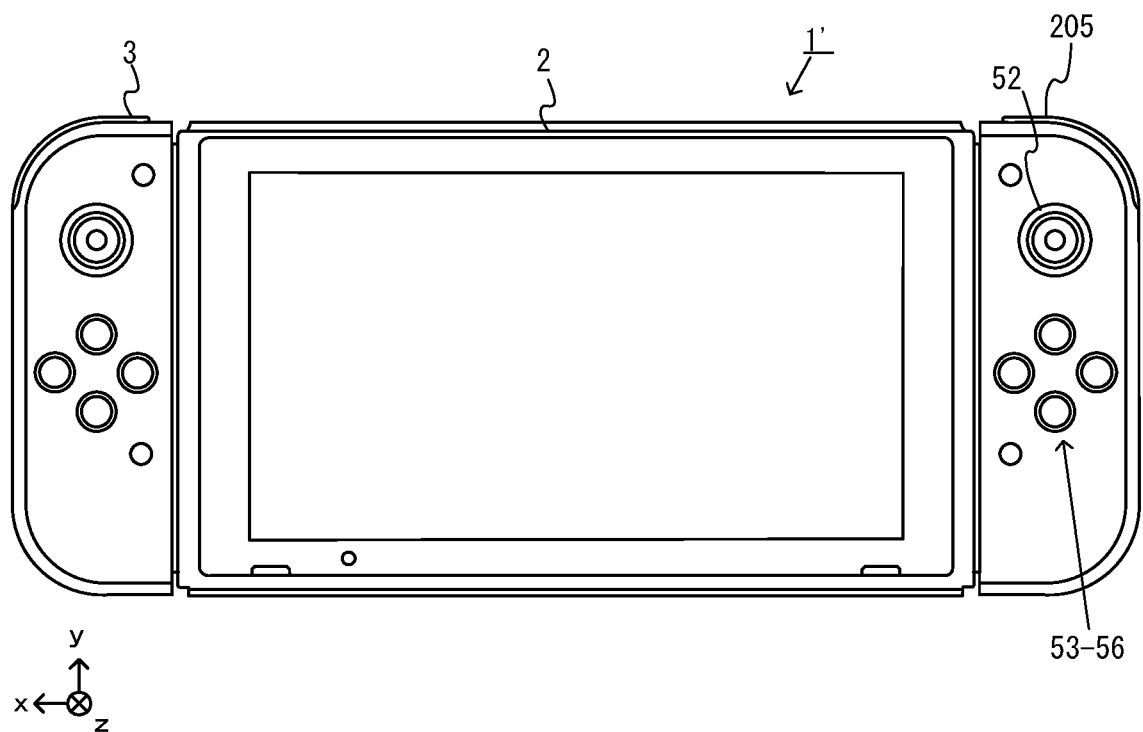
FIG. 30 is a diagram showing an example information processing device with a right controller different from that of FIG. 1 attached thereto.

FIG. 30 is a diagram showing an example information processing device with a right controller that is different from that of FIG. 1. In FIG. 30, another right controller 205, instead of the right controller 4 shown in FIG. 6, is attached to the main unit 2. On the right controller 205, as compared with the right controller 4 shown in FIG. 6, the arrangement of the analog stick 52 and the four operation buttons 53 to 56 is reversed. Thus, for an information processing device 1' shown in FIG. 30, the arrangement of the analog stick and the four operation buttons is symmetric between the left controller and the right controller. That is, in the present embodiment, the arrangement of the operation section on the information processing device 1 can be changed by changing the controller to be attached to the main unit 2. Thus, the information processing system may include other controllers having different arrangements from the controllers 3 and 4, in addition to (or instead of) the controllers 3 and 4.

As described above, in the present embodiment, there may be provided different kinds of controllers having different functions and/or arrangements. Then, a user can use any of the different kinds of controllers by attaching the controller to the main unit 2. Thus, it is possible to provide a portable device with which it is possible to change the controller device (i.e., the controller) in accordance with, for example, the user preference or the content of the application to be executed on the information processing device 1.

[5-2. Accessory for Controllers]

Figure 31:
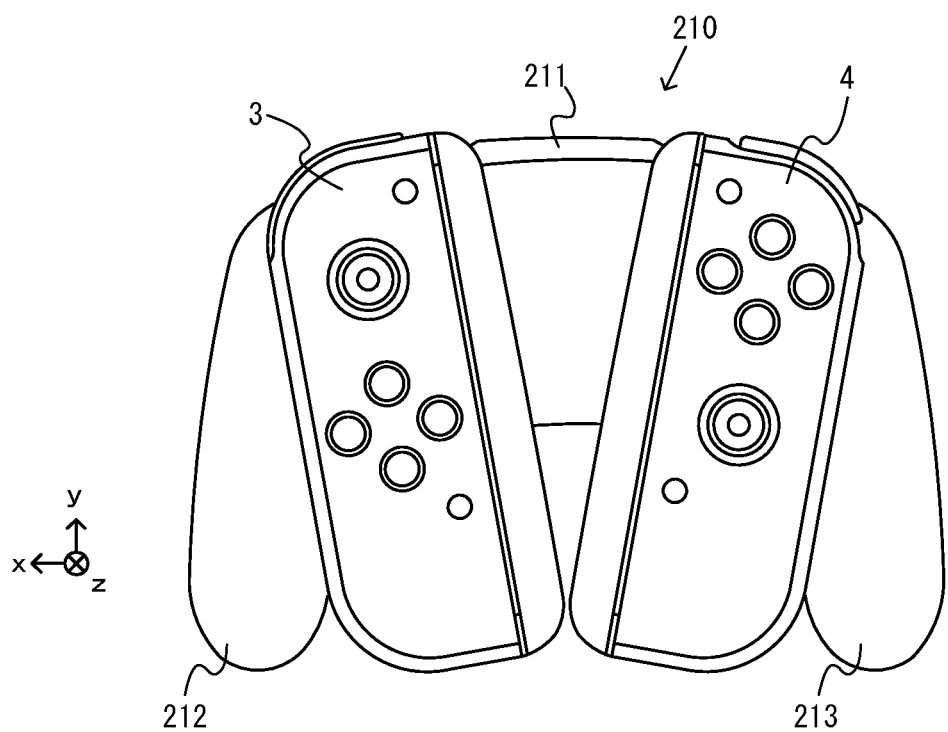
FIG. 31 is a diagram showing an example accessory to which controllers can be attached.

The information processing device 1 may include an accessory configured so that the controllers 3 and 4, having been removed from the main unit 2, can be attached to the accessory. FIG. 31 is a diagram showing an example accessory to which controllers can be attached. As shown in FIG. 31, an extension grip 210, which is an example accessory, is an accessory to be used by a user for performing operations. The extension grip 210 includes a housing 211. The left controller 3 can be attached to the housing 211, and the right controller 4 can be attached thereto. Therefore, the extension grip 210 allows a user to perform operations while holding two controllers 3 and 4, having been removed from the main unit 2, as an integral unit.

Note that as mechanisms for allowing controllers to be attached thereto, the extension grip 210 includes mechanisms similar to those of the main unit 2 (specifically, the left rail member 15, the engagement hole 16, the stopper 18, the right rail member 19, the engagement hole 20 and the stopper 22). Thus, the controllers 3 and 4 can be attached to the extension grip 210, as they are attached to the main unit 2.

As shown in FIG. 31, the extension grip 210 includes grip portions to be held by a user. Specifically, the extension grip 210 accommodates the left controller 3 attached thereto on the left side of the center of the extension grip 210 in the left-right direction (the x-axis direction shown in FIG. 31). The extension grip 210 includes a left grip portion 212 provided on the left side (in other words, on the outer side in the left-right direction) of the area where the left controller 3 is attached. The extension grip 210 accommodates the right controller 4 attached thereto on the right side of the extension grip 210 in the left-right direction. The extension grip 210 includes a right grip portion 213 provided on the right side (in other words, on the outer side in the left-right direction) of the area where the right controller 4 is attached. Therefore, by holding the grip portions 212 and 213, a user can easily operate the controllers 3 and 4 attached to the extension grip 210.

Although not shown in the figure, the extension grip 210 includes a left-side terminal similar to the left-side terminal 17 of the main unit 2 at such a location that allows the left-side terminal to be connected to the terminal 42 of the left controller 3 attached to the extension grip 210. The extension grip 210 also includes a right-side terminal similar to the right-side terminal 21 of the main unit 2 at such a location that allows the right-side terminal to be connected to the terminal 64 of the right controller 4 attached to the extension grip 210. Therefore, when the controllers 3 and 4 are attached to the extension grip 210, the extension grip 210 and the controllers 3 and 4 are electrically connected to each other. Therefore, when the controllers and the extension grip 210 are connected to each other, they can communicate with each other and can supply power to each other.

Moreover, although not shown in the figure, the extension grip 210 includes a power terminal similar to the power terminal 134 of the cradle 5. Therefore, by connecting to a charging device (not shown) (e.g., an AC adaptor) to the power terminal, the extension grip 210 can receive power supply from the charging device via the power terminal. Then, the power supplied from the power terminal is supplied by the extension grip 210 to the left controller 3 and the right controller 4 via the left-side terminal and the right-side terminal. Therefore, by connecting the extension grip 210 to a charging device, it is possible to charge the left controller 3 and the right controller 4 attached to the extension grip 210.

As described above, the extension grip 210 has the function of charging controllers attached thereto. That is, the extension grip 210 includes a charging control section (i.e., the power terminal, and the left-side terminal or the right-side terminal), which uses power supplied to the extension grip 210 to charge controllers attached to the extension grip 210. Then, controllers can be charged while being attached to the extension grip. This improves the usability of the controllers.

Note however that in other embodiments, the extension grip 210 does not have the charging function. Then, the extension grip 210 does not need to include electronic members such as terminals. By using no electronic members, it is possible to simplify the configuration of the extension grip 210.

When the controllers 3 and 4 are attached to the extension grip 210, the controllers 3 and 4 and the main unit 2 communicate with each other in wireless communication (as when the controllers 3 and 4 are removed from the main unit 2). That is, even when attached to the extension grip 210, the controllers 3 and 4 can communicate with the main unit 2.

Specifically, in the present embodiment, a controller transmits, to the main unit 2, attachment information regarding its attachment to another device. For example, when a controller is attached to another device, the attachment information indicates the device (and/or the type of the device) to which the controller is attached, and when a controller is not attached to another device, the attachment information indicates that the controller is not attached to another device. The attachment information may be transmitted together with the operation data (or while being included in the operation data), for example.

Thus, when a controller senses the attachment of the controller to the extension grip 210, the controller transmits, to the main unit 2 via wireless communication, a notification indicating that the controller has been attached to the extension grip 210. Specifically, the controller transmits, to the main unit 2, the attachment information indicating that the controller is attached to the extension grip 210.

Note that there is no particular limitation on the method for a controller to identify the device to which the controller is attached. In the present embodiment, in response to a controller being attached to another device, the controller obtains identification information identifying the other device from the other device (herein, the extension grip 210). The identification information is, for example, identification information assigned to each device (more specifically, identification information unique to the device). Note that in the present embodiment, the identification information includes information indicating the type of the device so that it is possible to identify the type of the device from the identification information. Based on the identification information, a controller determines (or senses) that the device to which the controller has been attached is the extension grip 210, i.e., that the device has been attached to the extension grip 210. Note that when a controller is removed from the extension grip 210, the controller transmits, to the main unit 2 via wireless communication, a notification indicating that the controller has been removed from the extension grip 210. That is, the controller transmits, to the main unit 2, the attachment information indicating that the controller is not attached to another device.

Now, the main unit 2 may change the interpretation of operations performed on a controller depending on the device to which the controller is attached. That is, the main unit 2 may change the method of identifying the content of input (in other words, the content of a user instruction) based on the operation data from a controller depending on the device to which the controller is attached. For example, in the example shown in FIG. 31, the left and right controllers 3 and 4 are attached to the extension grip 210 while being slightly inclined with respect to the up-down direction. Therefore, when the analog stick is tilted in the directly upward direction with respect to the extension grip 210 (the y-axis positive direction shown in FIG. 31), the tilt is not in the directly upward direction with respect to the controller. Therefore, when a controller is attached to the extension grip 210, the main unit 2 preferably changes the interpretation of directional inputs on the analog stick, as compared with a case where the controller is not attached to the extension grip 210 (e.g., when the controller is attached to the main unit 2). For example, the main unit 2 may change the direction of tilt of the analog stick that is interpreted as being an input in the directly upward direction.

Thus, when a controller is attached to the extension grip 210, the main unit 2 changes the interpretation of a directional input on the analog stick, as compared with a case in which the controller is attached to the main unit 2. Specifically, when a controller is attached to the extension grip 210, the main unit 2 modifies the tilt direction of the analog stick represented by the operation data by rotating the tilt direction by a predetermined angle. Note that the predetermined angle is, for example, the angle of inclination of the controller attached to the extension grip 210 with respect to the attitude of the controller when attached to the main unit 2. The predetermined angle may be preset based on the structure of the extension grip 210. The main unit 2 uses the modified tilt direction as the direction input by a user. That is, the main unit 2 executes an information process using the modified tilt direction as an input. Thus, when an analog stick is tilted in the directly upward direction with respect to the extension grip 210, the input direction is regarded as being the directly upward direction, thus allowing an information process to be executed appropriately.

When a controller is attached to the extension grip 210, the main unit 2 modifies the values of the detection results of the acceleration sensor and the angular velocity sensor of the controller. That is, the main unit 2 modifies the detection result of the acceleration sensor by rotating the direction of acceleration (i.e., the detection result of the acceleration sensor) by the above predetermined angle in a rotational direction about an axis extending in the front-rear direction of the controller (the z-axis direction shown in FIG. 1). The main unit 2 modifies the detection result of the angular velocity sensor by rotating the axis of rotation of the angular velocity (i.e., the detection result of the angular velocity sensor) by the above predetermined angle in a rotational direction about an axis extending in the front-rear direction of the controller (the z-axis direction shown in FIG. 1). Then, the main unit 2 calculates the movement and/or the attitude of the controller (in other words, the extension grip 210) based on the modified values of the acceleration and/or the angular velocity.

Note that the main unit 2 may calculate the movement and/or the attitude of the controller without modifying the values of the detection results of the acceleration sensor and the angular velocity sensor, and modify the calculated movement and/or the calculated attitude. That is, when the main unit 2 calculates the movement based on the detection results of the acceleration sensor and/or the angular velocity sensor, the main unit 2 modifies the calculated movement by rotating the calculated movement direction by the above predetermined angle in a rotational direction about an axis extending in the front-rear direction of the controller. When the main unit 2 calculates the attitude based on the detection results of the acceleration sensor and/or the angular velocity sensor, the main unit 2 modifies the calculated attitude by rotating the calculated attitude by a predetermined angle in a rotational direction about an axis extending in the front-rear direction of the controller.

As described above, in the present embodiment, the left controller 3 is attached to the extension grip 210 while being inclined in the first direction from a predetermined reference attitude (i.e., the attitude in which the up-down direction of the left controller 3 coincides with the up-down direction of the extension grip 210; or the attitude when the left controller 3 is attached to the main unit 2) (see FIG. 31). The right controller 4 is attached to the extension grip 210 while being inclined in a direction opposite to the first direction from a predetermined reference attitude (i.e., the attitude where the up-down direction of the right controller 4 coincides with the up-down direction of the extension grip 210). Thus, controllers can be attached to the accessory with an easy-to-operate inclination.

In the present embodiment, when at least one of the left controller 3 and the right controller 4 is attached to the extension grip 210, the main unit 2 executes a predetermined information process by modifying the operation data from the attached controller and/or information obtained from the operation data. For example, the main unit 2 performs a modifying process for modifying the inclination of the controller with respect to the predetermined reference attitude. More specifically, the main unit 2 performs a modifying process so that the result of the information process when a predetermined operation is performed on a controller attached to the extension grip 210 is generally equal to that when the predetermined operation is performed on the controller being in the predetermined reference attitude. Thus, since a user can similarly operate a controller whether the controller is attached to an accessory while being inclined from the predetermined reference attitude or the controller is not attached to the accessory (or attached to the main unit 2), thereby improving the controllability of a controller attached to an accessory.

Moreover, in the present embodiment, the main unit 2 modifies a part of the operation data representing an operation performed on a directional input section (i.e., an analog stick). Thus, the analog stick can be operated in a similar fashion whether the controller is attached to the accessory while being inclined from the predetermined reference attitude or the controller is not attached to the accessory (or attached to the main unit 2).

In the present embodiment, also when the left and right controllers 3 and 4 are both attached to the extension grip 210, as when the left and right controllers 3 and 4 are both attached to the main unit 2, these two controllers are registered as a pair. Specifically, if one of the left and right controllers has been attached to the extension grip 210, when an indication that the other controller is attached to the extension grip 210 is received, the main unit 2 registers these two controllers as a pair. Then, a user can register two controllers as a pair by attaching them to the extension grip 210, as well as by attaching them to the main unit 2.

Note that in other embodiments, the extension grip 210 may include a communication section capable of communicating with the main unit 2 in wireless communication. Then, the extension grip 210 may obtain operation data from the controllers 3 and 4 attached to the extension grip 210, and transmit the obtained operation data to the main unit 2 via the communication section.

Note that the main unit 2 may communicate with devices that cannot be attached to the main unit 2 (e.g., the extension grip 210) in wireless communication, as well as communicating with controllers that can be attached to the main unit 2 in wireless communication. For example, the main unit 2 may receive via wireless communication operation data from a controller device that cannot be attached to the main unit 2, and execute an information process based on the operation data. Then, operations can be performed on the main unit 2 by using a wider variety of controller devices.

The extension grip 210 may include an operation section (e.g., buttons and an analog stick, etc.). Then, the extension grip 210 allows for a wider variety of operations using controllers. Note that information representing an operation performed on the operation section may be obtained by a controller attached to the extension grip 210 (if there are a plurality of controllers attached to the extension grip 210, one of the controllers), and transmitted from the controller to the main unit 2. Such information may be transmitted together with (or being included in) operation data of the controller. If the extension grip 210 includes a communication section capable of communicating with the main unit 2 in wireless communication, information representing an operation performed on the operation section may be transmitted directly from the extension grip 210 to the main unit 2 (i.e., without passing through a controller).

Figure 32:
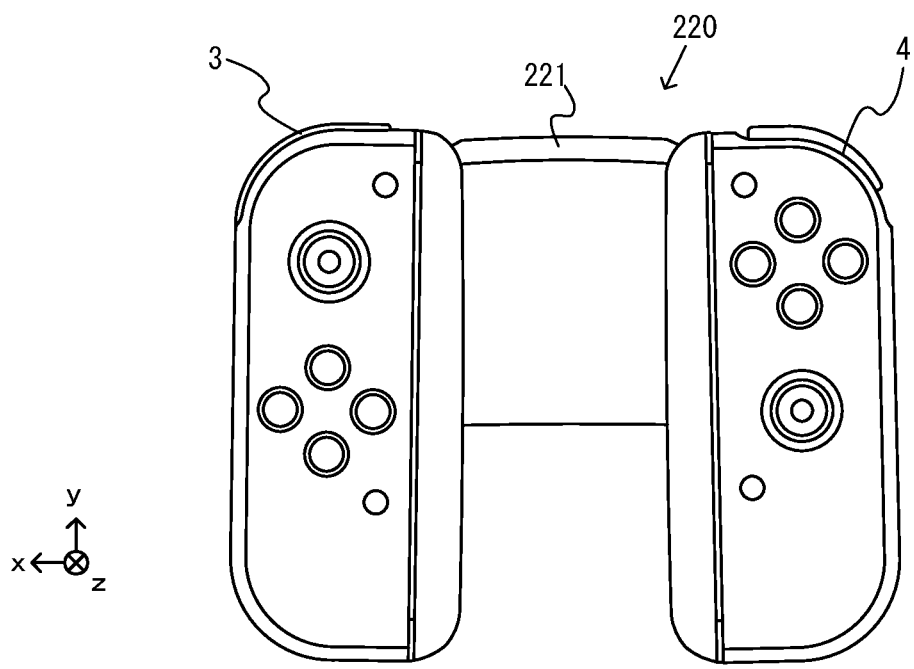
FIG. 32 is a diagram showing another example accessory.

Note that an accessory controller device such as the extension grip described above may be configured without grip portions. Then, the accessory controller device may be configured so that the housings of the controllers are used as grip portions. FIG. 32 is a diagram showing another example accessory controller device. In FIG. 32, an attachment 220 includes a housing 221 to which the left controller 3 and the right controller 4 can be attached, as with the extension grip 210 shown in FIG. 31. Note that the attachment 220 has similar mechanisms to those of the extension grip 210 for allowing controllers to be attached thereto.

The attachment 220 shown in FIG. 32 includes no grip portion. Therefore, a user holds the left controller 3 and the right controller 4 attached to the attachment 220. This also enables the user to hold the two controllers 3 and 4 removed from the main unit 2 as an integral unit.

[5-3. Accessory for Main Unit]

The information processing system may include an accessory to which the main unit 2 can be attached. An HMD accessory to be described below as an example accessory can be used as a so-called HMD (head mounted display) with the main unit 2 attached thereto.

Figure 33:
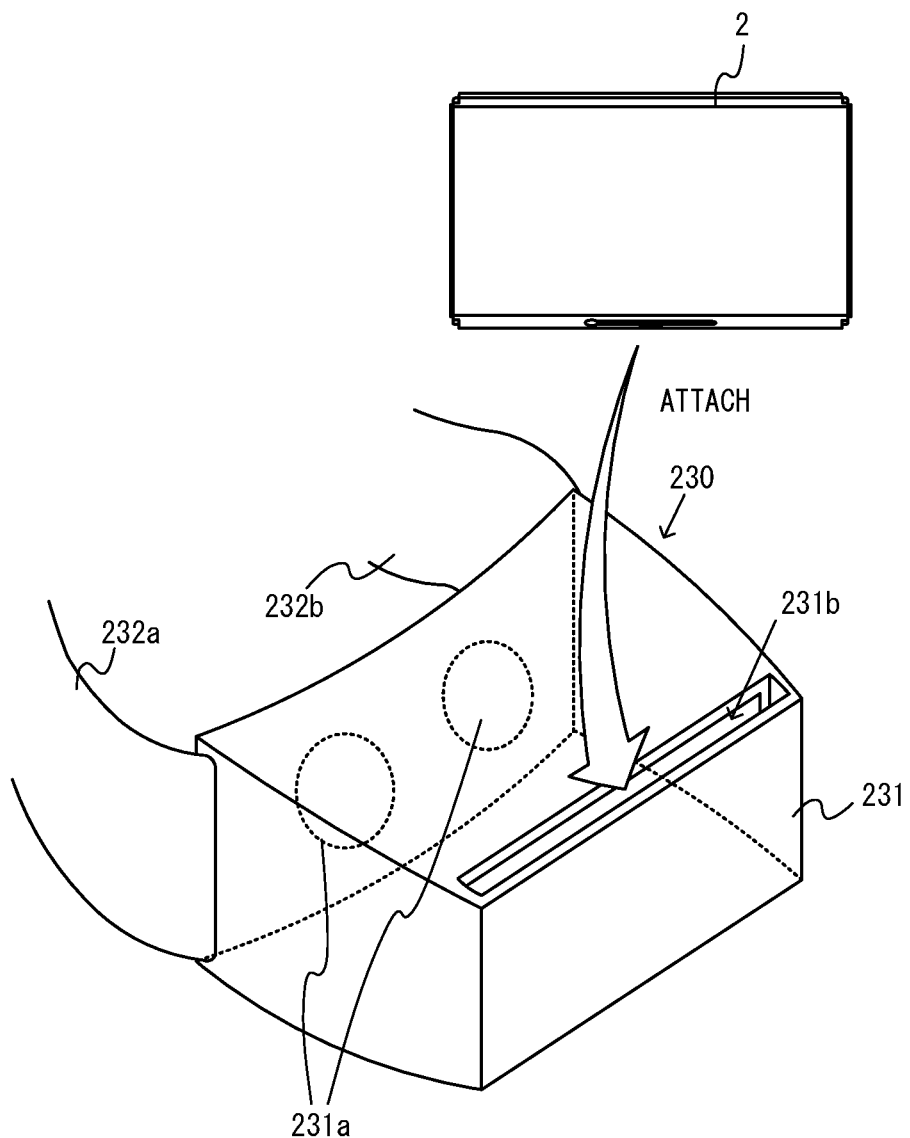
FIG. 33 is a diagram showing an example accessory to which the main unit can be attached.

FIG. 33 is a diagram showing an example HMD accessory to which the main unit 2 can be attached. An HMD accessory 230 shown in FIG. 33 includes a housing 231 and belts 232a and 232b. One end of the belt 232a is attached to one end of the housing 231, and one end of the belt 232b is attached to the other end of the housing 231. Although not shown in the figure, the other end of the belt 232a can be removably connected to the other end of the belt 232b. Thus, the housing 231 can be mounted on the head of the user by connecting together the two belts 232a and 232b around the head of the user. Note that there is no particular limitation on the mechanism for allowing the HMD accessory 230 to be mounted on the head of the user.

As shown in FIG. 33, the housing 231 includes two openings 231a. The openings 231a are located so as to face the eyes of the user with the housing 231 mounted on the head of the user. Although not shown in the figure, the HMD accessory 230 includes a lens provided in each of the openings 231a.

Moreover, as shown in FIG. 33, the housing 231 includes an insertion slot 231b for receiving the main unit 2 attached thereto (or inserted thereinto). That is, the main unit 2 can be attached to the HMD accessory 230 by inserting the main unit 2 into the insertion slot 231b. If the main unit 2 is attached so that the display 12 is facing the openings 231a, the display 12 can be viewed through the lenses through the openings 231a. That is, the housing 231 supports the display 12 so that the user can view the display 12 of the main unit 2.

With such a configuration, a user can view images on the display 12 when the HMD accessory 230 with the main unit 2 attached thereto is mounted on the head of the user. That is, the HMD accessory 230 with the main unit 2 attached thereto functions as a so-called HMD. Note that the HMD accessory 230 may present images of a wide viewing angle to a user by enlarging the viewing angle of the images on the display 12 through the lenses. This can enhance the sense of immersion for a user looking at the images. Note that the main unit 2 may perform a predetermined conversion process on the images displayed on the display 12 so that appropriate images are viewed through the lenses.

Note that in the present embodiment, the main unit 2 includes the acceleration sensor 89 and the angular velocity sensor 90, and can calculate the movement and/or the attitude of the main unit 2 based on the detection results of these sensors. Therefore, the main unit 2 can calculate the movement and/or the attitude of the HMD accessory 230 to which the main unit 2 is attached, and perform a predetermined process in accordance with the movement and/or the attitude. Note that the predetermined process, for example, is a process of controlling a virtual camera for producing images to be displayed on the display 12 based on the movement and/or the attitude of the HMD accessory 230, and more specifically is a process of changing the line-of-sight direction of the virtual camera depending on the attitude, for example.

In other embodiments, if the main unit 2 does not have sensors for sensing the movement and/or the attitude of the main unit 2 (e.g., an acceleration sensor and/or an angular velocity sensor), the HMD accessory 230 may include the sensors. Then, the HMD accessory 230 may transmit the detection results of the sensors (or information obtained by performing a predetermined process on the detection results) to the main unit 2. The main unit 2 may calculate the movement and/or the attitude of the HMD accessory 230 based on the information transmitted from the HMD accessory 230.

In the present embodiment, the controllers 3 and 4 may be used while they are removed from the main unit 2. Therefore, even with the main unit 2 attached to the HMD accessory 230, the controllers 3 and 4 can be used as controller devices. That is, a user can operate the controllers using the hands while the HMD accessory 230 with the main unit 2 attached thereto is mounted on the head of the user.

As described above, the information processing device 1 of the present embodiment, with the use of the HMD accessory 230 described above, can be used in a mode where it is used as an HMD. In the present embodiment, since the controllers can be removed from the main unit 2, it is possible to reduce the weight of the device or devices to be mounted on the head of the user. A user can perform operations using removed controllers.

6. Functions/Effects and Variations of Present Embodiment

In the present embodiment described above, the information processing device 1 includes the main unit 2, the left controller (referred to also as the first controller device) 3, and the right controller (referred to also as the second controller device) 4. Since the information processing device 1 includes a plurality of devices, it can be referred to also as an information processing system. The main unit includes a display (i.e., the display 12). The left controller 3 is configured to be removably attached to the main unit 2, and the right controller 4 is configured to be removably attached to the main unit 2 (FIG. 2). The left controller 3 transmits first operation data representing an operation performed on the left controller 3 to the main unit 2, whether it is attached to the main unit 2 or not. The right controller 4 transmits second operation data representing an operation performed on the right controller 4 to the main unit 2, whether it is attached to the main unit 2 or not. The main unit is configured to display, on the display, the execution result of an information process (step S44) based on the first operation data transmitted from the left controller 3 and the second operation data transmitted from the right controller 4 (step S45). Thus, with the left controller 3 and the right controller 4 attached to the main unit 2, the main unit 2 is capable of displaying, on the display, images based on operations performed on the left controller 3 and the right controller 4 (FIG. 14). The main unit 2 is also capable of displaying, on the display, images based on operations performed on the left controller 3 and the right controller 4 when the left controller 3 and the right controller 4 are removed from the main unit 2 (FIG. 15).

As described above, the information processing device 1 can be used both in the mode in which the controllers 3 and 4 are attached to the main unit 2 and in the mode in which the controllers 3 and 4 are removed from the main unit. Thus, since a plurality of modes of use are realized with a single information processing device 1, the information processing device 1 can be used in a wider variety of manners.

The "image based on operations" may be images obtained by an information process that is performed based on an operation (e.g., images obtained by an operation performed on an application used for obtaining and viewing information from the Internet) or images produced by an information process that is performed based on an operation (e.g., game images produced in accordance with a game operation performed on a game application).

In the above description, the main unit 2 may be used in the mode in which the left controller 3 and the right controller 4 are attached to the main unit 2 and in the mode in which the left controller 3 and the right controller 4 are removed from the main unit 2, and it is not necessary that both of these modes be available under certain conditions. For example, only one of the two modes may be available in a predetermined application running on the main unit 2. That is, the main unit 2 may run an application that is available only in the mode in which the left controller 3 and the right controller 4 are attached to the main unit 2, and may run another application that is available only in the mode in which the left controller 3 and the right controller 4 are removed from the main unit 2.

In the above description, the main unit 2 may include an information processing unit (e.g., the CPU 81) instead of a display.

The left controller 3 includes a first input section (e.g., the analog stick 32) and a second input section (e.g., the operation buttons 33 to 36). The right controller 4 includes a third input section (e.g., the analog stick 52) of the same type as the first input section and a fourth input section (e.g., the operation buttons 53 to 56) of the same type as the second input section.

Note that an "input section" is any means that outputs information representing a user input and/or information with which it is possible to calculate (or estimate) a user input. For example, an input section may be a button, a directional input section such as an analog stick, a touch panel, a microphone, a camera, a sensor capable of calculating the movement of the controller, for example, (e.g., an acceleration sensor and an angular velocity sensor), and the like.

As described above, the left controller 3 and the right controller 4 include two sets of input sections of the same type. Therefore, using the input sections described above, a user can use two controllers in a similar manner. For example, if a single user uses a controller, it is convenient because the user can perform operations in a similar manner using either one of two controllers. Also conveniently, two users can each use one controller, for example.

In the above description, "input sections being of the same type" is not limited to cases where the two input sections are the same input sections, but may also include cases where two input sections have functions and/or applications of the same type. For example, where the first input section is an analog stick that can be tilted up, down, left and right, the third input section may be a slide stick that can be slid up, down, left and right or a cross-shaped key capable of making an input of up, down, left and right.

In the embodiment described above, the input mechanism of the first input section and the input mechanism of the third input section (e.g., the operation button 33 and the operation button 53 or the analog stick 32 and the analog stick 52) are substantially the same. The input mechanism of the second input section and the input mechanism of the fourth input section are substantially the same. Thus, the two controllers will have two types of input sections that can be operated in a similar fashion. Therefore, a user can use two controllers in a similar fashion, thereby improving the controllability of the controllers.

In the embodiment described above, the first input section has substantially the same shape as the third input section. Also, the second input section has substantially the same shape as the fourth input section. Thus, the two controllers will have two types of input sections that can be operated in a similar fashion. Therefore, a user can use two controllers in a similar fashion, thereby improving the controllability of the controllers.

When the left controller 3 and the right controller 4 are removed from the main unit 2, the positional relationship between the first input section and the second input section of the left controller 3 placed in a certain orientation is the same as the positional relationship between the third input section and the fourth input section of the right controller 4 placed in a certain orientation. For example, consider a case in which the left side surface the left controller 3 is facing a user and the right side surface of the right controller 4 is facing another user, as shown in FIG. 16 and FIG. 17. Then, the positional relationship between the first input section (i.e., the analog stick 32) and the second input section (i.e., the operation buttons 33 to 36) is the same as the positional relationship between the third input section (i.e., the analog stick 52) and the fourth input section (i.e., the operation buttons 53 to 56).

Then, users can use the left controller 3 and the right controller 4 in a similar fashion. Thus, it is possible to improve the controllability of the controllers. For example, in the example shown in FIG. 16, with either one of the two controllers, a user can operate the analog stick with the left hand and the operation buttons with the right hand.

When the left controller 3 and the right controller 4 are attached to the main unit 2, the positional relationship between the first input section (i.e., the analog stick 32) and the second input section (i.e., the operation buttons 33 to 36) is opposite from the positional relationship between the third input section (i.e., the analog stick 52) and the fourth input section (i.e., the operation buttons 53 to 56) (see FIG. 1).

Thus, if the controllers 3 and 4 are attached to the main unit 2, if a user holds the controllers 3 and 4 respectively with the left hand and the right hand, the user is allowed to easily operate different input sections with the left hand and with the right hand. Thus, it is possible to improve the controllability of the information processing device 1 with controllers attached thereto.

Now, assume a configuration in which the positional relationship between the first input section and the second input section is the same as the positional relationship between the third input section and the fourth input section. Even with such a configuration, a user may tend to operate the left and right controllers in a similar fashion (e.g., operating the analog stick with the left hand and the operation buttons with the right hand). Then, if the controllers have a similar shape to that of the present embodiment (i.e., one side surface is rounded), one controller will be held with the rounded side surface facing away from the user while the other controller will be held with the rounded side surface facing toward the user. That is, this configuration has a problem in that when users hold controllers removed from the main unit 2, the direction of the rounded side surface of one controller will be opposite to that of the other controller, which makes it less easy for a user to understand the appropriate orientation in which to hold a controller.

Moreover, with such a configuration, if sub-buttons (the second L button and/or the second R button in the embodiment described above) are provided on each controller, the sub-buttons will be provided on the rounded side surface (as in the present embodiment) for one controller, whereas the sub-buttons will be provided on the opposite side surface from the rounded side surface for the other controller. With such a configuration, however, the sub-buttons of one controller will be exposed even when the controller is attached to the main unit 2, and the sub-buttons may possibly be operated in error in the attached state.

In contrast, according to the present embodiment employing a configuration in which the positional relationship between the first input section and the second input section is opposite from the positional relationship between the third input section and the fourth input section, it is possible to prevent the two problems described above.

In the embodiment described above, the first input section and the third input section are each a directional input section for receiving a directional input. More specifically, the directional input section may include an operation member (e.g., a stick member) that can be tilted or slid in a predetermined direction. Then, a user can make directional inputs by using the left controller 3 or the right controller 4.

In the embodiment described above, the second input section and the fourth input section are each a button that can be pressed. Thus, a user can make button inputs by using the left controller 3 or the right controller 4.

In the embodiment described above, a controller is attached integrally to the main unit 2 with a predetermined surface of the housing of the controller (e.g., the right side surface for the left controller 3) facing a predetermined surface of the main unit 2 (see FIG. 2). Thus, with the controller attached to the main unit 2, a user can handle the controller and the main unit as an integral unit, thereby improving the controllability.

In the embodiment described above, the left controller 3 is attached to the main unit 2 so as to be facing one of a left side surface and a right side surface of the main unit 2 (specifically, the left side surface). The right controller 4 is attached to the main unit 2 so as to be facing the other one of the left side surface and the right side surface of the main unit 2 (i.e., the right side surface). Then, a user can operate the two controllers attached to the main unit 2 respectively with the left hand and the right hand, thereby providing the information processing device 1 with a good controllability.

The controller includes a light-emitting portion (e.g., the indicator LED 45 for the left controller 3) provided on the predetermined surface for notifying a user of predetermined information. Then, predetermined information (e.g., the status of the information processing device 1) can be indicated to the user using the controller.

Note that the light-emitting portion may indicate the communication status between the main unit 2 and the controller. For example, in the embodiment described above, the indicator LED indicates a number that is assigned to the controller as a result of communication (more specifically, the number represented by the number information described above). For example, the indicator LED may indicate the status of wireless communication between the information processing device 1 and the controller. Specifically, the indicator LED may indicate whether or not wireless communication is available at that point in time or may indicate whether or not pairing has been done.

The controller includes operation sections provided on the predetermined surface (e.g., the second L button 43 and the second R button 44 for the left controller 3). Note that the "operation section" for example means any input section operated by a user, such as buttons, a stick, etc. Thus, more operation sections are available when the controller is removed from the main unit 2 than when the controller is attached to the main unit 2. Therefore, a user is allowed to perform a variety of operations even when the controller is removed from the main unit 2, and it is possible to improve the controllability of the controller.

Note that in other embodiments, the main unit 2 may include operation sections (e.g., buttons) provided on the engaged surface (i.e., the left side surface or the right side surface of the main unit 2) to which the left controller 3 or the right controller 4 is attached. Note that the operation section may be a button having a particular function, which may specifically be a power button, a home button or a sleep button. For example, in the embodiment described above, the power button 28 may be provided on the left side surface or the right side surface of the main unit 2. Then, the power button 28 cannot be operated when the left controller 3 or the right controller 4 is attached, thereby preventing an erroneous operation by a user. Note that when an operation section is provided on a side surface of the main unit 2, the operation section may be provided on the rail member or on another portion of the housing other than the rail member.

Note that an operation section having the same function as the operation section described above may be provided on the left controller 3 and/or the right controller 4. For example, in other embodiments, a power button having the same function as the power button 28 may be provided on the left controller 3 and/or the right controller 4. Then, the function of the input section is available to the user even when the left controller 3 and the right controller 4 are in the attached state.

In other embodiments, the main unit 2 may include a terminal for connecting other devices provided on the engaged surface (i.e., the left side surface or the right side surface of the main unit 2) to which the left controller 3 or the right controller 4 is attached. For example, in the embodiment described above, the first slot 23 and/or the second slot 24 (in other words, terminals provided in the slots) may be provided on the left side surface or the right side surface of the main unit 2. Then, with the controller attached to the main unit 2, the terminals can be protected by the controller. If a slot is provided on the left side surface or the right side surface of the main unit 2, it is possible to prevent a device inserted in the slot (e.g., a card storage medium) from coming off of the main unit 2, when the controller is attached to the main unit 2.

In the embodiment described above, connecting portions (i.e., the upper left portion and the lower left portion) between the first side surface (i.e., the left side surface) of the four side surfaces of the left controller 3 and side surfaces adjacent thereto (i.e., the upper side surface and the lower side surface) have a more rounded shape than connecting portions (i.e., the upper right portion and the lower right portion) between the second side surface (i.e., the right side surface) opposite from the first side surface and side surfaces adjacent thereto (i.e., the upper side surface and the lower side surface) (see FIG. 5). Moreover, connecting portions between the third side surface (i.e., the right side surface) of the four side surfaces of the right controller 4 and side surfaces adjacent thereto (i.e., the upper side surface and the lower side surface) have a more rounded shape than connecting portions (i.e., the upper side surface and the lower side surface) between the fourth side surface (i.e., the left side surface) opposite from the third side surface and side surfaces adjacent thereto (see FIG. 6). Thus, the controller has a rounded shape on one side thereof, and it is therefore easy for a user to understand the orientation in which to hold the controller removed from the main unit 2. This also makes it easier for a user to hold the controller removed from the main unit 2.

Moreover, in the embodiment described above, the left controller 3 is attached to the main unit 2 with the second side surface of the left controller 3 facing the fifth side surface (i.e., the left side surface) of the four side surfaces of the main unit 2 (see FIG. 2). Moreover, the right controller 4 is attached to the main unit 2 with the fourth side surface of the right controller 4 facing the sixth side surface (i.e., the right side surface) opposite from the fifth side surface of the main unit 2 (see FIG. 2).

Then, with the controllers 3 and 4 attached to the main unit 2 (see FIG. 1), the information processing device 1 will have an overall shape such that the left side and the right side thereof are rounded, making it easier for a user to hold. The left side of the left controller 3 is more rounded than the right side thereof, whereas the right side of the right controller 4 is more rounded than the left side thereof (FIG. 5 and FIG. 6). Thus, since the left controller 3 has a different overall shape than that of the right controller 4, it is possible to reduce the possibility that a user mistakes the left and right controllers for each other when attaching them to the main unit 2.

In the embodiment described above, the right controller 4 includes an input section having a first function that the left controller 3 does not have (in the embodiment described above, the plus button 57, the home button 58 and the infrared image-capturing section 123). In other words, in the embodiment described above, the left controller 3 includes one or more input sections having a predetermined number of types of functions (13 in the embodiment described above, including nine buttons, the analog stick 32, the acceleration sensor 104 and the angular velocity sensor 105). In contrast, the right controller 4 includes one or more input sections having a number (different from the predetermined number) of types of functions (15 in the embodiment described above, including 11 buttons, the analog stick 52, the acceleration sensor 114, the angular velocity sensor 115 and the infrared image-capturing section 123). Thus, when each controller has some functions that the other controller does not have (as compared with a case where the controllers both have the same functions), it is possible to simplify the configuration of the controllers.

Note that the "input section having the first function" may be an image-capturing device (e.g., the infrared image-capturing section 123) or a button. The button may be a button having a particular function (e.g., a power button or a home button), for example.

In the embodiment described above, the left controller 3 includes input sections having the second function different from the first function (e.g., the analog stick 32 and the buttons 33 to 38 in the embodiment described above), and the right controller 4 includes input sections having the second function (e.g., the analog stick 52 and the buttons 53 to 56, 60 and 61 in the embodiment described above). Then, a user can use the second function on either controller, thereby improving the controllability, whereas the first function is omitted for one of the controllers, thereby simplifying the configuration of the controller.

In the embodiment described above, communication between the main unit 2 and a controller when the controller is attached to the main unit 2 uses a first communication scheme (specifically, wired communication), and communication between the main unit 2 and a controller when the controller is removed from the main unit 2 uses a second communication scheme (specifically, wireless communication) different from the first communication scheme. Then, by changing the communication scheme between when the controller is attached to the main unit 2 and when the controller is removed from the main unit 2, the controller can communicate in either case. The controller can easily communicate with the main unit 2 in wired communication when it is attached to the main unit 2, and the controller can communicate with the main unit 2 in wireless communication when it is removed from the main unit 2.

In the embodiment described above, the wired communication between the main unit and the controller is a communication connection via a wired communication channel formed by an electrical connection between the first terminal of the main unit 2 (specifically, the left-side terminal 17 or the right-side terminal 21) and the second terminal of the controller (specifically, the terminal 42 or 64). The wired communication as used herein means communication via a cable connection between devices, and also means communication via a connection between a terminal (e.g., a connector) of one device and a terminal (e.g., a connector) of the other device.

In the embodiment described above, when the controller is attached to the main unit 2, the first terminal of the main unit 2 (i.e., the left-side terminal 17 or the right-side terminal 21) and the second terminal of the controller (i.e., the terminal 42 or 64) are electrically connected to each other by being in contact with each other. Then, when the controller is attached to the main unit 2, wired communication and/or power supply are implemented via the terminals connected together.

In the embodiment described above, when the controller is attached to the main unit 2, the first terminal of the main unit 2 and the second terminal of the controller are electrically connected together, and the communication between the main unit 2 and the controller and the power supply from the main unit 2 to the controller are implemented via the first terminal and the second terminal. Then, it is possible to increase the opportunity to charge the controller and thus to reduce the possibility of the controller running out of battery. When a user attaches controllers to the main unit 2 so as to use the information processing device 1 as an integral portable device, the controllers can be charged without the user knowing. Therefore, the user does not need to perform a separate operation for charging the controller, thus saving the trouble for the user.

In the embodiment described above, the information processing device 1 includes a first sensing section (e.g., the CPU 81 executing step S3) for sensing the attachment of the left controller 3 to the main unit 2, and a second sensing section (e.g., the CPU 81 executing step S3) for sensing the attachment of the right controller 4 to the main unit 2. The main unit 2 registers a pair of a left controller and a right controller based on the sensing results from the first sensing section and the second sensing section (see step S4). Therefore, a user can register a pair through a straightforward, easy operation of attaching two controllers, to be used as a pair, to the main unit 2.

In the embodiment described above, when the left controller 3 and the right controller 4 are attached to the main unit 2, the main unit 2 registers the left controller 3 and the right controller 4 attached thereto as a pair (see step S3, S4). Thus, a user can register a pair of controllers through a straightforward operation.

Note that the first sensing section and the second sensing section may or may not simultaneously sense the attachment of the controllers to the main unit 2. That is, two controllers that are not at the same time attached to the main unit 2 may be registered as a pair.

The main unit 2 may execute a predetermined information process based on operation data received from two pairs of controllers. For example, the main unit 2 receives operation data from each of a left controller and a right controller that are registered as a first pair, and receives operation data from each of a left controller and a right controller that are registered as a second pair. The main unit 2 may execute a predetermined information process using, as a set of data, operation data received from controllers that are registered as a first pair, and using, as another set of data, operation data received from controllers that are registered as a second pair. Then, the information processing device can use operation data from a plurality of controllers while distinguishing between operation data from different registered pairs.

In the embodiment described above, when receiving operation data from each of the left controller 3 and the right controller 4 that are removed from the main unit 2 and registered as a pair, the main unit 2 executes a predetermined information process using the two pieces of operation data received as a set of data (see FIG. 17(*b*)). Thus, a user can perform operations using controllers registered as a pair. For example, a user can control one object by using a pair of controllers.

In the embodiment described above, the main unit 2 includes the housing 11 provided with a first engagement portion (which can also be referred to as the attachment and detachment mechanism; specifically, the left rail member 15) to be engaged with the housing (specifically, the slider 40 provided on the housing 31) of the left controller 3, and a second engagement portion (specifically, the right rail member 19) to be engaged with the housing (specifically, the slider 62 provided on the housing 51) of the right controller 4.

In the above description, the first engagement portion and the second engagement portion are to be engaged with controller housings (including members provided on the housings), and are not to be engaged with connectors of the controllers. That is, in the present embodiment, the main unit 2 is configured so that controllers are configured to be removably attached to the main unit 2 by the method of engaging the engagement portions with the controllers, which is different from the method of connecting the connectors of the main unit 2 with those of the controllers (the engagement method and the method of connecting the connectors may be both used at the same time). Then, the main unit 2 and the controllers can be firmly connected together.

Note that in other embodiments, the main unit 2 may include only one engagement portion to be engaged with the housing of the controller or may include three or more engagement portions.

In the embodiment described above, the left controller 3 includes the housing 31 provided with a third engagement portion (specifically, the slider 40) to be engaged with the first engagement portion of the main unit 2. The right controller 4 includes the housing 51 provided with a fourth engagement portion (specifically, the slider 62) to be engaged with the second engagement portion of the main unit 2. Thus, members are provided also on the controller side, which members are to be engaged with the engagement portions on the main unit 2 side are provided, and it is therefore possible to more firmly connect the main unit 2 and the controllers together.

In the embodiment described above, the main unit 2 selectively outputs the execution result of the information process to either the display (the display 12) or a display device (the TV 6) separate from the main unit 2 (see FIG. 24). This enables two different modes of use, including a mode in which images are displayed on the display of the main unit 2, and another mode in which images are displayed on a display device separate from the main unit 2.

In the embodiment described above, the engagement portion of the main unit 2 is a rail member (referred to also as the first slide member) provided on a surface of the housing 11 of the main unit 2. The controller includes a slider (referred to also as the second slide member) which slidably and detachably engages with the rail member. In the embodiment described above, the rail member and the slider together form a slide mechanism (see FIG. 7). Thus, the slide mechanism allows for firm locking between the main unit 2 and the controllers and allows for easy attachment and detachment of the controllers.

In the embodiment described above, the rail member is formed so that the slider can slidably engage with the rail member in a predetermined direction (specifically, the y-axis direction shown in FIG. 1), and so that the slider can be inserted and detached into and from the rail member via one end thereof in the predetermined direction (see FIG. 2). Thus, it is possible to easily attach and detach controllers to and from the main unit 2 via the end.

Moreover, in the embodiment described above, the rail member is provided so as to extend in the up-down direction of the main unit 2 so that the slider can be inserted and detached into and from the rail member via the upper end thereof (see FIG. 2). Thus, controllers can be conveniently attached and detached to and from the main unit 2 while the main unit 2 is placed upright. For example, in the present embodiment, controllers can be attached and detached to and from the main unit 2 while the main unit 2 is attached to the cradle 5.

In the embodiment described above, the slide member of the main unit 2 is provided so as to extend generally over the entirety (e.g., so that the length of the slide member is at least one 80% or more of the length of the housing 11 of the main unit 2) of a surface of the housing 11 of the main unit 2 in a predetermined direction (specifically, the up-down direction) (see FIG. 3). Thus, when a controller is attached to the main unit 2, the controller is connected generally over the entirety of the aforementioned surface of the main unit 2, thereby allowing the controller to be firmly connected to the main unit 2.

In the embodiment described above, the first slide member of the main unit 2 (i.e., the rail member) has a C-shaped cross section, and the second slide member of the controller (i.e., the slider) has a T-shaped cross section. Note that in other embodiments, the first slide member of the main unit 2 may have a T-shaped cross section, and the second slide member of the controller may have a C-shaped cross section.

In the embodiment described above, the controller includes a terminal (e.g., the terminal 42 or 64) for communication with the main unit 2. The main unit 2 includes a terminal (i.e., the left-side terminal 17 or the right-side terminal 21) provided on the housing 11 at such a location that allows the terminal to be connected to a terminal of a controller when the controller is attached to the main unit 2. Thus, when the controller is attached to the main unit 2, the terminals are connected together, enabling wired communication.

In the embodiment described above, the information processing device 1 can be said to be a game system capable of executing game applications. When at least the left controller 3 and the right controller 4 are removed from the main unit 2 (in other words, when the two controllers are both removed from the main unit 2), the left controller 3 and the right controller 4 each transmit operation data representing operations performed on the left controller 3 and the right controller 4 to the main unit 2 via wireless communication. Thus, in the embodiment described above, it is possible to provide a novel game system that can be used with two controllers removed.

In the embodiment described above, the information processing device 1 can be said to be a hand-held information processing device including a main section (i.e., the main unit 2) having a display (i.e., the display 12), a first controller section (i.e., the left controller 3) and a second controller section (i.e., the right controller 4) for performing a predetermined information process in response to an operation performed on either the first controller section or the second controller section. When the first controller section and the second controller section are removed from the main section, the main unit 2 performs a predetermined information process based on operation data representing an operation performed on either the first controller section or the second controller section, and displays the results of the information process on the display. Thus, in the embodiment described above, it is possible to provide a novel information processing device that can be used in a mode in which two controller sections are removed.

In the above description, the first controller section and the second controller section are arranged so that when the first controller section is attached to the main section, a user (i.e., the user holding the information processing device) can operate the first controller section with one hand and operate the second controller section with the other hand (see FIG. 14). Thus, it is possible to provide a novel information processing device that can be used both in a mode in which the controller sections are attached to the main section and in a mode in which the controller sections are removed from the main section.

The information processing system of the present embodiment includes the main unit 2, and controllers (specifically, the left controller 3 and the right controller 4; referred to also as controller devices) that are configured to be removably attached to the main unit 2. The main unit 2 includes the display 12 (referred to also as the display). When controllers are attached to the main unit 2, the main unit 2 can display, on the display 12, images that are obtained based on operations performed on the controllers. When the controllers are removed from the main unit 2, the main unit 2 can display, on an external display device (specifically, the TV 6) separate from the main unit 2, images that are obtained based on operations performed on the controllers. Note that in the above description, there may be one controller that can be attached to the main unit or there may be a plurality of controllers that can be attached to the main unit.

As described above, the information processing device 1 can be used both in a mode in which controllers are attached to the main unit 2 and in a mode in which the controllers are removed from the main unit. Thus, since a plurality of modes of use are realized with a single information processing device 1, the information processing device 1 can be used in a wider variety of manners. As described above, when the controllers are removed from the main unit 2, an external display device can be used as the display device. Thus, a user can provide, as the external display device, a display device having a larger screen size than the display 12, so that it is possible to display the images on a larger screen.

In the embodiment described above, the information processing system can communicate with the TV 6, and further includes the cradle 5 (referred to also as an add-on device) to and from which the main unit 2 can be attached and detached. The main unit 2 detects the attachment of the main unit 2 to the cradle 5, and determines whether the images obtained based on operations performed on the controllers is displayed on the display 12 or displayed on the TV 6 based at least on the detection results (step S21, S25, S29). Thus, the main unit 2 can determine the image display output based on whether or not the main unit 2 is attached to the cradle 5.

Note that in the above description, there is no particular limitation on the method for determining the image display output. As in the embodiment described above, the main unit 2 may select the TV 6 as the image display output at least on the condition that the main unit 2 is attached to the cradle 5. In other embodiments, the main unit 2 may select the TV 6 as the image display output when the main unit 2 is attached to the cradle 5. That is, the main unit 2 may output the images to the TV 6 via the cradle 5 in response to the attachment of the main unit 2 to the cradle 5.

In other embodiments, the main unit 2 may be capable of communicating directly with the TV 6. For example, the main unit 2 and the TV 6 may be capable of communicating with each other in wireless communication. Also in such a case, as in the embodiment described above, the main unit 2 may determine the image display output based on the attached state of the main unit 2 to the cradle 5.

The add-on device (e.g., the cradle) may be any add-on device to and from which the main unit 2 can be attached and detached. The add-on device may or may not have the function of charging the main unit 2, as in the present embodiment.

In the embodiment described above, the cradle 5 is enabled to communicate with the main unit 2 at least on the condition that the main unit 2 is attached thereto. If the main unit 2 has determined to display the images based on operations performed on the controllers on the TV 6, the main unit 2 outputs the images to the TV 6 via the cradle 5. Thus, the main unit 2 can display the images on the TV 6 by outputting the images to the TV 6 via the cradle 5. Therefore, the main unit 2 does not need to communicate with the TV 6, thereby simplifying the configuration of the main unit 2.

The information processing system of the embodiment described above includes the main unit 2, the left controller 3 (referred to also as the first controller device), the right controller 4 (referred to also as the second controller device), and an accessory (e.g., the extension grip 210 or the attachment 220). The left controller 3 is configured to be removably attached to the main unit 2 or the accessory. The right controller 4 is configured to be removably attached to the main unit 2 or the accessory. The main unit 2 includes the display 12 (referred to also as the display), and displays, on the display 12, the execution result of a predetermined information process based on operations performed on the left controller 3 and the right controller 4. The left controller 3 and the right controller 4 can be attached to the accessory at the same time (see FIG. 31). Thus, by using the accessory, a user can hold the two controllers 3 and 4, removed from the main unit 2, as an integral unit. That is, it is possible to improve the controllability of the controllers when removed from the main unit 2.

In the embodiment described above, the left controller 3 is attached to the accessory on the left side of the center of the accessory, and the right controller 4 is attached to the accessory on the right side of the center of the accessory (see FIG. 31, FIG. 32). Thus, a user can operate the left controller 3 attached to the accessory with the left hand, and operate the right controller 4 attached to the accessory with the right hand. That is, a user can operate the controllers in a similar fashion to that when the controllers are not attached to the accessory, thereby providing an accessory having a good controllability.

In the embodiment described above, the accessory includes a first grip portion (i.e., the left grip portion 212) provided on the left side and a second grip portion (i.e., the right grip portion 213) provided on the right side. Then, a user can operate the controllers while holding the grip portions respectively with the left hand and the right hand, thereby providing an accessory having a good controllability.

In the embodiment described above, the first grip portion is provided on the left side of the area where the left controller 3 is attached. The second grip portion is provided on the right side of the area where the right controller 4 is attached (see FIG. 31). Therefore, by holding the grip portions, a user can easily operate the controllers 3 and 4 attached to the accessory.

According to the embodiment described above and variations thereof, there is provided an accessory to which a first controller device and a second controller device are removably attachable, the accessory including:
  a first slide member configured for engaging with a slide member of the first controller device;
  a second slide member configured for engaging with a slide member of the second controller device;
  a first grip portion on a first side of a main part of the accessory with respect to a predetermined direction; and
  a second grip portion on a second side of the main part of the accessory with respect to the predetermined direction.

The first slide member may include a first engagement hole configured for engaging with a projection of the first controller device. The second slide member may include a second engagement hole configured for engaging with a projection of the second controller device.

The first slide member may be configured to allow the first controller device to be attached to the accessory on the first side of a center of the accessory with respect to the predetermined direction. The second slide member may be configured to allow the second controller device to be attached to the accessory on the second side of the center of the accessory with respect to the predetermined direction.

The first grip portion may be on the first side, with respect to the predetermined direction, of an area where the first controller device is attached to the accessory. The second grip portion may be on the second side, with respect to the predetermined direction, of an area where the second controller device is attached to the accessory.

The accessory may further include:
  a first connection terminal at a position allowing the first connection terminal to be connected to a terminal of the first controller device attached to the accessory; and
  a second connection terminal at a position allowing the second connection terminal to be connected to a terminal of the second controller device attached to the accessory.

The accessory may further include:
  a power supply terminal; and
  a charging unit configured to use power supplied to the accessory through the power supply terminal to charge the first controller device through the first connection terminal and charge the second controller device through the second connection terminal.

According to the embodiment described above and variations thereof, there is provided an accessory to which at least one controller device is removably attachable, the accessory including:
  a slide member configured for engaging with a slide member of the controller device;
  a connection terminal at a position allowing the connection terminal to be connected to a terminal of the controller device attached to the accessory;
  a power supply terminal; and
  a charging unit configured to use power supplied to the accessory through the power supply terminal to charge the controller device through the connection terminal.

According to the embodiment described above and variations thereof, there is provided a game controller configured which is removably attachable to a main unit of a game device, the game controller including:
  an operation section;
  a slide member configured for slidably and detachably engaging with a rail member of the main unit; and
  a projection on the slide member, the projection being configured to engage with the rail member of the main unit when the game controller is attached to the main unit, thereby locking the game controller to the main unit.

The game controller may further include a release mechanism configured to retract the projection into the slide member in response to an operation by a user, thereby releasing the locking of the game controller to the main unit.

The release mechanism may include a user-actuable button.

The projection may be configured to be biased from an inside toward an outside of the slide member. When the game controller is locked to the main unit by virtue of the projection, application of a force to slide the game controller releases the lock between the game controller and the main unit.

The slide member may be configured for insertion into the rail member of the main unit downwardly from an upper end of the rail member. The game controller may further include a terminal below the projection on the slide member, the terminal being configured for electrically connecting to a terminal of the main unit.

According to the embodiment described above and variations thereof, there is provided a game controller which is removably attachable to a main unit of a game device, the game controller including:
- a slide member configured for slidably and removably engaging with a rail member of the main unit; and
- a first operation section and/or a light-emitting portion on a surface of the slide member, the surface being faced to the main unit when the game controller is attached to the main unit.

The first operation section may be at a position recessed relative to the surface.

the first operation section is configured so as not to protrude past the surface.

A plurality of the first operation sections may be on the surface.

The first operation section may include a first button on a first side of a center of the slide member with respect to a slide direction and a second button on a second side of the center of the slide member with respect to the slide direction.

A plurality of light-emitting portions may be on the surface.

The game controller may further include:
- a housing having a primary surface and a side surface, the slide member being on the side surface; and
- a second operation section on the primary surface of the housing.

According to the embodiment described above and variations thereof, there is provided a game controller including:
- a housing having a shape elongated in a predetermined direction, the housing having a primary surface, at least one first side surface extending in the predetermined direction, and at least one second side surface different from the at least one first side surface;
- a directional input section on the primary surface of the housing;
- a first operation section and a second operation section on one of the at least one first side surface, wherein the first operation sections is on one side of a center of the first side surface with respect to the predetermined direction and the second operation sections is on the other side of the center of the first side surface with respect to the predetermined direction; and
- a third operation section and a fourth operation section on a corner portion at one end of one of the at least one second side surface away from the first side surface on which the first operation section and the second operation section are.

the housing shape may be elongated in an up-down direction. The first operation section and the second operation section may be on a right side surface of the housing, the first operation sections being on an upper side of a center of the right side surface with respect to the up-down direction and the second operation sections being on a lower side of the center of the right side surface with respect to the up-down direction. The third operation section and the fourth operation section may be on a corner portion between a left side surface and an upper side surface of the housing.

The housing may have a shape elongated in an up-down direction. The first operation section and the second operation section may be on a left side surface of the housing, the first operation sections being on an upper side of a center of the left side surface with respect to the up-down direction and the second operation sections being on a lower side of the center of the left side surface with respect to the up-down direction. The third operation section and the fourth operation section may be on a corner portion between a right side surface and an upper side surface of the housing.

The housing may have a rounded shape in the corner portion on which the third operation section and the fourth operation section are. The third operation section and the fourth operation section may each have a rounded shape in conformity with the rounded shape of the housing.

The fourth operation section may be on a rear side of the third operation section with respect to a front-rear direction defined perpendicular to the primary surface of the housing.

The fourth operation section may be configured so as to project past a reverse surface of the housing.

According to the embodiment described above and variations thereof, there is provided a game controller including:
- a housing having a shape elongated in a predetermined direction;
- a directional input section on a primary surface of the housing;
- a first operation section on a first side surface of the housing at such a position allowing operation by an index finger of a user, when the housing is held in a portrait position in one hand of the user so as to allow operation of the directional input section by a thumb; and
- a second operation section and a third operation section on a second side surface of the housing at such positions allowing operation of the second operation section and the third operation section respectively by a left and a right index finger of the user, when the housing is held in a landscape position by both hands of the user so as to allow operation of the directional input section by a thumb.

According to the embodiment described above and variations thereof, there is provided a game controller capable of wireless communication, the game controller including:
- a housing shape is elongated in a predetermined direction;
- a first operation section on a primary surface of the housing;
- a second operation section and a third operation section on a side surface of the housing extending along the predetermined direction; and
- a pairing button between the second operation section and the third operation section for performing a wireless communication-related setting process.

The second operation section, the third operation section and the pairing button may be configured so as not to protrude past the side surface.

According to the embodiment described above and variations thereof, there is provided a game controller comprising:
- a housing;
- a rail along a side surface of the housing, the rail having a T-shaped cross-section including a stem extending perpendicular to the side surface and a crossbar extending perpendicular to the stem; and
- one or more game control buttons on the rail.

The one or more game control buttons may be on a surface of the crossbar.

The game controller may further comprise one or more lights on the rail.

The one or more lights may be on a surface of the crossbar.

The one or more game control buttons may include a first button and a second button. The one or more lights may be between the first button and the second button.

The game controller may further comprise an electrical connector on the rail.

According to the embodiment described above and variations thereof, there is provided an information processing apparatus comprising:
 a housing;
 a display on a front surface of the housing;
 processing circuitry configured to generate images for the display;
 a first channel formed in and extending in a lengthwise direction along a first side surface of the housing;
 a second channel formed in and extending in a lengthwise direction along a second side surface of the housing opposite to the first side of the housing;
 a first electrical connector in the first channel; and
 a second electrical connector in the second channel.

According to the embodiment described above and variations thereof, there is provided a game controller comprising:
 a housing;
 a rail on a side surface of the housing, the rail having a T-shaped cross-section including a stem extending perpendicular to the side surface and a crossbar extending perpendicular to the stem; and
 an electrical connector on the rail.

The electrical connector may be on a surface of the crossbar.

According to the embodiment described above and variations thereof, there is provided a game controller comprising:
 a housing;
 a rail located on a side surface of the housing, the rail having a T-shaped cross-section including a stem extending perpendicular to the side surface and a crossbar extending perpendicular to the stem; and
 a retractable projection on the rail.

The retractable projection may be on a surface of the crossbar.

The embodiment described above is applicable to, for example, an information processing device such as a game device and an information processing system such as a game system, with the aim of providing an information processing device that can be used in different modes.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system comprising:
 a main unit;
 at least one processor; and
 a first controller configured for removable attachment to the main unit, wherein
 the first controller is configured to communicate with the main unit via wireless communication when the first controller is detached from the main unit,
 one or more of the at least one processor is configured to process inputs to the first controller for controlling a game,
 one or more of the at least one processor is configured to process a first input to the first controller according to a first interpretation when the first controller is attached to the main unit and to process the same first input to the first controller according to a different second interpretation when the first controller is detached from the main unit,
 the first controller includes a directional input device and the first input comprises an input to the directional input device in a predetermined direction, and
 one or more of the at least one processor is configured to process the first input to the directional input device as an input indicating a first direction when the first controller is attached to the main unit, and to process the first input to the directional input device as an input indicating a second direction different from the first direction when the first controller is detached from the main unit.

2. The game system according to claim 1, wherein:
 the first controller has an elongated shape, and wherein
 one or more of the at least one processor is configured to process the first input to the directional input device in a direction corresponding to a direction in which the first controller is elongated as an input indicating an up-down direction when the first controller is attached to the main unit, and to process the first input to the directional input device in the direction corresponding to the direction in which the first controller is elongated as an input indicating a left-right direction when the first controller is detached from the main unit.

3. The game system according to claim 1, further comprising a second controller configured for removable attachment to the main unit, wherein
 one or more of the at least one processor is configured to process inputs to the first controller and the second controller for controlling the game, and
 one or more of the at least one processor is configured to process a second input to the second controller according to a third interpretation when the second controller is attached to the main unit and to process the same second input to the second controller according to a different fourth interpretation when the second controller is detached from the main unit.

4. The game system according to claim 1, wherein:
 one or more of the at least one processor is configured to process the first input to the directional input device as any one of a plurality of different inputs including inputs indicating the first direction and the second direction.

5. The game system according to claim 1,
 wherein one or more of the at least one processor is configured to process the first input to the directional input device in a direction corresponding to a first dimension of the first controller as an input indicating an up-down direction when the first controller is attached to the main unit, and to process the first input to the directional input device in the direction corresponding to the first dimension of the first controller as an input indicating a left-right direction when the first controller is detached from the main unit.

6. The game system according to claim 5, wherein the directional input comprises an analog stick.

7. The game system according to claim 5, wherein the directional input comprises a slide stick.

8. The game system according to claim 5, wherein the directional input comprises multiple operation buttons.

9. A game system comprising:
a main unit;
at least one processor; and
a first controller configured for removable attachment to the main unit, wherein
the first controller is configured to communicate with the main unit via wireless communication when the first controller is detached from the main unit,
one or more of the at least one processor is configured to process inputs to the first controller for controlling a game, and
one or more of the at least one processor is configured to process a first input to the first controller according to a first interpretation to produce a first in-game effect when the first controller is attached to the main unit and to process a second input to the first controller, different from the first input, according to a second interpretation different from the first interpretation to produce a same first in-game effect when the first controller is detached from the main unit.

10. The game system according to claim 9, wherein the processor is configured to process the first input, the second input, a third input, and a fourth input to produce respective in-game effects when the first controller is attached to the main unit and to process the same first, second, third, and fourth inputs to produce different respective in-game effects when the first controller is detached from the main unit.

11. The game system according to claim 9, wherein the first input corresponds to an input to a directional input device of the first controller in a direction corresponding to a first dimension of the first controller and the second input corresponds to an input to the directional input device in a direction corresponding to a second dimension of the first controller different from the first dimension.

12. The game system according to claim 11, wherein the first and second dimensions are perpendicular to each other.

13. The game system according to claim 9, wherein the first input comprises an input to a first button of the first controller and the second input comprises an input to a second button of the first controller different from the first button.

14. A game system comprising:
a main unit;
at least one processor; and
a first controller configured for removable attachment to the main unit and including a directional input device, wherein
the first controller is configured to communicate with the main unit via wireless communication when the first controller is detached from the main unit,
the first controller is usable in a single style when the first controller is attached to the main unit such that a certain input direction of an input to the directional input device is directed in a predetermined direction relative to the main unit,
the first controller is usable in a plurality of different styles when the first controller is detached from the main unit including a first style in which the first controller is oriented so that the certain input direction is a first direction and a second style in which the first controller is oriented so that the certain input direction is a second direction different from the first direction, and
one or more of the at least one processor is configured to identify use of the first controller in the first style and use of the first controller in the second style and process inputs to the directional input device according to the identified style.

15. The game system according to claim 14, wherein:
the first controller has an elongated shape, wherein
the first style corresponds to a portrait orientation of the first controller, and
the second style corresponds to a landscape orientation of the first controller.

16. The game system according to claim 14, further comprising:
a second controller configured for removable attachment to the main unit, wherein
one or more of the at least one processor is configured to process inputs to the first controller and the second controller as being from a single user based on the first style being identified and to process inputs to the first controller and the second controller as being from different users based on the second style being identified.

17. The game system according to claim 16, wherein:
the main unit further includes a display, and
one or more of the at least one processor is configured to divide a display area of the display into different display areas for respectively displaying game images for the different users.

18. A game system comprising:
a main unit;
at least one processor; and
a controller configured for removable attachment to the main unit and including a directional input device, wherein
the controller is configured to communicate with the main unit via wireless communication when the first controller is detached from the main unit,
one or more of the at least one processor is configured to process inputs to the controller for controlling a game, and
one or more of the at least one processor is configured to process an input to the directional input device in a direction corresponding to a first dimension of the controller as an input indicating a first direction when the controller is attached to the main unit, and to process the input to the directional input device in the direction corresponding to the first dimension of the controller as an input indicating a second direction perpendicular to the first direction when the controller is detached from the main unit.

19. A game system comprising:
a main unit;
at least one processor; and
a first controller configured for removable attachment to the main unit, wherein
the first controller is configured to communicate with the main unit via wireless communication when the first controller is detached from the main unit,
one or more of the at least one processor is configured to process inputs to the first controller for controlling a game, and
one or more of the at least one processor is configured to process a same first input to the first controller as inputs corresponding to different directions according to whether the first controller is attached to or detached from the main unit.

20. A game system comprising:
a main unit;
at least one processor; and
a first controller configured for removable attachment to the main unit, wherein the first controller is configured to communicate with the main unit via wireless communication when the first controller is detached from the main unit, one or more of the at least one processor is configured to process inputs to the first controller for controlling a game, and one or more of the at least one processor is configured to process a first input to the first controller by a player according to a first interpretation when the first controller is attached to the main unit and to process the same first input to the first controller by the same player according to a different second interpretation when the first controller is detached from the main unit.

21. The game system according to claim 20, wherein the first input corresponds to an input to a directional input device of the first controller in a direction corresponding to a first dimension of the first controller and the second input corresponds to an input to the directional input device in a direction corresponding to a second dimension of the first controller different from the first dimension.

22. The game system according to claim 21, wherein the first and second dimensions are perpendicular to each other.

23. The game system according to claim 20, wherein the first and second inputs comprise respective inputs to a same button of the first controller.

24. A method for a game system comprising a main unit, at least one processor, and a first controller configured for removable attachment to the main unit and including a directional input device, wherein the first controller is configured to communicate with the main unit via wireless communication when the first controller is detached from the main unit, the method comprising:

processing, by one or more of the at least one processor, a first input to the first controller according to a first interpretation when the first controller is attached to the main unit, wherein the first input comprises an input to the directional input device in a predetermined direction; and processing, by one or more of the at least one processor, the same first input to the first controller according to a different second interpretation when the first controller is detached from the main unit, wherein the first input to the directional input device is processed as an input indicating a first direction when the first controller is attached to the main unit, and processed as an input indicating a second direction different from the first direction when the first controller is detached from the main unit.

25. A method for a game system comprising a main unit, at least one processor, and a first controller configured for removable attachment to the main unit, wherein the first controller is configured to communicate with the main unit via wireless communication when the first controller is detached from the main unit, the method comprising:

processing, by one or more of the at least one processor, a first input to the first controller according to a first interpretation to produce a first in-game effect when the first controller is attached to the main unit; and processing, by one or more of the at least one processor, a second input to the first controller, different from the first input, according to a second interpretation different from the first interpretation to produce a same first in-game effect when the first controller is detached from the main unit.

* * * * *